(12) United States Patent
Uchida et al.

(10) Patent No.: US 12,449,629 B2
(45) Date of Patent: Oct. 21, 2025

(54) LENS BARREL, CONTROL METHOD, AND IMAGING DEVICE

(71) Applicant: SONY GROUP CORPORATION, Tokyo (JP)

(72) Inventors: Syohei Uchida, Tokyo (JP); Takuya Hasegawa, Tokyo (JP); Masayuki Miyazawa, Tokyo (JP); Nobuhiro Kondo, Tokyo (JP); Masayuki Miyazaki, Tokyo (JP); Tetsu Tanaka, Tokyo (JP); Daiki Kondo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 282 days.

(21) Appl. No.: 18/250,843

(22) PCT Filed: Oct. 22, 2021

(86) PCT No.: PCT/JP2021/039160
§ 371 (c)(1),
(2) Date: Apr. 27, 2023

(87) PCT Pub. No.: WO2022/097506
PCT Pub. Date: May 12, 2022

(65) Prior Publication Data
US 2023/0393367 A1 Dec. 7, 2023

(30) Foreign Application Priority Data
Nov. 5, 2020 (JP) .................................. 2020-185168

(51) Int. Cl.
*G02B 7/04* (2021.01)
*G02B 27/64* (2006.01)
*G03B 13/34* (2021.01)

(52) U.S. Cl.
CPC ............. *G02B 7/04* (2013.01); *G02B 27/646* (2013.01); *G03B 13/34* (2013.01)

(58) Field of Classification Search
CPC . G02B 7/04; G02B 7/102; G02B 7/08; G02B 27/646; G03B 13/34; G03B 3/10; G03B 17/14; G03B 17/02; H04N 23/60
(Continued)

(56) References Cited

U.S. PATENT DOCUMENTS 10,382,687 B1 * 8/2019 Patel .................... G02B 27/646
11,307,380 B2 * 4/2022 Otsuka ................. G02B 15/145
(Continued)

FOREIGN PATENT DOCUMENTS

JP 08-098069 A 4/1996
JP 2001-091831 A 4/2001
(Continued)

OTHER PUBLICATIONS

International Search Report and Written Opinion of PCT Application No. PCT/JP2021/039160, issued on Dec. 21, 2021, 08 pages of ISRWO.

*Primary Examiner* — William R Alexander
(74) *Attorney, Agent, or Firm* — CHIP LAW GROUP

(57) ABSTRACT

A lens barrel includes a lens drive unit that moves a lens holder holding a lens in an optical axis direction, a locking mechanism that regulates movement of the lens holder at a movable end of the lens holder, and a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced.

19 Claims, 34 Drawing Sheets

(58) Field of Classification Search
USPC .......................................................... 359/823
See application file for complete search history.

(56) References Cited

U.S. PATENT DOCUMENTS

| | | | |
|---|---|---|---|
| 2019/0265432 A1* | 8/2019 | Kawanabe | G02B 7/003 |
| 2019/0346657 A1* | 11/2019 | Hayashi | G02B 7/023 |
| 2020/0096783 A1* | 3/2020 | Togawa | G03B 17/14 |
| 2020/0209719 A1* | 7/2020 | Tamura | G03B 17/565 |
| 2020/0233286 A1* | 7/2020 | Shigematsu | H04N 23/55 |
| 2020/0409032 A1* | 12/2020 | Nagaoka | G02B 7/021 |
| 2021/0033710 A1* | 2/2021 | Matsumoto | H04N 23/55 |
| 2021/0096320 A1* | 4/2021 | Otsuka | H02K 41/0354 |
| 2021/0152732 A1* | 5/2021 | Eki | H04N 25/78 |
| 2021/0195128 A1* | 6/2021 | Hanada | G06V 10/955 |

FOREIGN PATENT DOCUMENTS

| | | |
|---|---|---|
| JP | 2007-306308 A | 11/2007 |
| JP | 2013-025081 A | 2/2013 |
| JP | 2013-182165 A | 9/2013 |
| WO | 2020/003942 A1 | 1/2020 |

\* cited by examiner

LENS BARREL, CONTROL METHOD, AND IMAGING DEVICE

CROSS REFERENCE TO RELATED APPLICATIONS

This application is a U.S. National Phase of International Patent Application No. PCT/JP2021/039160 filed on Oct. 22, 2021, which claims priority benefit of Japanese Patent Application No. JP 2020-185168 filed in the Japan Patent Office on Nov. 5, 2020. Each of the above-referenced applications is hereby incorporated herein by reference in its entirety.

TECHNICAL FIELD

The present technology relates to a lens barrel or an imaging device each having a locking mechanism of a lens holder, and a control method for the lens barrel or the imaging device.

BACKGROUND ART

A lens barrel included in an interchangeable lens of an interchangeable lens camera, a lens of an integrated lens camera, or other lenses has a mechanism for moving a lens group in an optical axis direction. A focus mechanism and a zoom mechanism are examples of this mechanism.

PTL 1 identified below discloses an optical apparatus which forms an image on an image forming surface by using an optical system including a movable lens group.

CITATION LIST

Patent Literature

[PTL 1]
Japanese Patent Laid-open No. 2001-91831

SUMMARY

Technical Problem

A lens moving mechanism for focusing or zooming typically included in a lens barrel is of a manually operated type, or of a type using an actuator. Examples of this actuator include a DC motor, a stepping motor, an ultrasonic motor, and a linear motor (VCM: Voice Coil Motor). In recent years, a linear motor is often used to obtain responsiveness and thrust. However, a linear motor is unable to obtain sufficient holding strength in a state of power off.

Accordingly, a lens holder holding an inner lens group moves in an optical axis direction due to vibration, shock, a posture change, or the like applied during conveyance of a camera or a lens barrel in a power-off state or in other situations. In this case, there is a possibility that the lens holder comes into contact with a movable end and generates abnormal noise or causes exhaustion or breakage of the mechanism.

It is therefore considered to be appropriate to regulate movement of the lens moving mechanism during power-off or the like. For regulating movement of the lens, it is required to achieve appropriate transition to a movement regulated state during power-off or the like.

Accordingly, the present disclosure proposes a technology which achieves appropriate transition from a lens movable state to a movement regulated state.

Solution to Problem

A lens barrel according to the present technology includes a lens drive unit that moves a lens holder holding a lens in an optical axis direction, a locking mechanism that regulates movement of the lens holder at a movable end of the lens holder, and a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

For example, as a shift process at the time of ending such as power off, a lens holder of a focus lens or the like is brought into the movement regulated state for regulating movement. In this manner, unprepared movement of the lens holder is prevented.

In addition, an imaging device according to the present technology has the configuration of the lens barrel described above.

According to the lens barrel or the imaging device of the present technology described above, it is considered that the locking mechanism includes an electromagnetic actuator that regulates movement of the lens holder by using attraction produced by magnetic force, and reduces or eliminates attracting force of the magnetic force in accordance with energization.

For example, a solenoid employed as the electromagnetic actuator is configured to achieve attraction by using magnetic force during non-energization, and reduce or eliminate attracting force by applying current to a coil.

According to the lens barrel or the imaging device of the present technology described above, it is considered that the control unit executes the shift process after execution of a shift preparation process for moving the lens holder to a preparation position where the shift process is started.

The lens holder is initially moved to the predetermined preparation position, and then is moved to the position where movement regulation is achieved by the locking mechanism in a state where the movement regulating force of the locking mechanism is reduced.

According to the lens barrel or the imaging device of the present technology described above, it is considered that the preparation position is a position set on the basis of a distance within reach of the movement regulating force of the locking mechanism.

For example, the preparation position is designated at a position immediately before reach of the attracting force generated by the solenoid.

According to the lens barrel or the imaging device of the present technology described above, it is considered that the control unit performs, as the shifting process, a pushing process for moving the lens holder to bring the lens holder into contact with a part of the locking mechanism and push the lens holder into the locking mechanism, and a pulling process for moving the lens holder in a direction opposite to a pushing direction after the pushing process to return the lens holder to a predetermined end position.

The shift process for bringing the lens holder into the movement regulated state is achieved in two stages of the pushing process and the pulling process.

According to the lens barrel or the imaging device of the present technology described above, it is considered that the control unit performs control for lowering or eliminating the movement regulating force of the locking mechanism during the pushing process.

For example, a sharp collision caused by attraction power of the magnetic force is prevented when the lens holder is pressed against the position corresponding to the movement regulated state.

According to the lens barrel or the imaging device of the present technology described above, it is considered that the control unit performs control for generating the movement regulating force of the locking mechanism during the pulling process.

After the lens holder is pressed against the locking mechanism by the pushing process, the pulling process is performed in a state where attraction power of the magnetic force is exerted, for example.

According to the lens barrel or the imaging device of the present technology described above, it is considered that the control unit executes the shift process after execution of a shift preparation process for moving the lens holder to a preparation position where the shift process is started, and that movement of the lens holder in the pushing process is executed at lower speed than movement of the lens holder in the shift preparation process.

For example, the lens holder is moved at high speed during the shift preparation process, and is moved at low speed during the pushing process.

According to the lens barrel or the imaging device of the present technology described above, it is considered that the control unit determines timing for executing the shift process on the basis of presence or absence of a power limit instruction requesting a limit to power consumption.

When shift to the movement regulated state is required at the time of ending or other occasions, the timing for executing the shift process is changed on the basis of whether or not power available for the lens barrel is limited.

According to the lens barrel or the imaging device of the present technology described above, in a case where the power limit instruction is issued, it is considered that the control unit executes the shift process in a period different from a period when end processes associated with other actuators are executed.

In a case where the power limit instruction is issued at the time of a shift to the movement regulated state, time overlap between the shift process and the end processes of the other actuators is avoided.

According to the lens barrel or the imaging device of the present technology described above, in a case where the power limit instruction is issued, it is considered that the control unit performs the shift process after completion of end processes associated with the other actuators.

In a case where the power limit instruction is issued at the time of ending such as power off, the end processes of the other actuators are carried out with priority, and the shift process is executed after completion of these processes.

According to the lens barrel or the imaging device of the present technology described above, it is considered that the lens holder is allowed to be brought into the movement regulated state at a movable end on an object side by the locking mechanism.

The lens barrel is often placed on a desk or the like in a state where the object side is located below the image side, or suspended by a user with a suspension belt, a strap, or the like in a state where the object side is located below the image side. By adopting the configuration where the lens holder is locked at the movable end on the object side, a frequency that the lens holder is locked (brought into the movement regulated state) by the locking mechanism increases.

According to the lens barrel or the imaging device of the present technology described above, it is considered that the multiple locking mechanisms are provided, and that the lens holder is allowed to be brought into the movement regulated state at each of a movable end on an object side and a movable end on an image side by the locking mechanisms.

The lens holder is locked by the locking mechanisms at the movable ends of both the object side and the image side.

According to the lens barrel or the imaging device of the present technology described above, it is considered that the two locking mechanisms are provided, and that the two locking mechanisms are provided on opposite sides with an optical axis interposed between the respective locking mechanisms.

The lens holder is locked on the opposite sides with respect to the optical axis.

According to the lens barrel or the imaging device of the present technology described above, it is considered that the locking mechanism includes an attracting force generation unit that includes an attracting portion and generates attracting force, and an attracted portion that is attracted by the attracting force generated by the attracting force generation unit and is supported by the lens holder, and that the attracted portion is configured to be displaceable relative to the lens holder in a direction different from the optical axis direction.

The attracted portion is attracted to the attracting force generation unit in a displaced state relative to the lens holder in accordance with a direction of the attracting force generation unit. Accordingly, a contact area between the attracted portion and the attracting force generation unit is allowed to increase in a state where the attracted portion is attracted to the attracting force generation unit.

According to the lens barrel or the imaging device of the present technology described above, it is considered that an elastic member is provided between the lens holder and the attracted portion to bias the attracted portion in a direction toward the attracting force generation unit.

The attracted portion supported by the lens holder is biased in the direction toward the attracting force generation unit.

According to the lens barrel or the imaging device of the present technology described above, it is considered that the attracted portion is supported by the lens holder via an attachment shaft in a displaceable manner, that the lens holder has a recessed surface having a curved surface shape, and that the attachment shaft has a protruding surface having a curved surface shape and slidable on the recessed surface at the time of displacement of the attracted portion relative to the lens holder.

The protruding surface having the curved surface shape slides on the recessed surface having the curved surface shape when the attracted portion is displaced relative to the lens holder.

A control method according to the present technology is a control method for a lens barrel that includes a lens drive unit that moves a lens holder holding a lens in an optical axis direction, and a locking mechanism that regulates movement of the lens holder at a movable end of the lens holder. The control method performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

A gentle contact is easily achieved by producing a state where the movement regulating force is reduced.

DESCRIPTION OF EMBODIMENT

An embodiment will be hereinafter described in the following order.

<1. Configuration of camera system>
<2. Locking mechanism>
  [2-1 Configuration of solenoid, etc.]
  [2-2 Modification of support structure of attracted portion]
  [2-3 Examples of arrangement position of focus lens drive unit]
<3. Action of escape and attraction>
<4. Escape from movement regulated state>
<5. Escape process timing in accordance with power limit>
<6. Shift to movement regulated state>

<7. Attraction process timing in accordance with power limit>
<8. Summary and modification>

Note that described in the embodiment will be an example of a lens barrel included in an interchangeable lens camera system, and an example of a focus lens group having a locking mechanism which uses a solenoid. This locking mechanism is a mechanism which attracts a lens holder holding a focus lens group by using magnetic force to regulate movement of the lens holder. A movement regulated state will be referred to as "lock" in some cases.

In addition, the following terms will be used.

A term "escape" refers to an action for achieving escape of the lens holder from a movement regulated state produced by the locking mechanism, and transition to a state where a focusing action is allowed.

A term "escape process" refers to a process for achieving escape.

A term "attraction" refers to a state where the lens holder is attracted by magnetic force of the locking mechanism. In some cases, this term collectively refers to a process for achieving transition to the movement regulated state produced by the locking mechanism.

A term "attraction process" refers to a process for shifting to the movement regulated state produced by attraction of the locking mechanism. This process is an example of a process for shifting to the movement regulated state.

A term "unnecessary attraction" refers to a state where the lens holder is unintentionally attracted by a disturbance or the like during an imaging action or other occasions.

1. CONFIGURATION OF CAMERA SYSTEM

Figure 1:
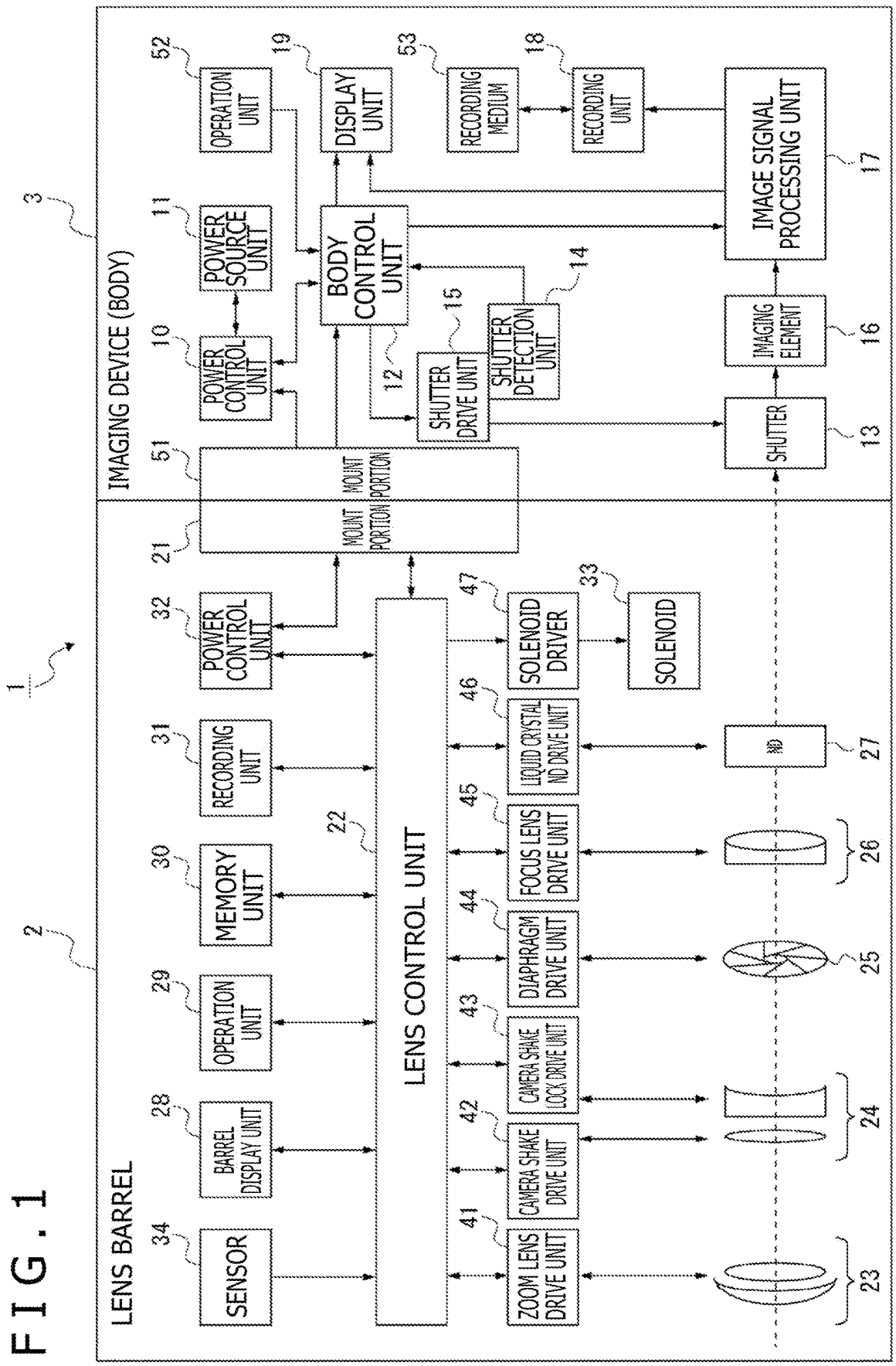
FIG. 1 is a block diagram of a camera system according to an embodiment of the present technology.

FIG. 1 is a block diagram of a configuration example according to the embodiment, depicting a camera system to which the present technology is applied. A camera system 1 is an interchangeable lens digital camera, and includes a lens barrel 2 of a detachable type, and an imaging device 3 constituting a camera body.

The lens barrel 2 includes a mount portion 21 detachably attached to a mount portion 51 of the imaging device 3. The mount portion 21 has multiple terminals (not depicted) electrically connected to the imaging device 3.

The lens barrel 2 includes a lens control unit 22, a zoom lens 23, a camera shake compensation lens 24, a diaphragm 25, a focus lens 26, a liquid crystal ND (Neutral Density) filter 27, a barrel display unit 28, an operation unit 29, a memory unit 30, a recording unit 31, a power control unit 32, a solenoid 33, and a sensor 34.

Moreover, the lens barrel 2 includes a zoom lens drive unit 41, a camera shake drive unit 42, a camera shake lock drive unit 43, a diaphragm drive unit 44, a focus lens drive unit 45, a liquid crystal ND drive unit 46, and a solenoid driver 47.

For example, the lens control unit 22 includes an arithmetic processing device such as a CPU (Central Processing Unit) and an MPU (Micro Processing Unit), peripheral circuits, and the like, and reads and executes a predetermined control program recorded in the recording unit 31 to control the entire lens barrel 2.

For example, the lens control unit 22 controls a position of the zoom lens 23 in accordance with an instruction supplied from the imaging device 3 via a predetermined communication terminal of the mount portion 21, or an operation performed by a user and accepted by the operation unit 29.

More specifically, for example, the lens control unit 22 acquires a current position of the zoom lens 23 from a zoom position detection sensor including a magnetic sensor (MR sensor) or the like, determines a driving direction and a driving amount sufficient for moving the zoom lens 23 to a predetermined position on the basis of an acquired result, and outputs the driving direction and the driving amount thus determined to the zoom lens drive unit 41 together with a movement command. The zoom lens drive unit 41 moves the zoom lens 23 in an optical axis direction to achieve movement in the driving direction and by the driving amount in correspondence with the instruction on the basis of the movement command supplied from the lens control unit 22.

Moreover, the lens control unit 22 controls the camera shake compensation lens 24 to compensate for camera shake. Specifically, on the basis of a quantity of camera shake detected by the camera shake detection sensor, the lens control unit 22 determines a driving direction and a driving amount of the camera shake compensation lens 24 sufficient for cancelling the quantity of camera shake, and outputs the driving direction and the driving amount thus determined to the camera shake drive unit 42 together with a movement command. For example, the camera shake detection sensor includes both or either one of a gyro sensor and a triaxial accelerometer. The gyro sensor is employed in a case of detection of deviation (shake) in a direction corresponding to pitch or yaw as a compensation direction of the camera shake compensation lens 24, while the triaxial accelerometer is employed in a case of detection of deviation (shake) in X-axis and Y-axis directions on an assumption that an optical axis direction corresponds to a Z axis. The camera shake drive unit 42 moves the camera shake compensation lens 24 to achieve movement in the driving direction and by the driving amount in correspondence with the instruction on the basis of a movement command supplied from the lens control unit 22.

The lens control unit 22 achieves mechanical lock control for the camera shake compensation lens 24 in a case of cutoff of power supply. Specifically, the camera shake compensation lens 24 is so controlled as to be maintained at a predetermined position under control via the camera shake drive unit 42 in a state of power supply from the imaging device 3 to the lens barrel 2. However, when power supply is cut off, positional control by the camera shake drive unit 42 is stopped. In this case, the camera shake compensation lens 24 drops in a direction of gravity by a predetermined amount. The lens control unit 22 mechanically locks the camera shake compensation lens 24 via the camera shake lock drive unit 43 in accordance with timing of cutoff of power supply to prevent a drop of the camera shake compensation lens 24. The camera shake lock drive unit 43 mechanically locks the camera shake compensation lens 24 on the basis of a fixation command supplied from the lens control unit 22.

The lens control unit 22 controls an aperture diameter of the diaphragm 25 in accordance with an instruction supplied from the imaging device 3 via a predetermined communication terminal of the mount portion 21, for example. Specifically, the lens control unit 22 acquires an aperture diameter of the diaphragm 25 detected by a diaphragm detection sensor, and commands the diaphragm drive unit 44 to drive the diaphragm 25 to obtain an F value corresponding to an instruction issued from the imaging device 3. The diaphragm drive unit 44 drives the diaphragm 25 to obtain an aperture diameter corresponding to an instruction from the lens control unit 22.

The lens control unit 22 controls the focus lens 26. Specifically, the lens control unit 22 acquires a current position of the focus lens 26 from a lens position detection sensor, determines a driving direction and a driving amount sufficient for moving the focus lens 26 to a predetermined position on the basis of an acquired result, and outputs the driving direction and the driving amount thus determined to the focus lens drive unit 45 together with a movement command. The focus lens drive unit 45 moves the focus lens 26 in the optical axis direction to achieve movement in the driving direction and by the driving amount corresponding to the instruction.

The focus lens 26 includes one or multiple optical elements. Note that the focus lens 26 may include two types of focus lens groups, i.e., a focus lens group located near the zoom lens 23 and a focus lens group located near imaging elements 16 of the imaging device 3.

For example, the lens position detection sensor can include a magnetic sensor, a photodiode array, a potentiometer, a reflective type encoder, or the like.

For example, the focus lens drive unit 45 can include an ultrasonic motor, a DC motor, a linear actuator, a stepping motor, a piezoelectric element, or the like.

The lens control unit 22 controls the liquid crystal ND filter 27. Specifically, the lens control unit 22 determines transmittance of the liquid crystal ND filter 27 on the basis of an instruction supplied from the imaging device 3 via a predetermined communication terminal of the mount portion 21, or an operation performed by the user and accepted by the operation unit 29, and outputs the determined transmittance to the liquid crystal ND drive unit 46. The liquid crystal ND drive unit 46 determines a voltage value sufficient for the transmittance corresponding to the instruction, and supplies driving voltage to the liquid crystal ND filter 27. The liquid crystal ND filter 27 changes transmittance of light in accordance with the driving voltage by using a liquid crystal element.

The lens control unit 22 controls the solenoid 33. As described in detail below, the solenoid 33, which is a type of electromagnetic actuator, is a locking mechanism which attracts and holds, by using magnetic force, a lens holder 60 (see FIGS. 3 and 4 and others) for holding the focus lens 26. The solenoid 33 regulates unnecessary movement of the lens holder 60 by attracting the lens holder 60 with use of magnetic force during power off.

The solenoid driver 47 energizes coils 73 (see FIG. 4) provided on the solenoid 33. This energization reduces magnetic force to reduce or eliminate attracting force generated by the solenoid 33. The lens control unit 22 controls on-off of energization applied by the solenoid driver 47 to the solenoid 33.

The sensor 34 collectively represents various types of sensors provided on the lens barrel 2, such as the zoom position detection sensor, the camera shake detection sensor, the diaphragm detection sensor, and the lens position detection sensor described above. Detection values obtained by the sensor 34 are sequentially input to the lens control unit 22.

The barrel display unit 28 is a display unit disposed at a barrel portion and including a liquid crystal panel or an organic EL (Electro Luminescence) display. For example, the barrel display unit 28 displays predetermined numerical values, characters, or symbols, such as a focus distance and a depth of field at a current lens position.

The operation unit 29 accepts a manual operation input from the user via a zoom ring operated to manually set a zoom magnification, a focus ring operated to manually set the focus lens, or the like, and supplies an operation signal corresponding to the accepted operation to the lens control unit 22.

For example, the memory unit 30 is a volatile storage medium, such as a RAM (Random Access Memory), and is used as a storage area for various data currently operated.

The recording unit 31 is a non-volatile storage medium. A predetermined control program executed by the lens control unit 22, and various types of data such as adjustment parameters are stored in the recording unit 31.

The power control unit 32 detects electric energy of power supplied from the imaging device 3, and provides optimum distributions of the electric energy for respective units (lens control unit 22 and various drive units) within the lens barrel 2 on the basis of the detected electric energy to supply power.

The imaging device 3 constituting the body includes the mount portion 51 to which the lens barrel 2 is detachably attached. The mount portion 51 has multiple terminals (not depicted) electrically connected to the mount portion 21 of the lens barrel 2.

When the lens barrel 2 is attached to the mount portion 51 of the imaging device 3, respective terminals of the mount portion 51 and corresponding terminals of the mount portion 21 of the lens barrel 2 are electrically and physically connected to each other. For example, the connected terminals include terminals for power supply (power supply terminals), terminals for transferring commands and data (communication terminals), and terminals for transferring synchronized signals (synchronized signal terminals).

The imaging device 3 further includes a power control unit 10, a power source unit 11, a body control unit 12, a shutter 13, a shutter detection unit 14, a shutter drive unit 15, the imaging element 16, an image signal processing unit 17, a recording unit 18, a display unit 19, and an operation unit 52.

For example, the body control unit 12 includes an arithmetic processing device such as a CPU and an MPU, a non-volatile memory, peripheral circuits, and the like, and reads and executes a predetermined control program stored in the non-volatile memory provided inside to control the entire camera system 1.

For example, the body control unit 12 causes the imaging element 16 to capture an image in accordance with an operation signal supplied from the operation unit 52 and indicating a predetermined operation performed by the user. Moreover, the body control unit 12 transmits a predetermined command to the lens barrel 2 via the mount portion 51 to drive the focus lens 26, the zoom lens 23, and the like.

Furthermore, for example, lens position information associated with the focus lens 26, zoom position information associated with the zoom lens 23, and the like are supplied from the lens barrel 2 to the body control unit 12 via the mount portion 51. The body control unit 12 causes the imaging element 16 to capture an image to be recorded in the recording unit 18 and an image to be transferred to an external apparatus at optimum timing on the basis of these items of information.

Image data obtained by the imaging element 16 is recorded in a recording medium 53 via the recording unit 18, or displayed on the display unit 19 in accordance with control by the body control unit 12.

The shutter 13 is disposed on a front surface of the imaging element 16, and opens and closes in accordance with control by the shutter drive unit 15. When the shutter 13 is in a close state, subject light having passed through an optical system of the lens barrel 2 is blocked. The shutter detection unit 14 detects an open/close state of the shutter 13, and supplies the detected state to the body control unit 12. The shutter drive unit 15 drives the shutter 13 into an open state or a close state in accordance with control by the body control unit 12.

For example, the imaging element 16 which includes a CCD (Charge Coupled Device), a CMOS (Complementary Metal Oxide Semiconductor) sensor, or the like captures an image of a subject, generate image data, and outputs the generated image data.

Note that an electronic shutter is available in a case where the imaging element 16 includes a CCD sensor or a CMOS sensor. In this case, the shutter 13 can be eliminated. In a case where the shutter 13 is eliminated, the shutter detection unit 14 and the shutter drive unit 15 used for controlling the shutter 13 are also eliminated.

The image signal processing unit 17 executes predetermined image signal processing for an image supplied from the imaging element 16. For example, the image signal processing unit 17 converts a raw image supplied from the imaging element 16 into image data in a predetermined file format, and records the image data in the recording medium 53 via the recording unit 18. Moreover, the image signal processing unit 17 executes demosaic processing for a raw image, and further converts the processed image into image data in a predetermined file format by lossless compression or lossy compression, and records the image data in the recording medium 53 via the recording unit 18. Further, for example, the image signal processing unit 17 converts image data supplied from the imaging element 16 into an image signal in a predetermined display format, and supplies the image signal to the display unit 19 to display a captured image.

For example, the recording unit 18 performs a process for recording data or the like of an image captured by the imaging element 16 in the recording medium 53 including a non-volatile memory, and a process for reading image data from the recording medium 53. The recording medium 53 may be configured to be detachably attached.

The display unit 19 includes a panel type display device such as a liquid crystal panel and an organic EL display, and displays an image (moving image or still image) supplied from the image signal processing unit 17. The display unit 19 is mounted on a rear surface on the side opposite to a front surface where the mount portion 51 is disposed, and is capable of displaying a through-the-lens image, an image recorded in the recording medium 53, and the like.

The power control unit 10 supplies power received from the power source unit 11 to respective units of the imaging device 3. Moreover, the power control unit 10 calculates electric energy of power allowed to be supplied to the lens barrel 2 while taking an action state of the imaging device 3 into consideration, and supplies the power to the lens barrel 2 via the mount portion 51. For example, the power source unit 11 includes a secondary battery such as an NiCd battery, an NiMH battery, and a Li battery, and an AC adapter.

The operation unit 52 includes a hardware key such as a shutter button, a mode dial, and a zoom button, and a software key including a touch panel laminated on the display unit 19. The operation unit 52 accepts a predetermined operation performed by the user, and supplies an operation signal indicating this operation to the body control unit 12. The user operates the operation unit 52 to input a setting of an imaging mode, a setting of a camera parameter, or the like.

According to the camera system 1 described above, the solenoid 33 is provided on the lens barrel 2 as a locking mechanism for the lens holder 60 (see FIG. 4 and other figures) for holding the focus lens 26. In the following description, attention will be paid specifically to devices associated with the focus lens, i.e., the focus lens 26, the lens holder 60, the focus lens drive unit 45, the solenoid 33, and the solenoid driver 47.

Figure 2:
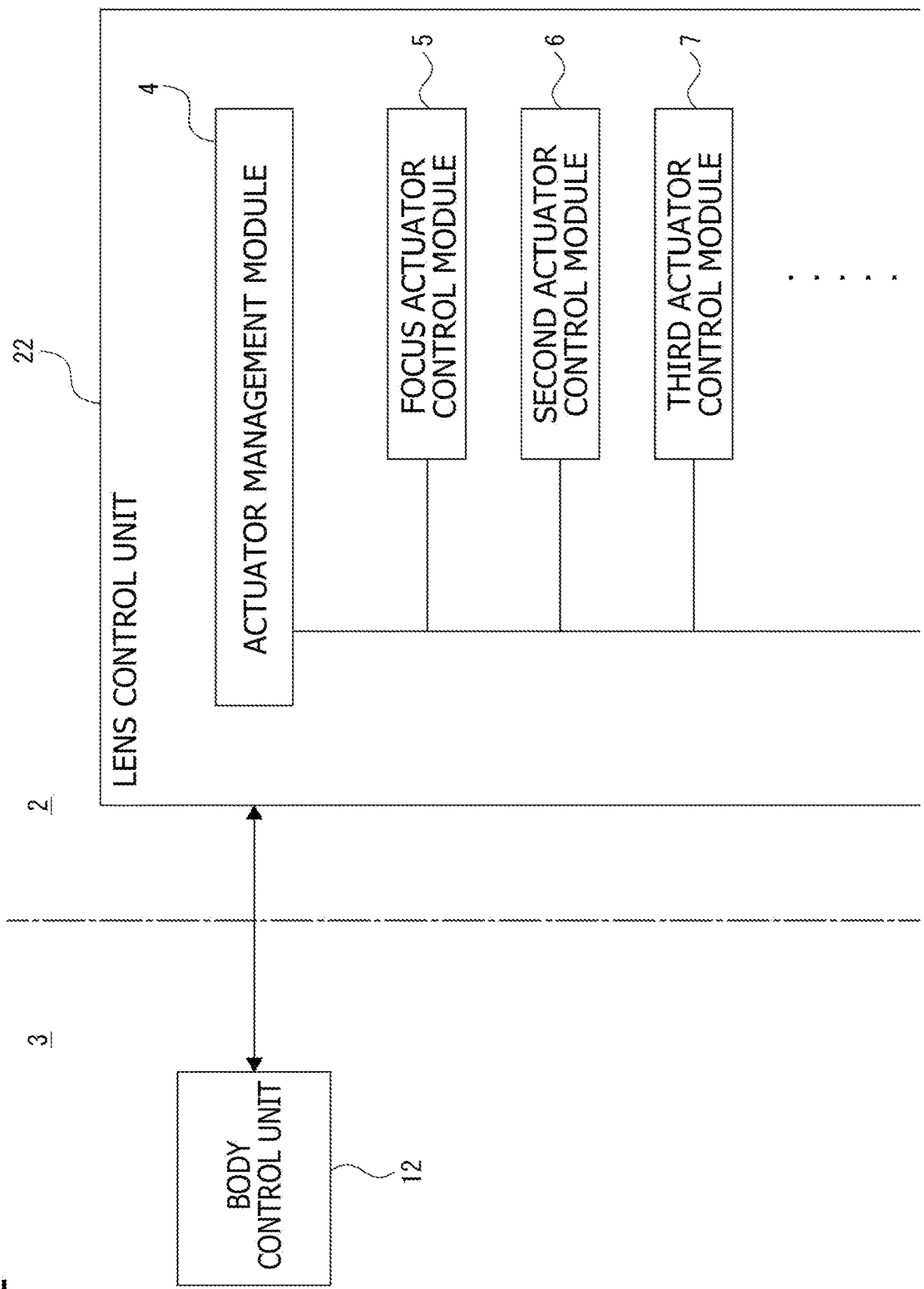
FIG. 2 is an explanatory diagram of a module configuration of a lens control unit according to the embodiment.

As control modules defined by a software program, the lens control unit 22 includes an actuator management module 4, a focus actuator control module 5, a second actuator control module 6, a third actuator control module 7, and others as depicted in FIG. 2.

The focus actuator control module 5 is a module which controls actions of the focus lens drive unit 45 and the solenoid driver 47 in accordance with a predetermined sequence to cause the focus lens 26 (lens holder 60) to execute a necessary movement action in the optical axis direction.

For convenience of explanation, the second actuator control module 6, the third actuator control module 7, and others refer to modules for controlling drive units other than drive units associated with the lens holder 60 on an assumption that the focus actuator control module 5 is designated as a first actuator control module. According to the case of the present embodiment, the drive units associated with the lens holder 60 are the focus lens drive unit 45 and the solenoid driver 47. Accordingly, the second actuator control module 6, the third actuator control module 7, and others refer to control modules for drive units such as the zoom lens drive unit 41, the camera shake drive unit 42, and the diaphragm drive unit 44, for example.

The actuator management module 4 is a module which instructs the respective actuator control modules (5, 6, 7, and others) to manage the respective actuators included in the lens barrel 2 such that appropriate actions of these actuators can be achieved at appropriate timing.

According to the present embodiment, various actions are executed in accordance with control by the respective actuator control modules (5, 6, 7, and others) each controlling a corresponding actuator under management by the actuator management module 4. An escape process and an attraction process described below are controlled by the focus actuator control module 5. In addition, execution timing of these control processes and the like are managed by the actuator management module 4.

2. LOCKING MECHANISM

[2-1 Configuration of Solenoid, Etc.]

A specific configuration and the like of the solenoid 33 described above will be hereinafter described (see FIGS. 3 to 9).

Note that the solenoid 33 functions as a locking mechanism for locking a moving body, which moves in the optical axis direction, at a predetermined position. The following description will be presented on an assumption that the lens holder 60 for holding the focus lens 26 is an example of the moving body.

However, the moving body adoptable in the present technology is not limited to the lens holder 60 holding the focus lens 26, and may be other moving bodies as long as they are moved in the optical axis direction, such as a lens holder for holding the zoom lens 23 or the like.

Figure 3:
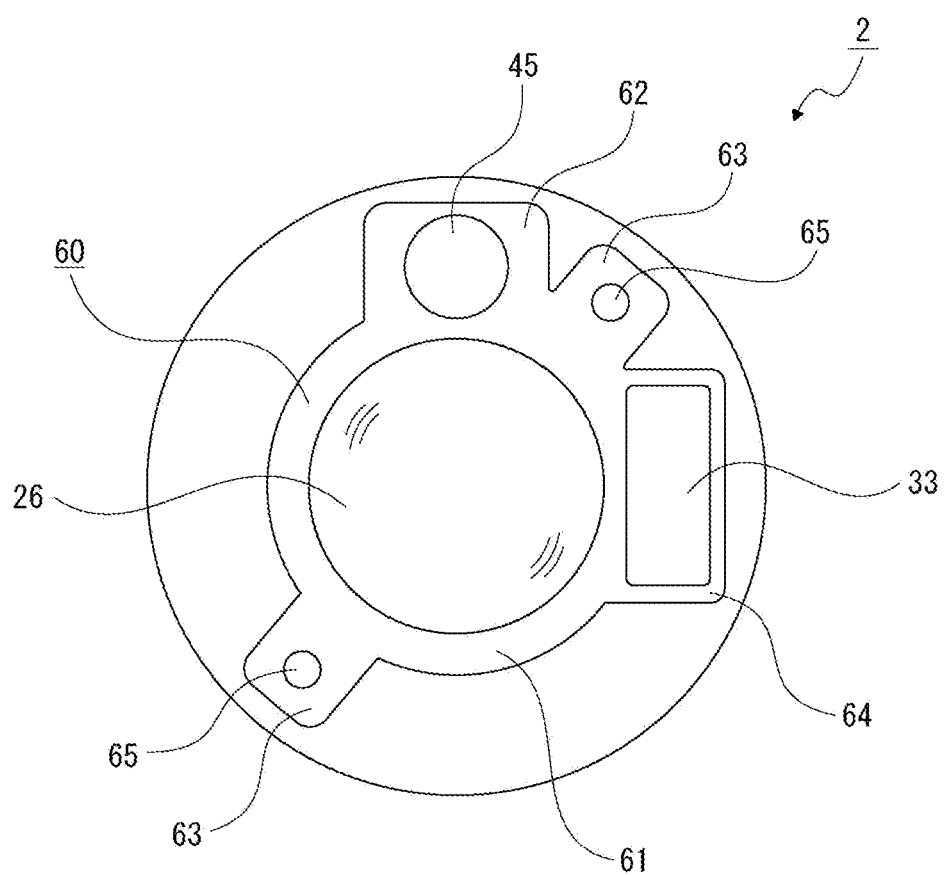
FIG. 3 depicts a specific configuration and the like of a solenoid in conduction with FIGS. 4 to 9, as a conceptual diagram depicting an internal structure of a lens barrel.

The focus lens drive unit 45 and not-depicted different drive units are disposed inside the lens barrel 2 at positions on the outer circumferential side with respect to a moving range of the focus lens 26 (see FIG. 3).

For example, the focus lens drive unit 45 and the different drive units are disposed on the opposite sides with the focus lens 26 interposed between the focus lens drive unit 45 and the different drive units. For example, the different drive units provided herein include the zoom lens drive unit 41 and the camera shake drive unit 42. Moreover, the solenoid 33 functioning as a locking mechanism is disposed inside the lens barrel 2 at a position on the outer circumferential side with respect to the moving range of the focus lens 26.

Note that the arrangement positions of the focus lens drive unit 45, the different drive units, and the solenoid 33 may be any positions as long as these positions are located on the outer circumferential side with respect to the moving range of the focus lens 26.

Figure 4:
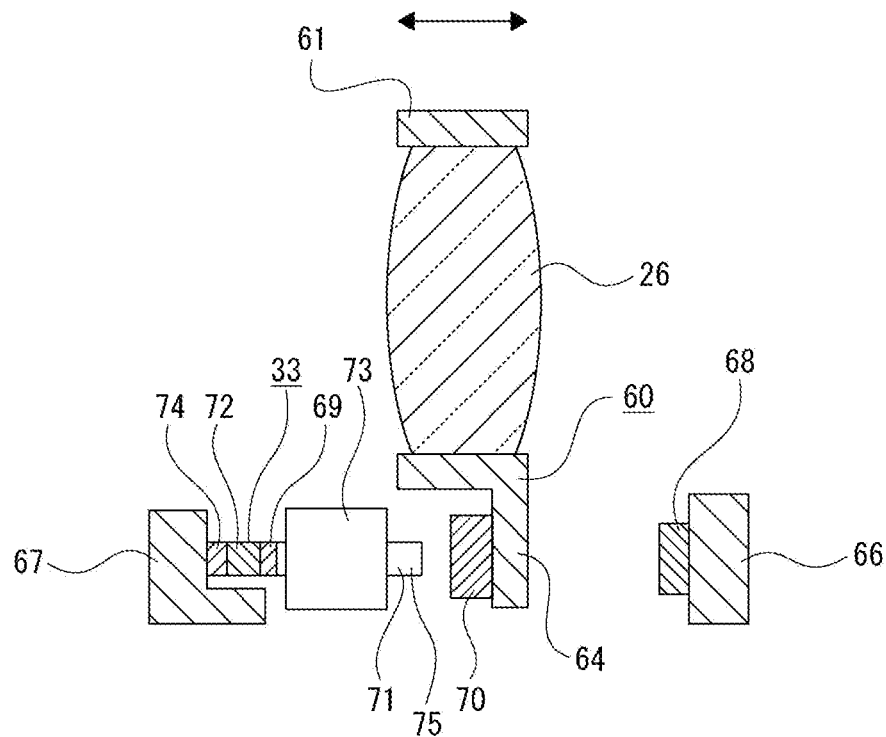
FIG. 4 is a cross-sectional diagram depicting a lens holder, the solenoid, and the like in an unlocked state.

The focus lens 26 is held by the lens holder 60 (see FIGS. 3 and 4). The lens holder 60 has a holding portion 61 having an annular shape and holding the focus lens 26, a connecting portion 62 projected from the holding portion 61 toward the outside, supported portions 63, 63 projected from the holding portion 61 toward the outside, and a supporting portion 64 projected from the holding portion 61 toward the outside. The supported portions 63, 63 are positioned on opposite sides with the focus lens 26 interposed between the supported portions 63, 63. The connecting portion 62 and the supporting portion 64 are each positioned between the supported portions 63, 63 in a circumferential direction, for example.

The supported portions 63, 63 of the lens holder 60 are supported by respective guide shafts 65, 65 extending in an optical axis direction of the focus lens 26. The focus lens drive unit 45 is connected to the connecting portion 62. Accordingly, the lens holder 60 is guided by driving force of the focus lens drive unit 45 along the guide shafts 65, 65, and is moved in the optical axis direction of the focus lens 26. The focus lens 26 is moved in the optical axis direction together with the lens holder 60 as one body.

A first fixing member 66 and a second fixing member 67 are disposed inside the lens barrel 2. The first fixing member 66 and the second fixing member 67 are positioned away from each other in the optical axis direction with the supporting portion 64 interposed between the first fixing member 66 and the second fixing member 67. For example, each of the first fixing member 66 and the second fixing member 67 is attached to an inner surface of an outer housing of the lens barrel 2, or a part of a structure disposed inside the lens barrel 2. However, the first fixing member 66 and the second fixing member 67 may be formed integrally with the outer housing of the lens barrel 2.

A stopper 68 is attached to a surface of the first fixing member 66 on the supporting portion 64 side. The stopper 68 may have elasticity (cushioning characteristic). A portion of the solenoid 33 other than a part of the solenoid 33 is fixed to a surface of the second fixing member 67 on the supporting portion 64 side.

Figure 5:
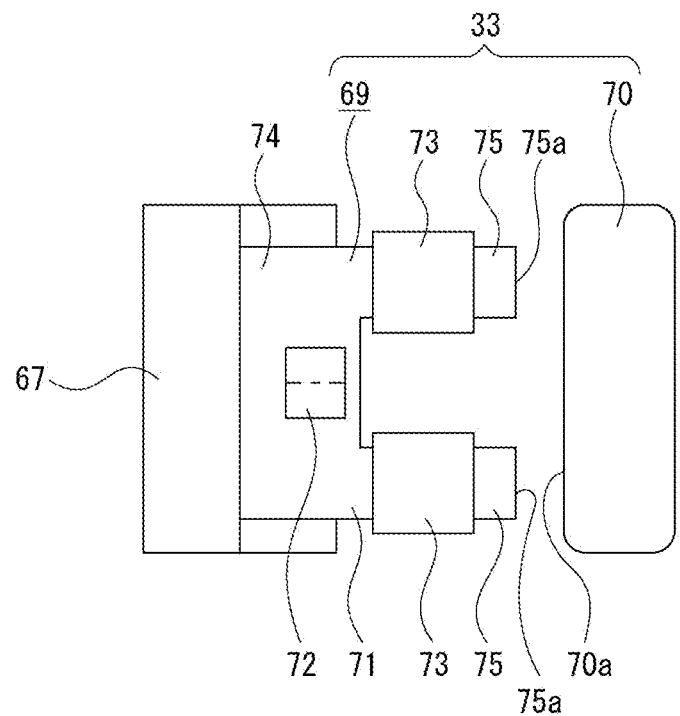
FIG. 5 is a conceptual diagram depicting the solenoid.
Figure 6:
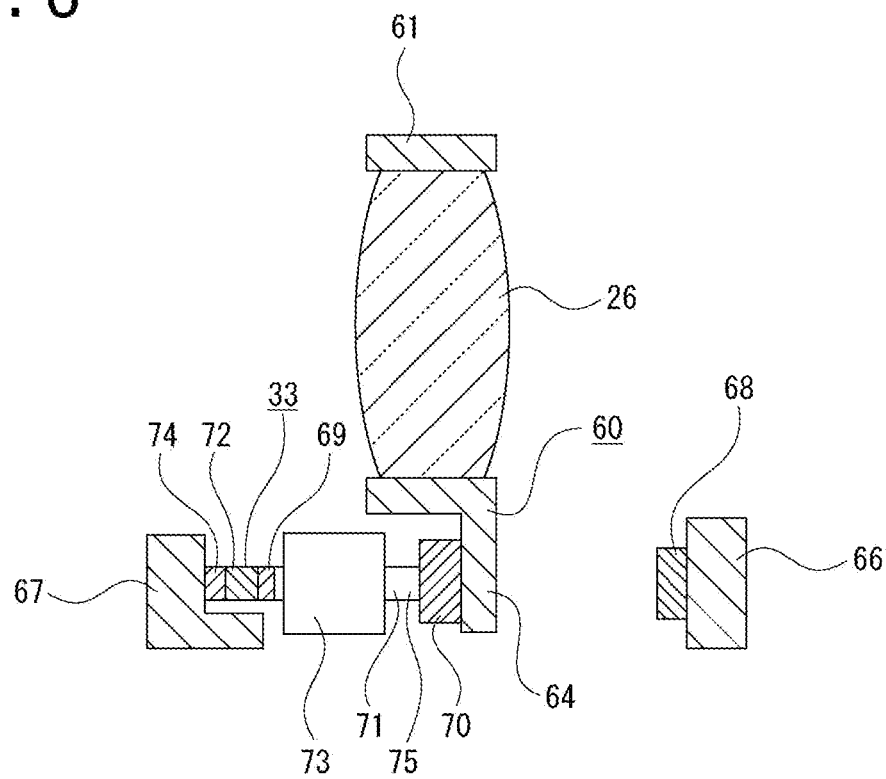
FIG. 6 is a cross-sectional diagram depicting the lens holder, the solenoid, and the like in a locked state.

The solenoid 33 includes an attracting force generation unit 69 fixed to the second fixing member 67, and an attracted portion 70 supported by the supporting portion 64 of the lens holder 60 (see FIGS. 4 and 5). The attracting force generation unit 69 of the solenoid 33 is positioned on the object side (subject side) with respect to the focus lens 26.

The attracting force generation unit 69 has a yoke 71 fixed to the second fixing member 67, a magnet 72 held by the yoke 71, and coils 73, 73 attached to the yoke 71.

The yoke 71 has a fixed portion 74 fixed to the second fixing member 67, and attracting portions 75, 75 protruding in the same direction from the fixed portion 74. The magnet 72 is held in an embedded state in the fixed portion 74. Each of the coils 73, 73 is attached to the corresponding one of the attracting portions 75, 75. Each of the attracting portions 75 has an attracting surface 75*a* having a flat surface and located on the attracted portion 70 side.

The solenoid 33 comes into a state where the attracted portion 70 is attractable by attracting force generated at the attracting force generation unit 69 in a state of no energization of the coils 73, 73. Meanwhile, when the coils 73, 73 of the solenoid 33 are energized, the attracting force generated at the attracting force generation unit 69 is cancelled. As a result, the solenoid 33 is brought into a state where the attracted portion 70 is not attractable. Note that the solenoid 33 may be configured to reduce attracting force generated at the attracting force generation unit 69 in accordance with energization of the coils 73, 73.

According to the solenoid 33, as described above, an attracting force generation state of the attracting force generation unit 69 changes in accordance with the energization state of the coils 73, 73. In addition, the attracted portion 70 is attracted toward the attracting force generation unit 69 by generated attracting force.

In a case where the attracted portion 70 is present within a fixed distance from the attracting portions 75, 75 in a state where attracting force is generated at the attracting force generation unit 69 without energization of the coils 73, 73, the attracted portion 70 is attracted by the attracting force generated at the attracting force generation unit 69. In this case, the focus lens 26 and the lens holder 60 are moved toward the attracting force generation unit 69 in the optical axis direction. Accordingly, the attracted portion 70 is attracted to the attracting portions 75, 75 and comes into contact with the attracting portions 75, 75. As a result, the lens holder 60 transits to a locked state where movement is disabled (see FIG. 6).

Meanwhile, in a state where the attracting force generated at the attracting force generation unit 69 is cancelled by energization of the coils 73, 73, the lens holder 60 comes into a movable state in the optical axis direction regardless of a distance between the attracted portion 70 and the attracting portions 75, 75. In addition, when the coils 73, 73 are energized in a state where the lens holder 60 has transited to the locked state, the attracting state produced by the attracting force generation unit 69 for the attracted portion 70 is cancelled. As a result, the lens holder 60 transits to a movable unlocked state.

A specific support structure for supporting the attracted portion 70 by the supporting portion 64 will be hereinafter described.

Figure 7:
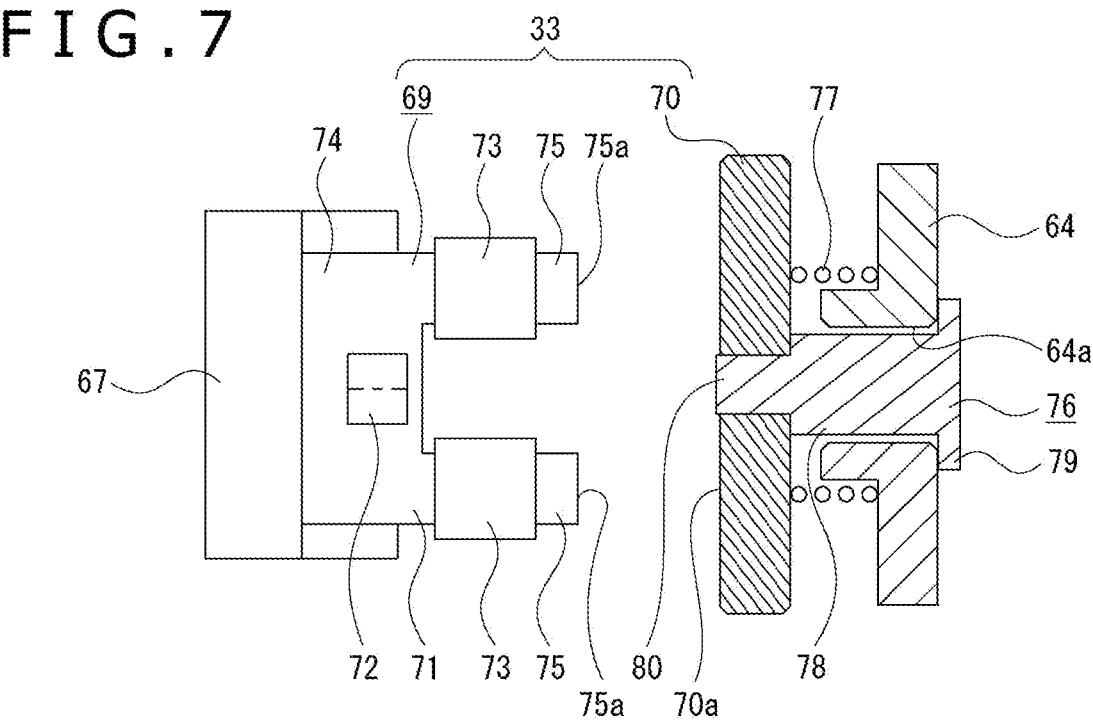
FIG. 7 is a cross-sectional diagram depicting a specific support structure and the like of an attracted portion.

The attracted portion 70 is made of a magnetic metal material such as iron, and is supported by the supporting portion 64 via an attachment shaft 76 and an elastic member 77 in a displaceable state (see FIG. 7). The attracted portion 70 has an attracted surface 70*a* having a flat surface and located on the attracting force generation unit 69 side.

An insertion hole 64*a* is formed in the supporting portion 64. The attachment shaft 76 is inserted into the insertion hole 64*a*. The attachment shaft 76 includes an insertion portion 78 having a cylindrical shaft shape, a regulated portion 79 which projects toward the outside from an end portion of the insertion portion 78 in the axial direction, and a connection shaft portion 80 protruding in the axial direction from the other end surface of the insertion portion 78 in the axial direction.

The connection shaft portion 80 of the attachment shaft 76 is connected to the attracted portion 70, and prevented from separating from the supporting portion 64 by the regulated portion 79. The insertion portion 78 has a diameter smaller than that of the insertion hole 64a. Accordingly, the attachment shaft 76 is displaceable relative to the supporting portion 64 in a direction different from the axial direction (optical axis direction).

For example, the elastic member 77 is a compression coil spring, and supported between the supporting portion 64 and the attracted portion 70. Accordingly, the attracted portion 70 is biased by the elastic member 77 in a direction toward the attracting force generation unit 69 in the axial direction of the attachment shaft 76. Moreover, the regulated portion 79 of the attachment shaft 76 is pressed by biasing force of the elastic member 77 against a surface of the supporting portion 64 on the side opposite to the side where the attracted portion 70 is positioned.

Note that the elastic member 77 is not limited to the compression coil spring, and may be other elastic members as long as they have a function for giving the attracted portion 70 biasing force in a direction away from the supporting portion 64 in the axial direction of the attachment shaft 76, such as rubber and a flat spring.

Figure 8:
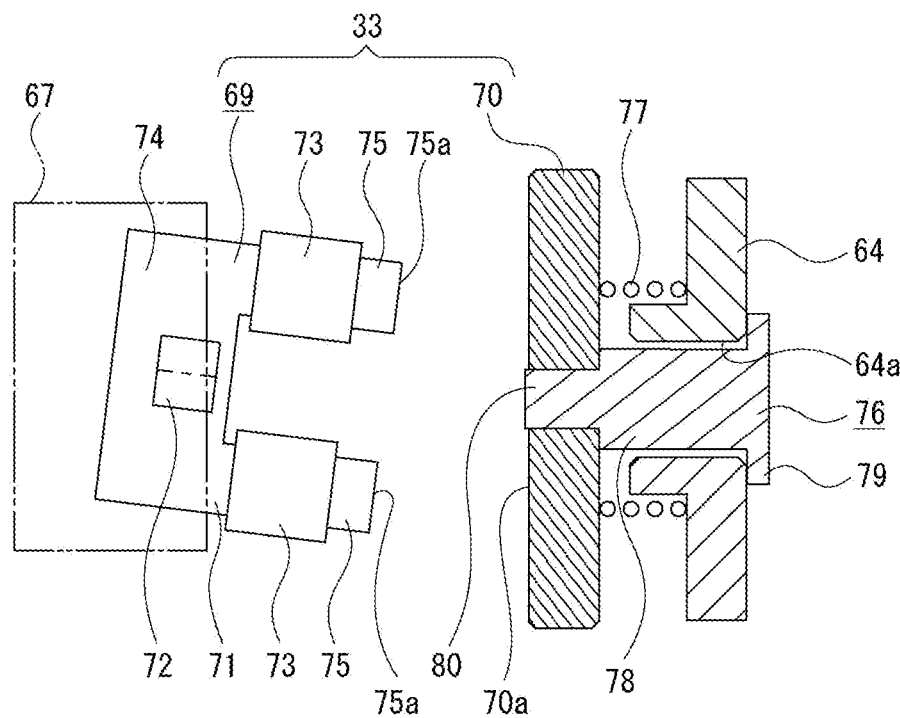
FIG. 8 is a cross-sectional diagram depicting a state before the attracted portion is attracted to an attracting force generation unit in a case where a yoke is attached to a second fixing member in an inclined state.
Figure 9:
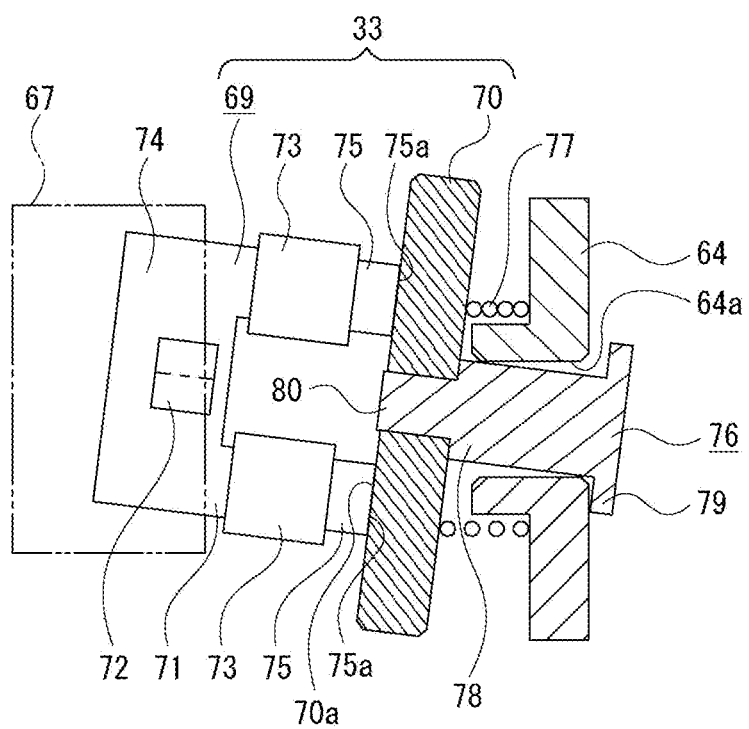
FIG. 9 is a cross-sectional diagram depicting a state where the attracted portion is attracted to the attracting force generation unit in the case where the yoke is attached to the second fixing member in the inclined state.

As described above, the yoke 71 of the attracting force generation unit 69 is attached to the second fixing member 67 in the solenoid 33. In this case, there is a possibility that the yoke 71 is attached in a state inclined with respect to the second fixing member 67, depending on accuracy of attachment of the yoke 71 to the second fixing member 67, respective part tolerances, or the like (see FIG. 8). Note that FIG. 8 depicts an exaggerated inclination angle of the yoke 71 with respect to the second fixing member 67 for easy understanding (same applies to the following figures).

According to this configuration, when the attracted portion 70 is present within a fixed distance from the attracting portions 75, 75 in a state where attracting force is generated at the attracting force generation unit 69 without energization of the coils 73, 73, the attracted portion 70 is attracted by the attracting force generated at the attracting force generation unit 69. In this case, the attachment shaft 76 and the attracted portion 70 are displaced (inclined) relative to the supporting portion 64 (see FIG. 9). In other words, because the attracted portion 70 is drawn in such a manner as to be attracted toward both the attracting portions 75, 75, the attachment shaft 76 and the attracted portion 70 are displaced relative to the supporting portion 64 in accordance with the inclination angle of the yoke 71 with respect to the second fixing member 67.

Accordingly, the attracted surface 70a of the attracted portion 70 is attracted in a state of surface contact with each of the attracting surfaces 75a, 75a of the attracting portions 75, 75, and therefore a contact area of the attracted portion 70 with the attracting force generation unit 69 is allowed to increase in a state where the attracted portion 70 is attracted to the attracting force generation unit 69. As a result, a stable locked state of the solenoid 33 for the lens holder 60 can be reliably achieved.

Moreover, the elastic member 77 for biasing the attracted portion 70 in the direction toward the attracting force generation unit 69 is provided between the lens holder 60 and the attracted portion 70. In this case, the attracted portion 70 supported by the lens holder 60 is biased in the direction toward the attracting force generation unit 69, and is constantly maintained at a fixed position of the supporting portion 64. Accordingly, the attracted portion 70 displaced relative to the lens holder 60 can be reliably attracted by using the attracting force generation unit 69.

[2-2 Modification of Support Structure of Attracted Portion]

Figure 10:
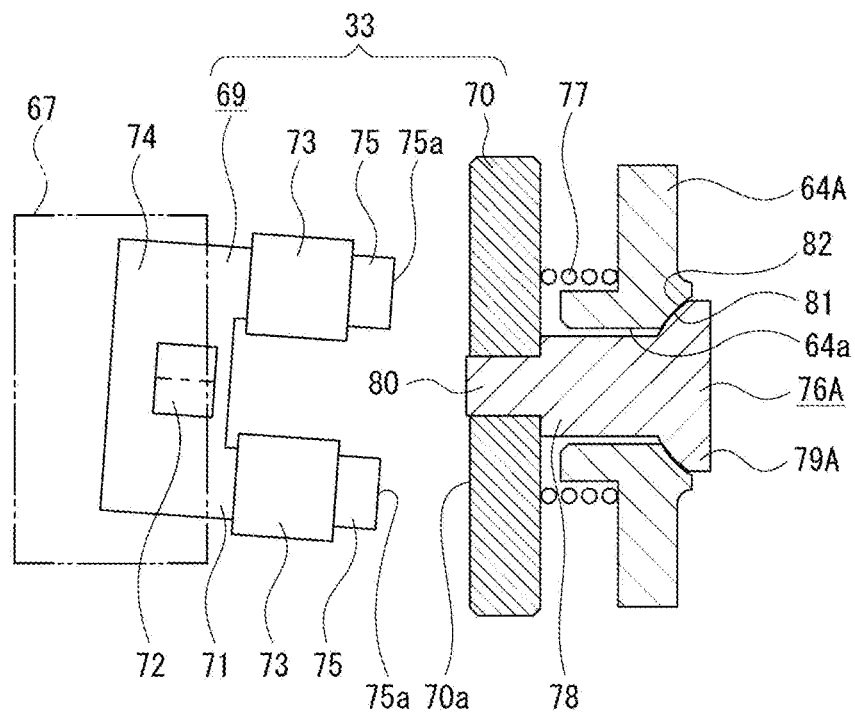
FIG. 10 is a cross-sectional diagram depicting a state before the attracted portion is attracted to the attracting force generation unit in the case where the yoke is attached to the second fixing member in the inclined state, and in a configuration which includes a supporting portion having a recessed surface and an attachment shaft having a protruding surface.

A modification of the support structure of the attracted portion 70 will be subsequently described (see FIGS. 10 and 11).

As described above, the attracted portion 70 is supported in a displaceable state by the supporting portion 64 via the attachment shaft 76. In this case, the supporting portion 64 and the attachment shaft 76 may be replaced with a supporting portion 64A and an attachment shaft 76A having the following shapes, respectively (see FIG. 10).

The supporting portion 64A has a recessed surface 81 formed at an opening edge of the insertion hole 64a on the side opposite to the attracted portion 70. The recessed surface 81 is formed at the entire opening edge of the insertion hole 64a, and has an annular shape extending in the circumferential direction.

The attachment shaft 76A includes the insertion portion 78, a regulated portion 79A, and the connection shaft portion 80. The regulated portion 79A of the attachment shaft 76A has a protruding surface 82. The protruding surface 82 is formed at a position continuing from the insertion portion 78, and has an annular shape extending in the circumferential direction. Curvature of the protruding surface 82 is equal to or larger than curvature of the recessed surface 81. The protruding surface 82 is protruding toward the recessed surface 81 to face the recessed surface 81 in a state where the attachment shaft 76A is inserted into the insertion hole 64a of the supporting portion 64A.

In a state where the insertion portion 78 of the attachment shaft 76A is inserted into the insertion hole 64a, the protruding surface 82 is pressed against the recessed surface 81 by biasing force of the elastic member 77, and is brought into a slidable state on the recessed surface 81.

Figure 11:
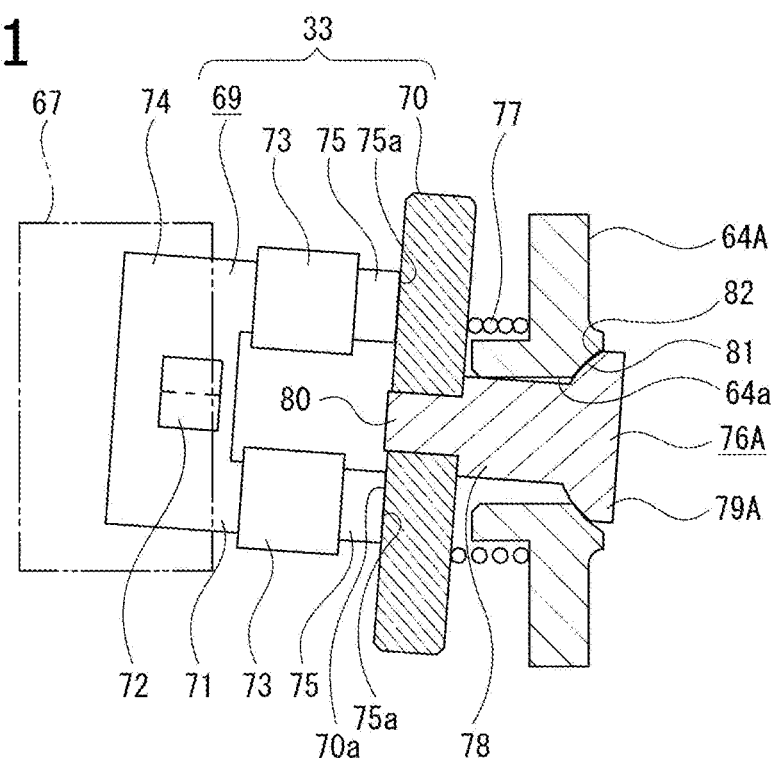
FIG. 11 is a cross-sectional diagram depicting a state where the attracted portion is attracted to the attracting force generation unit in the case where the yoke is attached to the second fixing member in the inclined state, and in the configuration which includes the supporting portion having the recessed surface and the attachment shaft having the protruding surface.

According to the configuration described above, in a case where the yoke 71 is attached to the second fixing member 67 in an inclined state, the attachment shaft 76A and the attracted portion 70 are displaced (inclined) relative to the supporting portion 64A when the attracted portion 70 is drawn by attracting force generated at the attracting force generation unit 69 (see FIG. 11). At this time, the attachment shaft 76A is displaced relative to the supporting portion 64A in accordance with sliding of the protruding surface 82 on the recessed surface 81. The attracted surface 70a of the attracted portion 70 is attracted to each of the attracting surfaces 75a, 75a of the attracting portions 75, 75 in a state of surface contact. As a result, the lens holder 60 transits to the locked state.

As described above, the lens holder 60 has the recessed surface 81 having a curved surface shape, while the attachment shaft 76A has the protruding surface 82 having a curved surface shape. In this configuration, the protruding surface 82 having a curved surface shape slides on the recessed surface 81 having a curved surface shape when the attracted portion 70 is displaced relative to the lens holder 60. Accordingly, a displacement action of the attracted portion 70 for the lens holder 60 can be smoothly achieved.

Moreover, in the configuration of the lens holder 60 which has the recessed surface 81 having a curved shape, and the attachment shaft 76A which has the protruding surface 82 having a curved shape, a part of the supporting portion 64A and a part of the attachment shaft 76A constantly come into contact with each other at the time of displacement of the attracted portion 70. Accordingly, no backlash is produced in the attachment shaft 76A for the supporting portion 64A at the time of displacement of the attracted portion 70. Accordingly, the displacement action of the attracted portion 70 for the lens holder 60 can be more smoothly achieved.

While described above has been the example of the lens holder 60 which has the recessed surface 81 having a curved surface shape, and the attachment shaft 76A which has the protruding surface 82 having a curved surface shape, an inclined surface having a flat surface shape and inclined in the axial direction of the insertion hole 64a may be formed instead of the recessed surface 81 to allow the protruding surface 82 to slide on this inclined surface. Moreover, a protruding surface having a curved surface shape may be formed instead of the recessed surface 81, and an inclined surface having a flat surface shape and inclined in the axial direction of the attachment shaft 76A may be formed instead of the protruding surface 82. In this case, the inclined surface of the attachment shaft 76A may be configured to slide on the protruding surface of the lens holder 60.

[2-3 Examples of Arrangement Position of Focus Lens Drive Unit]

Respective examples of an arrangement position of the solenoid 33 will be subsequently described (see FIGS. 4, 12, and 13).

The lens barrel 2 may be configured such that the solenoid 33 is positioned on the object side (subject side) in the optical axis direction with respect to the focus lens 26 (see FIG. 4). In such a configuration, the lens holder 60 can be locked at a movable end on the object side by using the solenoid 33.

In addition, when the supporting portion 64 of the lens holder 60 comes into contact with the stopper 68 attached to the first fixing member 66 in accordance with movement of the lens holder 60 toward the image side, the movement of the lens holder 60 is stopped by the stopper 68. In this case, the lens holder 60 is held at the movable end on the image side to regulate excessive movement toward the image side.

Generally, the lens barrel 2 has a larger diameter at an end on the object side than a diameter at an end on the image side. Accordingly, when placed on a desk or the like, the lens barrel 2 is often placed in a state where the object side is located below the image side so as to reliably achieve a stable placing state. Moreover, when suspended with a suspension belt, a strap, or the like, the lens barrel 2 is often handled by a user in a state where the object side is located below the image side.

Accordingly, by adopting the configuration where the solenoid 33 is positioned on the object side and is allowed to lock the lens holder 60 at the movable end on the object side, a frequency that the lens holder 60 is moved toward the object side by its own weight and is locked by the solenoid 33 increases. As a result, generation of abnormal noise, and generation of vibration causing discomfort and transmitted in a state where the lens barrel 2 is held can be efficiently prevented.

However, while the example of the configuration where the solenoid 33 is positioned on the object side has been presented above, the lens barrel 2 may be configured such that the solenoid 33 is positioned on the image side.

Figure 12:
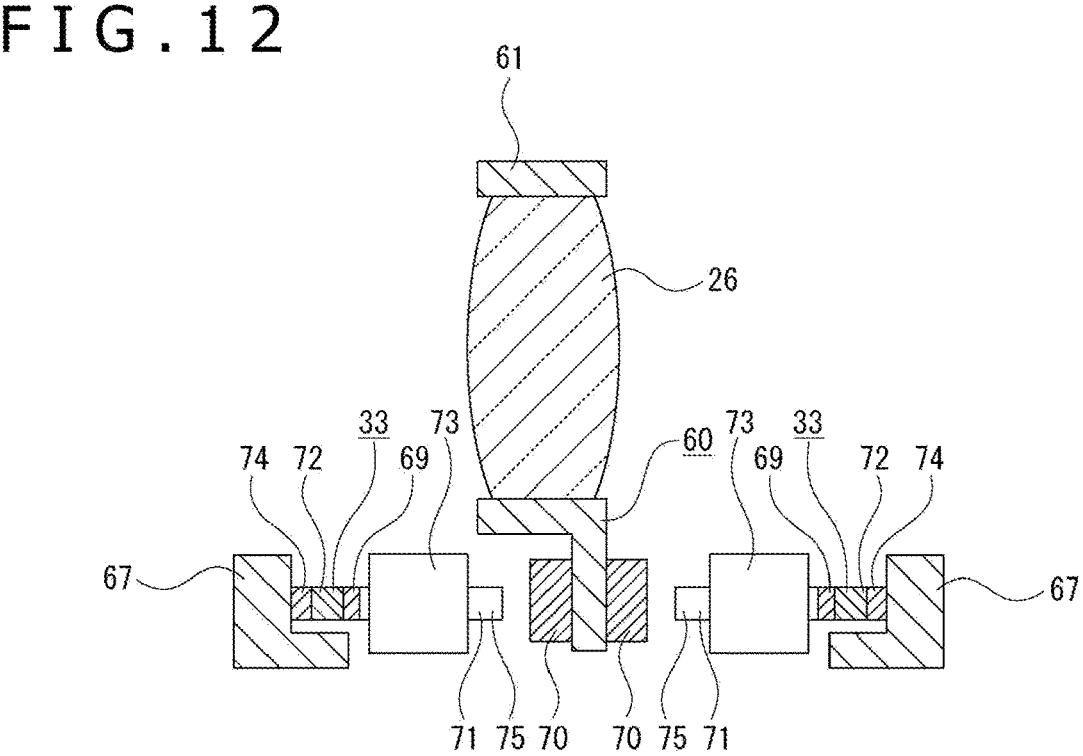
FIG. 12 is a cross-sectional diagram depicting an example of a configuration where the solenoid is disposed on each of the object side and the image side.

Moreover, the lens barrel 2 can be configured such that the solenoid 33 is positioned on each of the object side and the image side in the optical axis direction with respect to the focus lens 26 (see FIG. 12). In such a configuration, the lens holder 60 can be locked at movable ends on both the object side and the image side by using the solenoids 33.

In the configuration where the solenoids 33 are positioned on the object side and the image side and are allowed to lock the lens holder 60 at the movable ends on both the object side and the image side, the lens holder 60 is locked at the corresponding movable end in either of directions of movement in the optical axis direction. Accordingly, generation of abnormal noise and generation of vibration causing discomfort can be more efficiently prevented.

Figure 13:
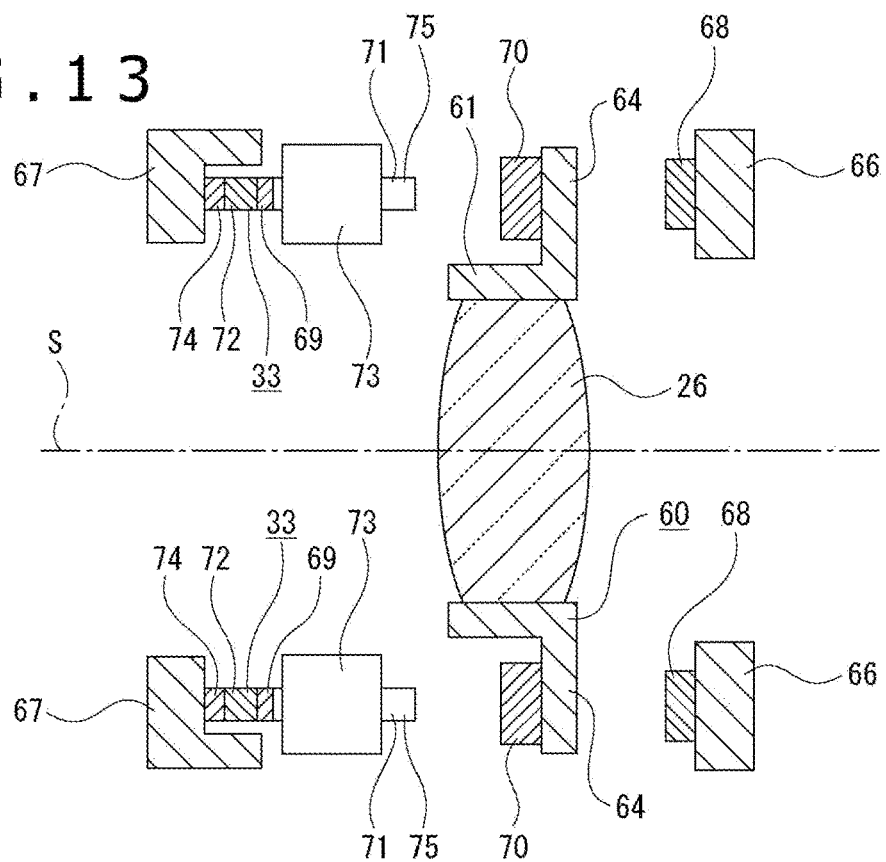
FIG. 13 is a cross-sectional diagram depicting an example of a configuration where the solenoids are disposed on opposite sides with an optical axis interposed between the solenoids.

Furthermore, the lens barrel 2 can be configured such that the solenoids 33 are positioned on the opposite sides with an optical axis S interposed between the solenoids 33 (see FIG. 13). In such a configuration, the lens holder 60 can be locked at the movable end on the object side by the two solenoids 33, 33. Note that the two supporting portions 64, 64 for supporting the attracted portions 70, 70, respectively, are provided on the lens holder 60 in a case where the two solenoids 33, 33 are provided.

In the configuration where the two solenoids 33, 33 are positioned on the opposite sides with the optical axis S interposed between the solenoids 33, 33 and are allowed to lock the lens holder 60 at the movable end on the object side, the lens holder 60 is locked on the opposite sides with respect to the optical axis S. Accordingly, a stable locked state of the lens holder 60 can be reliably achieved by the solenoids 33, 33.

While the example of the configuration where the solenoids 33, 33 on the object side are positioned on the opposite sides with the optical axis S interposed between the solenoids 33, 33 has been described, the lens barrel 2 can be configured such that the solenoids 33, 33 on the image side are positioned on the opposite sides with the optical axis S interposed between the solenoids 33, 33. Moreover, the lens barrel 2 can be configured such that the solenoids 33, 33 on the image side are positioned on the opposite sides with the optical axis S interposed between the solenoids 33, 33, and that the solenoids 33, 33 on the image side are similarly positioned on the opposite sides with the optical axis S interposed between the solenoids 33, 33.

Furthermore, while the examples where the one or two solenoids 33 are disposed on the object side or the image side have been described above, the number of the solenoids 33 may be any number. The three or more solenoids 33 may be disposed on the object side or the image side.

3. ACTION OF ESCAPE AND ATTRACTION

Attraction and escape of the lens holder 60 with use of the solenoid 33 will be described.

Figure 14:
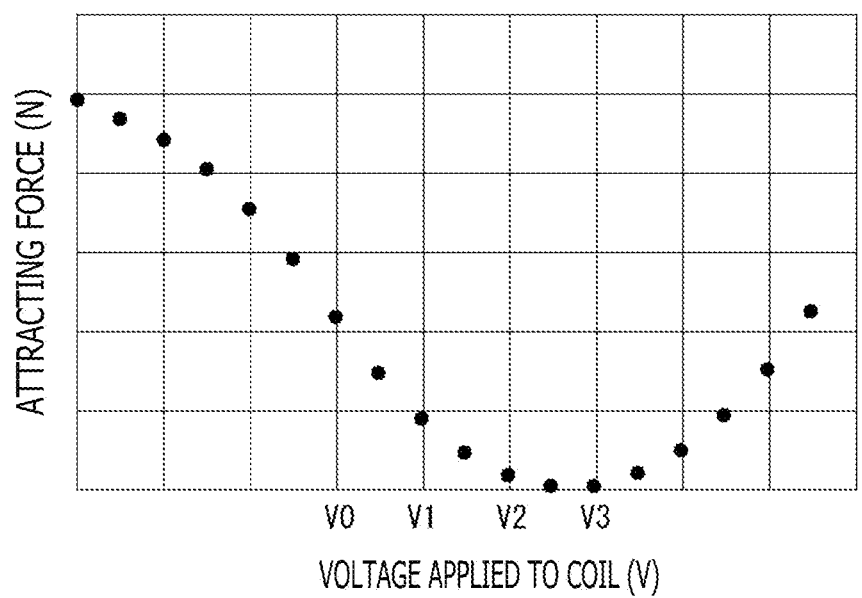
FIG. 14 is an explanatory diagram depicting a relation between voltage applied to the solenoid and attracting force.

FIG. 14 illustrates a relation between voltage applied to the solenoid 33 and attracting force. Current is applied to the coils 73 to generate magnetic force for the yoke 71 in a direction opposite to magnetic force generated by the magnet 72. In this manner, attraction power generated by the magnet 72 and applied from the solenoid 33 can be reduced or eliminated.

Note herein that the attracting force changes in a manner illustrated in FIG. 14 in accordance with voltage applied to cause current to flow in the coils 73. In other words, it is recognizable that attracting force of the solenoid 33 can be reduced or eliminated in accordance with applied voltage.

For example, at the time of execution of escape described hereinbelow, escape from a movement regulated state produced by attraction can be facilitated by eliminating attraction power with application of voltage V3.

FIGS. 15 to 20 depict various action states produced by the configuration described above with reference to FIG. 4.

Each of the figures includes "ON" and "OFF" of the focus actuator. These indicate whether or not a VCM or the like functioning as the focus lens drive unit 45 is in a driven state.

"ON" and "OFF" of the solenoid 33 indicate whether or not the coils 73 are energized. Specifically, "OFF" indicates a non-energized state where attracting force is applied by magnetic force generated by the magnet 72, while "ON" indicates an energized state where attracting force is reduced or eliminated.

Figure 15:
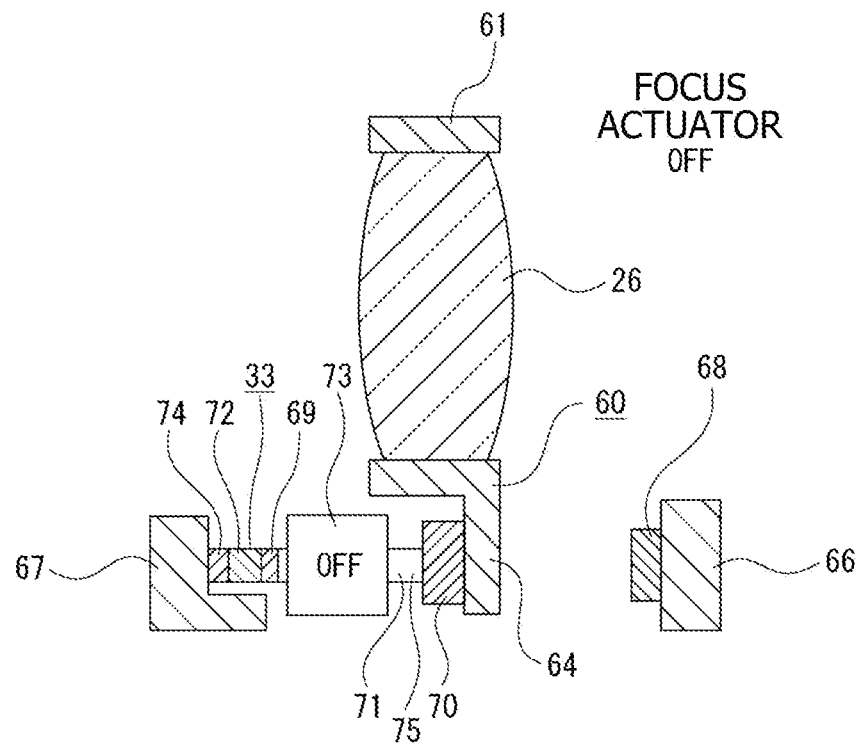
FIG. 15 is an explanatory diagram depicting an initial state according to the embodiment.

FIG. 15 depicts an initial state.

In this case, the attracted portion 70 attached to the lens holder 60 is attracted by magnetic force to the yoke 71 of the solenoid 33 attached to the second fixing member 67. Accordingly, the lens holder 60 is held in the movement regulated state.

In a case where an instruction of focus lens movement is issued, the lens holder 60 starts moving by an action of the focus lens drive unit 45.

Figure 16:
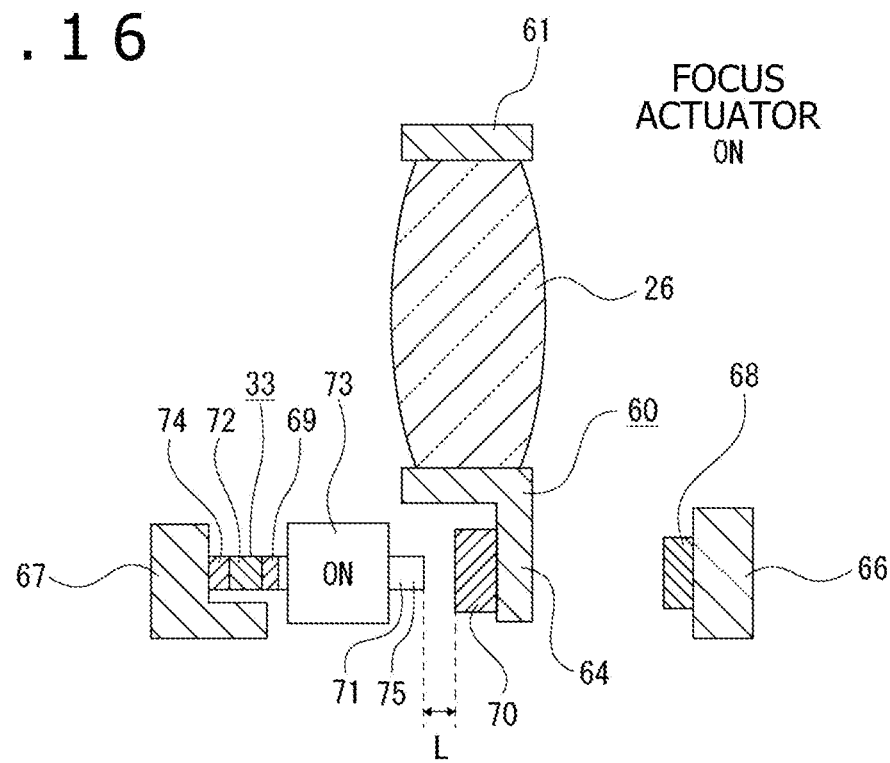
FIG. 16 is an explanatory diagram depicting a course of an escape action from a locking mechanism according to the embodiment.

However, it is not an efficient manner to obtain sufficient force exceeding the attracting force only by thrust of the focus lens drive unit 45. Accordingly, the solenoid 33 is energized simultaneously with a start of movement achieved by the focus lens drive unit 45 to reduce or eliminate the attracting force. FIG. 16 depicts a state of separation from the contact state produced by attraction.

The attracting force more sharply lowers as a distance L between the attracted portion 70 and the yoke 71 increases.

It is assumed that a distance where the attracting force is at an ignorable level in comparison with the thrust of the focus lens drive unit 45 is "L0."

Figure 17:
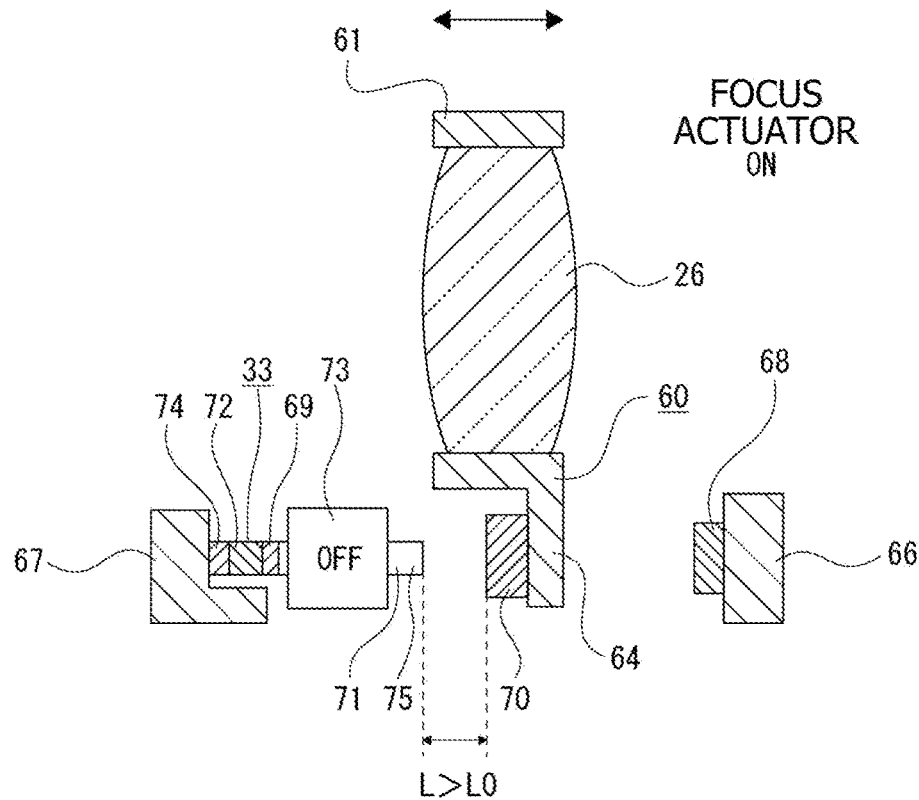
FIG. 17 is an explanatory diagram depicting a state during lens driving according to the embodiment.

FIG. 17 depicts a state where the distance L between the attracted portion 70 and the yoke 71 is longer than the distance L0. At the time of such a state, movement of the lens holder 60 is not affected by attraction power generated by stopping energization of the coils 73.

Accordingly, in the state of FIG. 17, driving control can be performed in a manner similar to driving control of an ordinary focus lens mechanism having no locking mechanism.

Note that the lens control unit 22 monitors the position of the focus lens 26 (lens holder 60) as necessary by using the lens position sensor. Accordingly, the lens control unit 22 can determine that the distance L has reached a state of L>L0.

Figure 18:
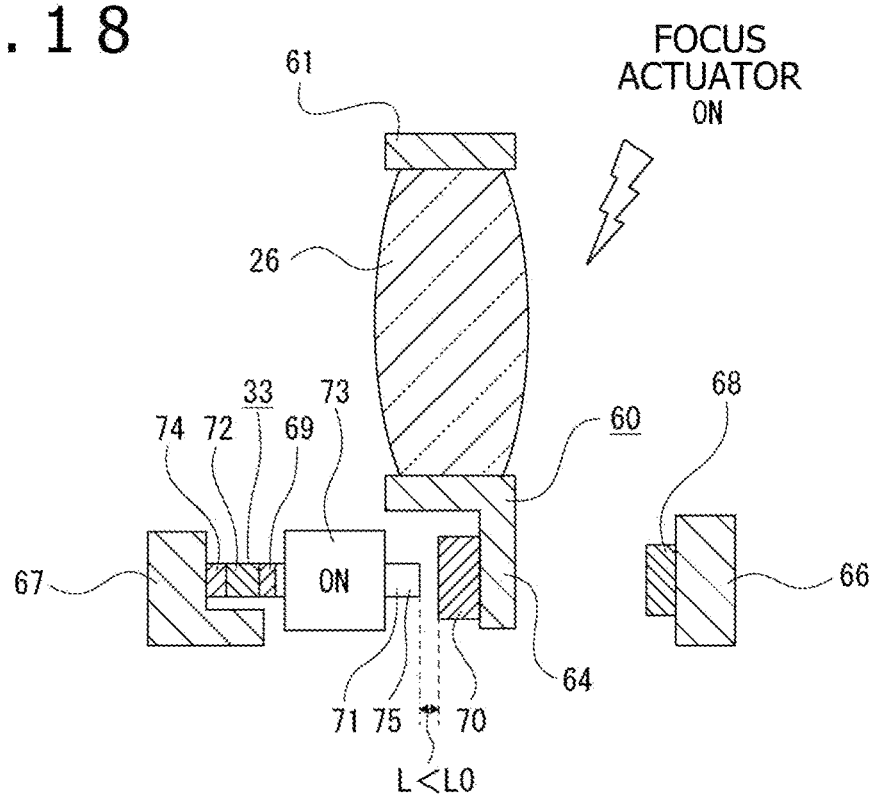
FIG. 18 is an explanatory diagram depicting an effect of a disturbance during lens driving according to the embodiment.

FIG. 18 depicts a state where the position of the lens holder 60 has been unintentionally moved to a position corresponding to L<L0 by an intensive disturbance or the like applied to the lens holder 60 when the focus lens 26 is driven normally during an imaging action. The coils 73 are not energized in a normal state. Accordingly, the lens holder 60 is affected by attraction power in this state.

In a case where this state is produced, it is appropriate to immediately energize the coils 73 and eliminate substantially the entire attracting force and also drive the moving lens group by using the focus lens drive unit 45 such that the distance L becomes L>L0.

Figure 19:
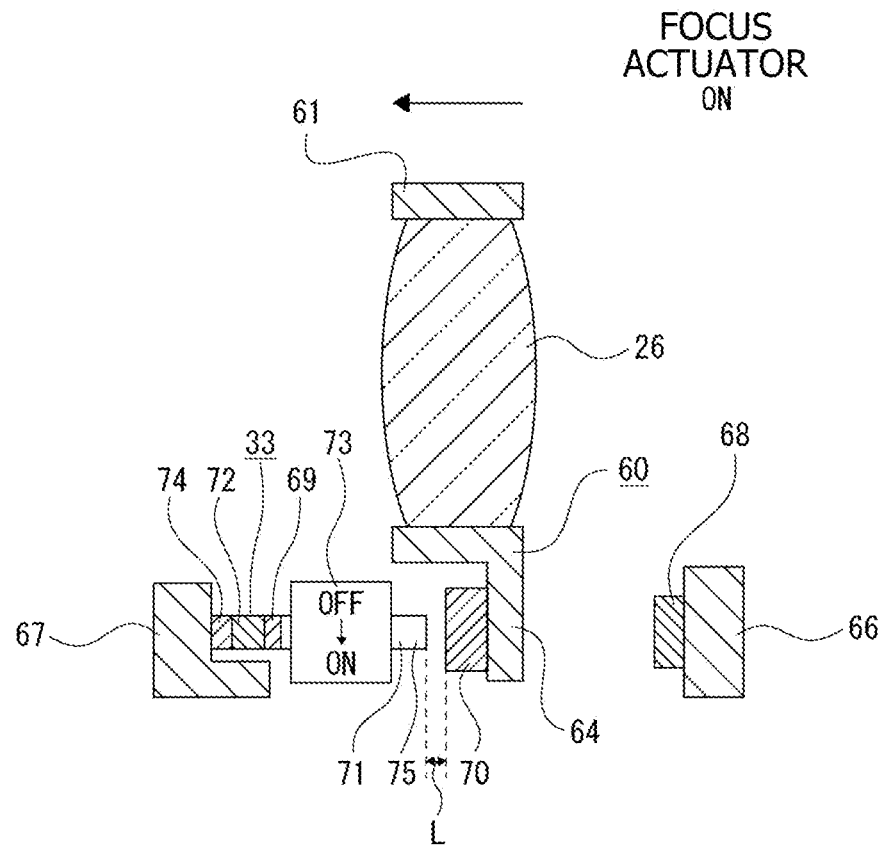
FIG. 19 is an explanatory diagram depicting an end state of lens driving according to the embodiment.

FIG. 19 depicts a driving end time of the focus lens 26 achieved by power off of the camera system 1, for example.

When an end process is started, the lens holder 60 is present at a position where the distance L becomes L>L0.

Moreover, the focus lens drive unit 45 is energized at this time, and energization of the coils 73 is stopped.

In this case, the position of the lens holder 60 is moved by using the focus lens drive unit 45 in a direction where the distance L becomes L=0.

At this time, energization of the coils 73 is started when the distance L becomes L=L0.

In a case where the distance L becomes substantially 0, energization of the focus lens drive unit 45 and the coils 73 is stopped. The yoke 71 and the attracted portion 70 of the solenoid 33 come into contact with each other to achieve attraction. Accordingly, the lens holder 60 is brought into a state held by the second fixing member 67.

Figure 20:
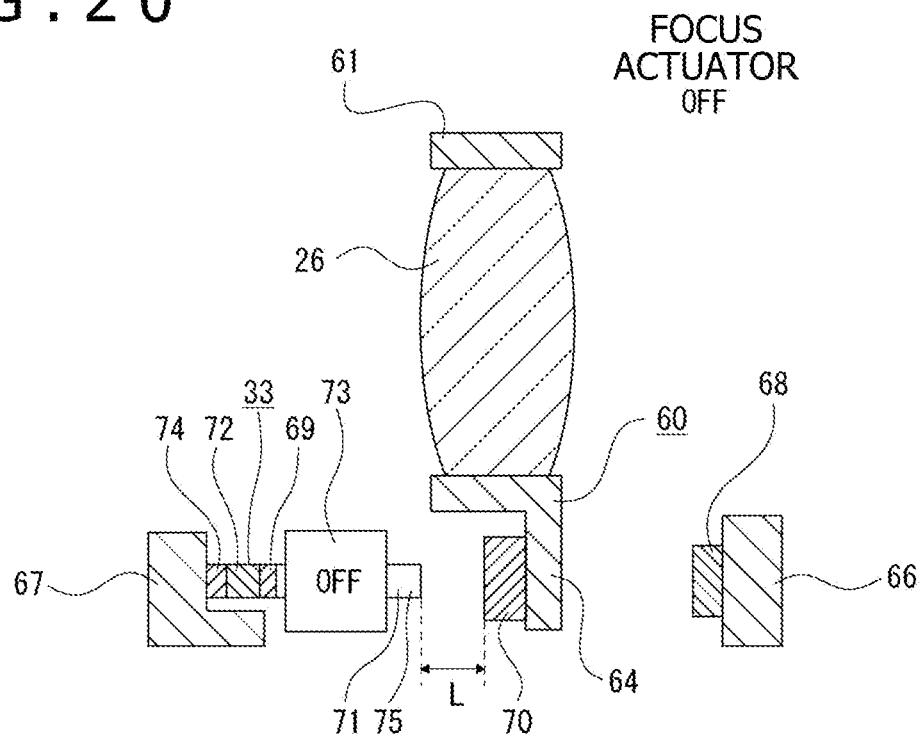
FIG. 20 is an explanatory diagram depicting a state at power cutoff during lens driving according to the embodiment.

FIG. 20 depicts a case where power supply is unintentionally cut off during driving of the focus lens 26 for a certain reason such as removal of a battery and removal of the lens barrel 2.

Energization of the focus lens drive unit 45 and the coils 73 is stopped.

The distance L between the attracted portion 70 and the yoke 71 becomes unknown. However, the lens holder 60 is allowed to move forward and backward by its own weight.

In a case of movement of the lens holder 60 by its own weight, the distance L becomes L=0, and the yoke 71 and the attracted portion 70 of the solenoid 33 come into contact and achieve attraction. Accordingly, the lens holder 60 is brought into a state held by the second fixing member 67. In other words, even during sudden power cutoff, the movement regulated state is achieved once the lens holder 60 is moved to the movable end by its own weight.

Figure 21:
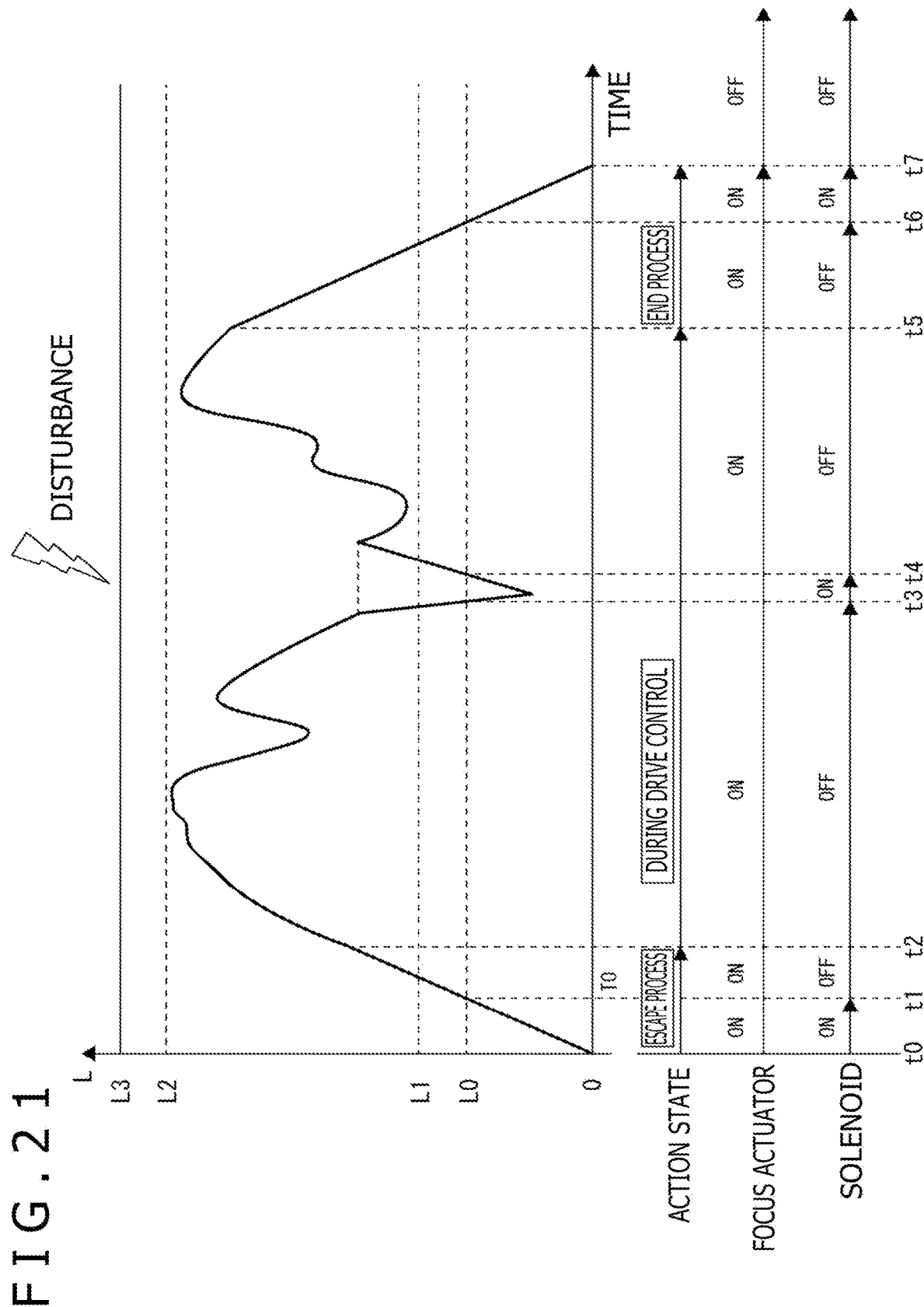
FIG. 21 is an explanatory diagram depicting an example of state transitions from startup to ending according to the embodiment.

FIG. 21 depicts an example of transitions between the various states described above.

A horizontal axis represents time, while a vertical axis represents the distance L. In the figure, L=0 represents a state where the yoke 71 and the attracted portion 70 come into contact and achieve attraction. In other words, a state where the lens holder 60 is present at one of the movable ends is indicated. In addition, "L0" is a limit distance of reach of attracting force as described above, while "L3" represents a distance up to the other mechanical movable end.

It is assumed that a moving range for focus control (focus control range) is a range from "L1" to "L2."

A track of lens movement is indicated by a solid line in the figure using the vertical axis and the horizontal axis defined as above.

Moreover, an action state, an energization state of the focus actuator (focus lens drive unit 45), and an energization state of the solenoid 33 are also illustrated in a lower part of the figure. Specifically, "ON" represents an energized state, while "OFF" represents a non-energized state.

A time point t0 represents an initial state. For performing an escape action from this initial state, movement of the lens holder 60 is started by using the focus lens drive unit 45, and the solenoid 33 is energized.

When the distance L reaches L=L0 at a time point t1, energization of the solenoid 33 is ended.

At the time of excess of the distance L1, the focus control range starts. For example, the escape action is ended at a time point t2, and a drive state under normal focus control hereinafter starts.

It is assumed that the distance in a state of L<L0 is produced by a disturbance in a period between time points t3 and t4. At this time, the lens holder 60 is returned to the focus control range by driving the focus lens drive unit 45 while energizing the solenoid 33.

At a time point t5, an end action is started by power off or other operations.

After the time point t5, the lens holder 60 is moved by the focus lens drive unit 45 in a direction toward the solenoid 33. This is an attraction preparation process described below.

At a time point t6, energization of the solenoid 33 is started to perform an attraction process described below.

After the movement regulated state is achieved by attraction, energization of the focus lens drive unit 45 and the solenoid 33 is stopped at a time point t7. In this manner, the movement regulated state achieved by attraction is maintained after power off.

4. ESCAPE FROM MOVEMENT REGULATED STATE

The escape process performed by the solenoid 33 for escaping from the movement regulated state will be hereinafter described in detail.

There are chiefly the following two occasions when the escape process from the movement regulated state is to be performed.
- at the time of lens startup (hereinafter referred to as startup)
- at the time of return from unnecessary attraction caused by external shock during the imaging action (hereinafter referred to as return)

Note that the period "during the imaging action" includes not only a period of one frame for recording a still image, but also a period of display of a through-the-lens image on the display unit 19 for recording a still image, a period of imaging and recording a moving image, and the like. Accordingly, the period "during the imaging action" indicates at least a period when imaging is performed as photoelectric conversion by the imaging element 16. Moreover, the period "during the imaging action" may be considered as a period in an action mode state where still image recording or moving image recording is enabled even in a state without display of a through-the-lens image.

Figure 22:
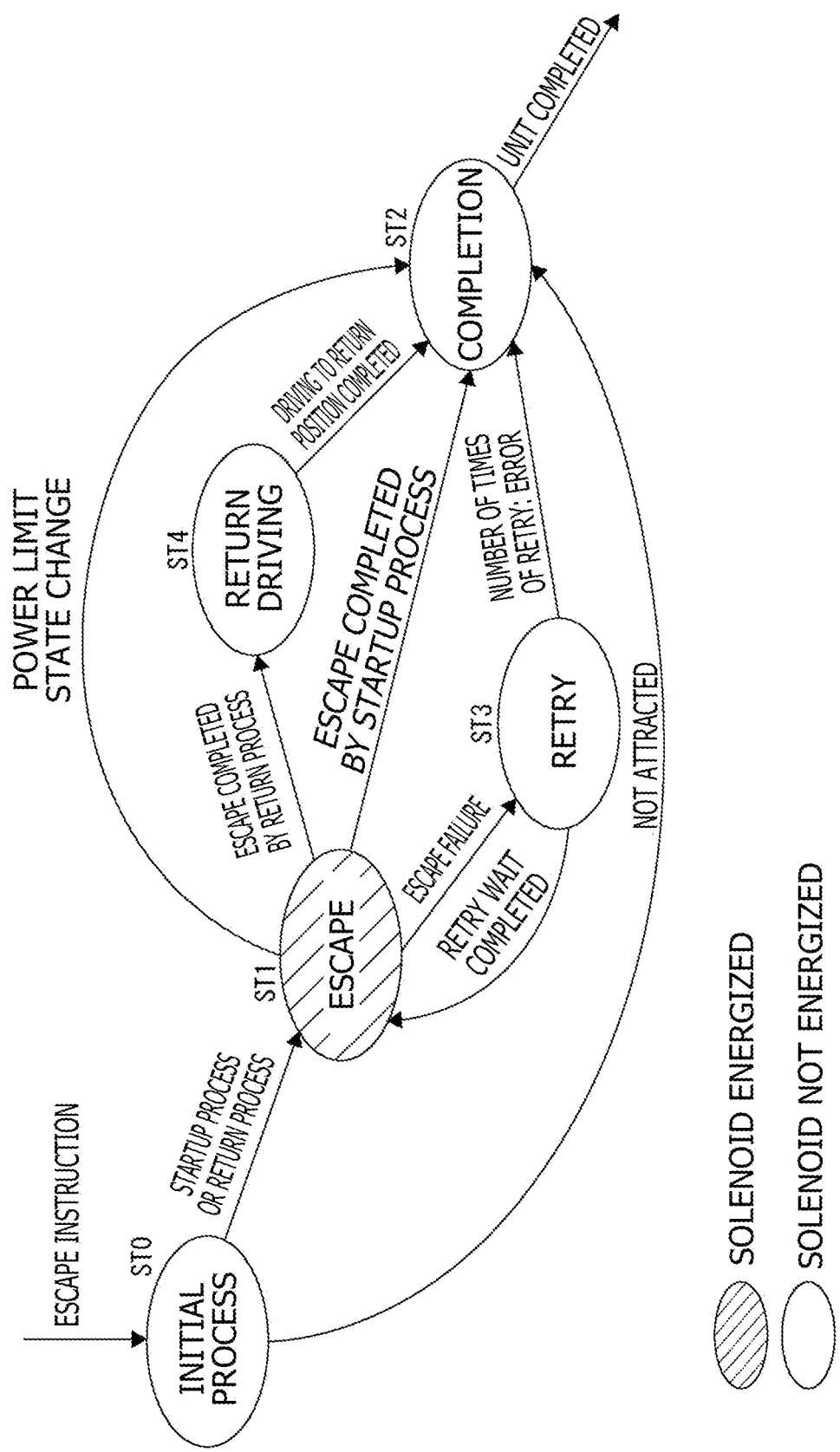
FIG. 22 is an explanatory diagram depicting transitions of an escape process according to the embodiment.

FIG. 22 depicts state transitions in the escape process at the time of startup and return described above. These are transitions of processing performed by the focus actuator control module (hereinafter abbreviated as "control module 5") in accordance with an escape instruction issued from the actuator management module 4 in FIG. 2.

When an escape instruction is issued, the control module 5 performs an initial process (ST0).

The initial process performs processing such as sequence acquisition and internal variable initialization, and determines whether or not the current state is an attracted state.

If attraction is not achieved, the escape action is unnecessary. Accordingly, the process transits to a completed state (ST2). For example, this is a case where the movement regulated state is already canceled at the startup for some reasons. Useless execution of the escape action is avoidable by determining whether or not the current state is the attracted state and deciding whether to perform the escape process.

Normally, the initial process (ST0) subsequently transits to the escape process (ST1).

At the time of startup, the process transits to the completed state (ST2) after completion of escape in the escape process (ST1). Thereafter, a driving state under normal focus control starts.

At the time of return, the process transits to return driving (ST4) after completion of escape in the escape process (ST1). This return driving (ST4) is an action for driving the focus lens to a position (return position) immediately before the movement regulated state produced by a disturbance or the like. When the focus lens reaches the return position, the current state shifts to the completed state (ST2). Thereafter, the driving state under normal focus control starts.

Failure in escape may be caused even after execution of the escape process (ST1) at the time of startup or return. In this case, the process shifts to a retry state (ST3) to wait for a certain period. When a retry wait is completed after the waiting, the escape process (ST1) is again executed.

There may be a transition to the completed state (ST2) with interruption of the escape action during execution of the escape process (ST1). This is a case where a power limit instruction is issued during the escape action.

There may be a case where an instruction of a power consumption limit is issued to the lens control unit 22 via communication from the body control unit 12. As described below, timing of issuing an instruction of escape is originally adjusted in a case where a power limit instruction is issued during startup or return. However, in a case where a power limit instruction is given after a start of the escape action, the escape action may be interrupted and ended.

Described with reference to FIGS. 23 to 27 will be a specific processing example performed by the lens control unit 22 (control module 5) on an assumption that the foregoing transitions depicted in FIG. 22 are achieved.

Figure 23:
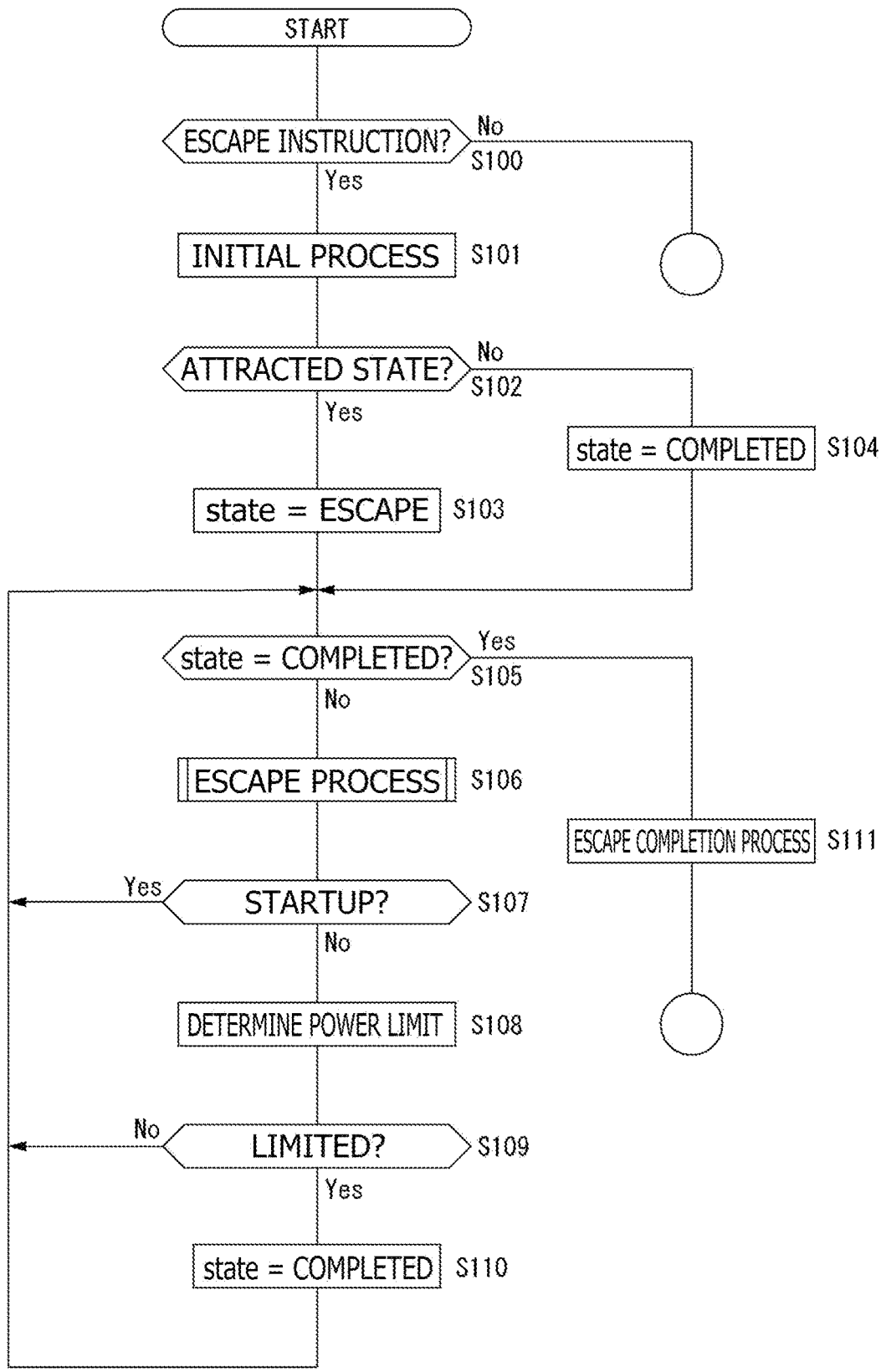
FIG. 23 is a flowchart of a process example during escape according to the embodiment.

In step S100 in FIG. 23, the control module 5 checks an escape instruction issued from the actuator management module 4. In a case where an escape instruction is issued, the control module 5 advances the process to step S101 and the following steps.

In step S101, the control module 5 performs the initial process. For example, the control module 5 acquires a sequence and initializes internal variables.

In step S102, the control module 5 checks whether or not the current state is an attracted state, i.e., a movement regulated state. This checking can be achieved on the basis of the current position of the lens holder 60.

If the current state is not the attracted state, the control module 5 determines "state," which is a variable indicating the state, as "state=completed" in step S104.

If the current state is the attracted state, the control module 5 determines "state=escape" in step S103.

In step S105, the control module 5 checks whether or not "state=completed" is determined. If "state=completed" is determined, the control module 5 determines that the escape process is completed in step S111, and ends control of a series of escape actions.

For example, even in a case where an escape instruction is issued at the time of startup or return, "state=completed" is determined in step S104 when the current state is not determined to be the attracted state. In this case, the process proceeds from step S105 to step S111, and an end process is performed to complete the action. In the end process, the control module 5 issues a completion notification to the actuator management module 4, and initializes flags and variables, for example.

If "state=completed" is not determined in step S105, the control module 5 advances the process to step S106 to perform the escape process. The escape process in step S106 includes an escape process at the time of startup, an escape process including return driving at the time of return, and an escape process as a retry.

The escape process in step S106 is repeated until "state=completed" is determined in step S105 after completion of processing in step S107 and the following steps.

In a case of an escape instruction at the time of startup, the control module 5 returns from step S107 to step S105, and repeats processing in step S106 until "state=completed" is determined.

In a case of an escape instruction at the time of return, the control module 5 advances the process from step S107 to step S108 to determine whether or not a power limit instruction has been issued at that time via communication from the body control unit 12.

If an instruction of a power limit is not issued, the control module 5 returns the process from step S109 to step S105. Thereafter, the control module 5 repeats processing in step S106 if "state=completed" is not determined.

If an instruction of a power limit is issued, the control module 5 determines "state=completed" in step S110.

Accordingly, the process proceeds from step S105 to step S111 to end control of a series of escape actions. This is a case where the escape process is interrupted and ended in accordance with an issue of a power limit instruction in the middle of the escape process.

Note that the process is interrupted and ended in such a manner at the time of return.

In the escape process at the time of startup, processing in steps S108, S109, and S110 is not performed. Accordingly, the process is not interrupted even when power limit determination is made in the middle of the escape process.

Figure 24:
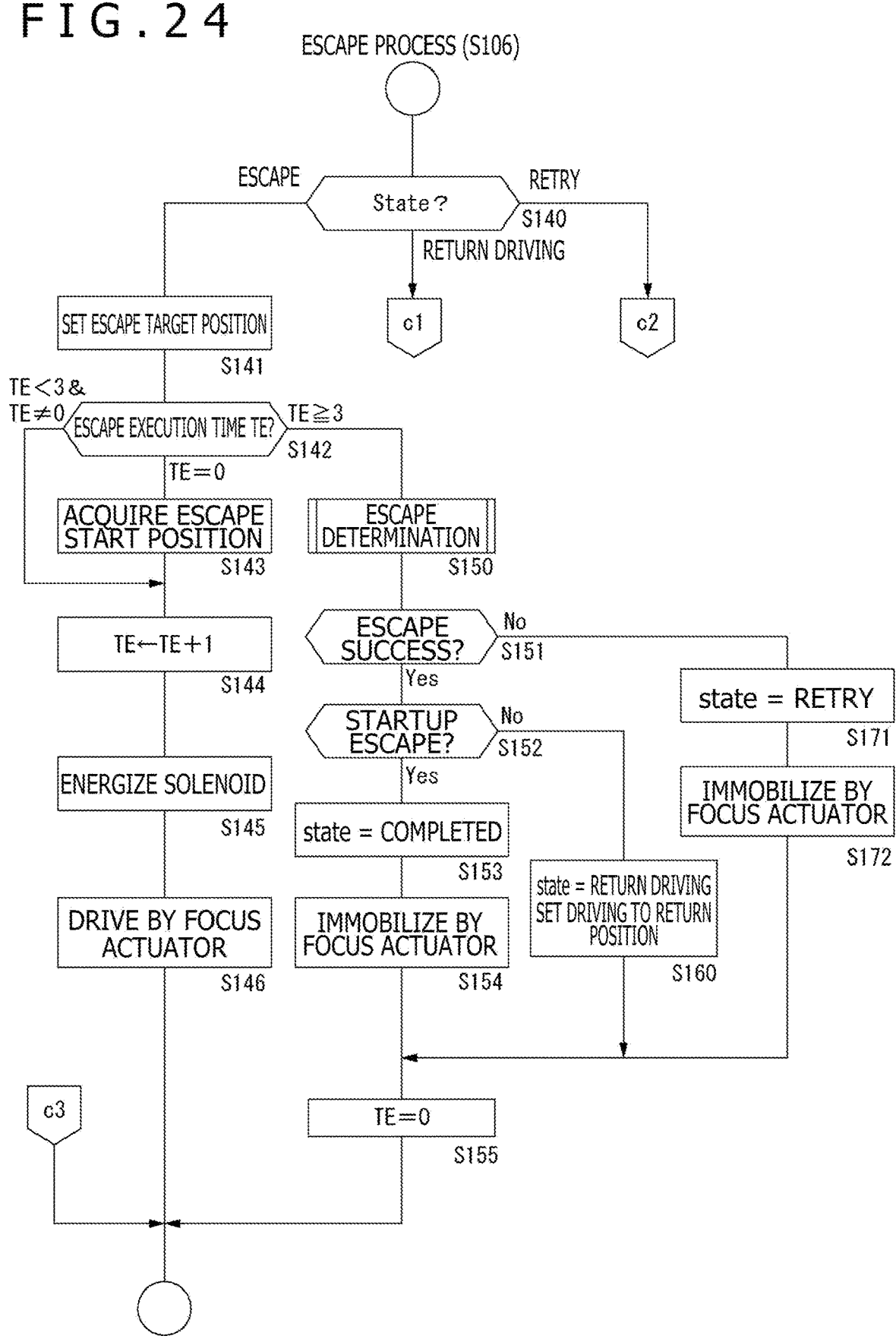
FIG. 24 is a flowchart of an escape process according to the embodiment.

The escape process in step S106 is illustrated in FIG. 24.

Initially, the control module 5 branches the process on the basis of the current state in step S140. In a case where "state=escape" is determined in step S103 in FIG. 23, the process proceeds to step S141 and the following steps in FIG. 24.

In step S141, the control module 5 sets an escape target position. For example, the escape target position is set at a position between the distance L1 and the distance L2 in FIG. 21. Alternatively, the escape target position may be set at a position away from the solenoid 33 by the distance L0 or longer.

In other words, the escape target position is only required to be a position exceeding at least a range of reach of attraction power of the solenoid 33.

In step S142, the process is branched in accordance with a count value of an escape execution time TE indicating an execution time of the escape action.

The escape execution time TE is initialized in the initial process (step S101 in FIG. 23), and is set to 0 at the beginning.

In this case, the control module 5 acquires an escape start position in step S143. Specifically, this is a position of the lens holder 60 at the time of a start of escape.

Subsequently, the control module 5 increments the escape execution time TE in step S144, cancels locking of the locking mechanism in step S145, i.e., energizes the solenoid 33, and performs focus actuator drive control in step S146. In this manner, driving by the focus lens drive unit 45 is executed in a state where attracting force is reduced or eliminated to start movement of the lens holder 60 in an escaping direction.

Thereafter, processing in step S141 and the following steps in the process illustrated in FIG. 24 is performed as long as "state=escape" continues.

At the second and subsequent times, the setting of the escape target position in step S141 is already completed. Accordingly, the process proceeds to step S142 to branch the process in accordance with the count value of the escape execution time TE.

It is assumed in this example that escape is achieved by continuing focus lens driving for a certain fixed period. For example, it is assumed that escape is carried out by continuing the driving until the escape execution time TE reaches 3.

Note that continuation of the driving until the escape execution time TE reaches 3 is presented only by way of example for explanation. In actual situations, the driving continuation period should be designated in accordance with a distance to the escape target position, a driving amount for one timing period of the focus lens drive unit 45, or the like.

Alternatively, also adoptable is such control which continues the driving while monitoring a detection value of the focus lens position sensor.

However, energization of the solenoid 33 can be limited to a fixed time by managing the continuation time of the escape action on the basis of the escape execution time.

In the case of the example in FIG. 24, when the escape execution time TE is "1" of "2," the control module 5 increments the escape execution time TE in step S144, energize the solenoid 33 in step S145, and continues the focus actuator driving control in step S146. In other words, driving in the escaping direction by using the focus lens drive unit 45 is continued in a state where the attracting force is reduced or eliminated.

When the escape execution time TE reaches 3, the control module 5 advances the process from step S142 to step S150 to make escape determination.

Figure 25:
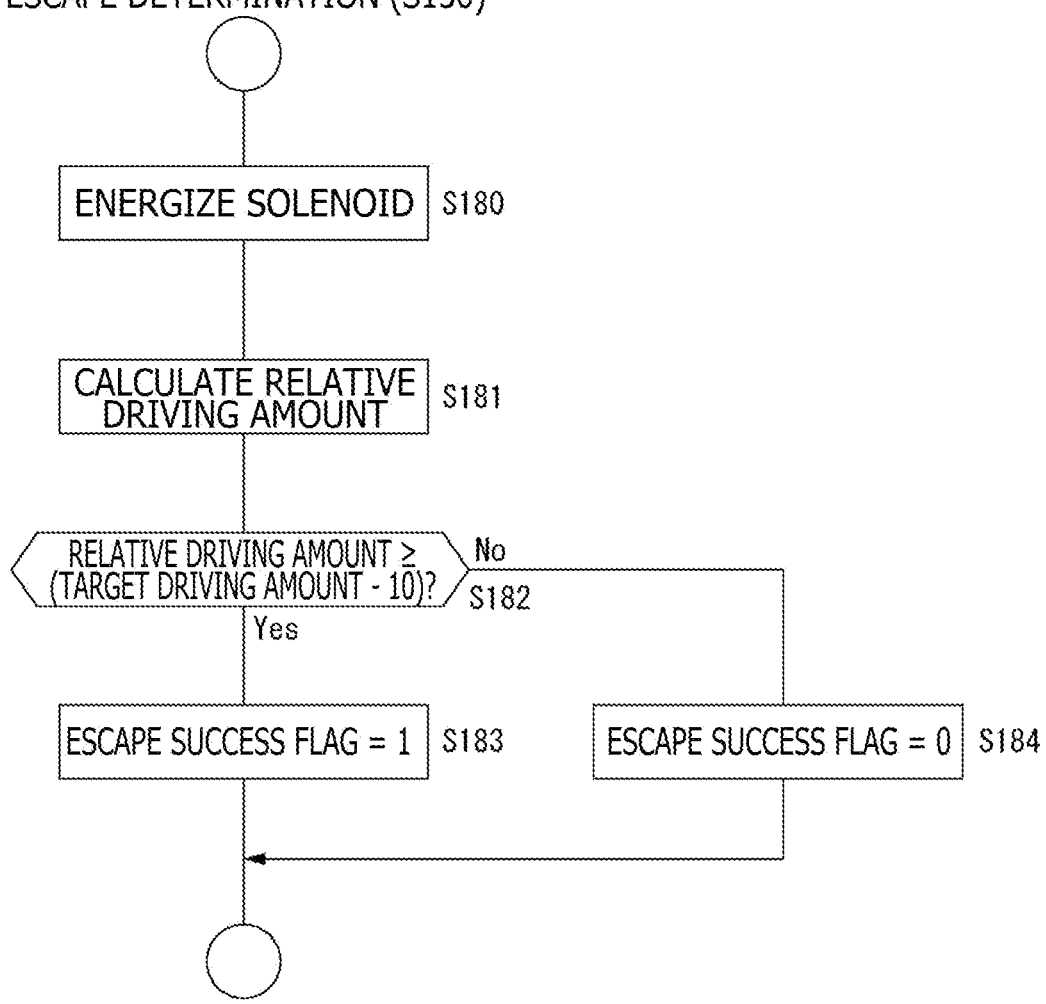
FIG. 25 is a flowchart of an escape determination process according to the embodiment.

FIG. 25 illustrates a process example of the escape determination.

In step S180, the control module 5 ends energization of the locking device, i.e., the solenoid 33.

In step S181, the control module 5 calculates a relative driving amount. Specifically, calculated is a difference between a current position of the lens holder 60 and the escape start position acquired in step S143.

The escape determination is checked on the basis of only an actual driving amount. However, the actual driving amount includes an error of several micrometers. Accordingly, the control module 5 checks whether or not the relative driving amount is larger than (target driving amount −10 μm) in step S182.

The target driving amount is a difference between the escape target position set in step S141 and the escape start position acquired in step S143.

Specifically, the control module 5 checks whether or not a driving amount larger than (target driving amount −10 μm) has been actually obtained by driving in the escaping direction achieved by the focus lens drive unit 45. If this driving amount is obtained, an escape success flag is set to 1 in step S183 on the basis of determination that escape has been completed.

On the other hand, if the driving amount is smaller than (target driving amount −10 μm), the escape success flag is set to 0 in step S184 on the basis of determination of failure in escape.

After the escape determination is made in the manner described above with reference to FIG. 25, the control module 5 advances the process to step S151 in FIG. 24 to branch the process in accordance with a value of the escape success flag.

In a case where failure in escape is determined on the basis of the escape success flag set to 0, "state=retry" is determined in step S171, and the lens holder 60 moved by the focus lens drive unit 45 is immobilized in step S172.

In a case where success in escape is determined on the basis of the escape success flag set to 1, the control module 5 advances the process to step S152 to branch the process on the basis of whether the current escape is escape at the time or startup or at the time of return.

In a case of startup, "state=completed" is determined in step S153, and the lens holder 60 moved by the focus lens drive unit 45 is immobilized in step S154.

In a case of return, "state=return driving" is determined in step S160.

In addition, the escape execution time TE is reset to 0 in step S155 in either of these cases.

In the case of escape at the time of startup, "state=completed" is determined in step S153. Accordingly, the following processing in steps S107, S105, and S111 in FIG. 23 is performed to complete the escape action. For performing the end process in step S111, the control module 5 issues a completion notification to the actuator management module 4, and initializes flags and variables, for example.

On the other hand, in the case of escape at the time of return, "state=completed" is not yet determined in the following processing in FIG. 23. Accordingly, the process proceeds to step S106 to perform processing in FIG. 24. However, "state=return driving" is determined in this case. Accordingly, the process proceeds to processing for return driving in FIG. 26 as indicated by "c1" in the figure.

In step S131, the control module 5 determines completion of return. In this case, it is determined whether or not the current position has reached a position before generation of unnecessary attraction by comparing a position of the lens holder 60 immediately before generation of the unnecessary attraction and the current position.

If return is not completed, the control module 5 advances the process to step S132 to check whether or not the current state is a state during normal driving.

In this case, a case where the current state is not a state during normal driving corresponds to a case where a driving error has been caused.

If the current state is a state during normal driving, the control module 5 continues driving by the focus lens drive unit 45 in step S135.

Subsequently, the process returns to FIG. 24 as indicated by "c3," and proceeds from step S106 to step S107 in FIG. 23.

Thereafter, the process proceeds to step S131 in FIG. 26 again by processing in step S106. Accordingly, after startup of processing for return driving, the control module 5 sequentially determines completion of return while continuing driving by the focus lens drive unit 45.

When completion of return is determined in step S131 at a certain time point, the control module 5 determines "state=completed" in step S133, and immobilizes the lens holder 60 moved by the focus lens drive unit 45 in step S134.

Accordingly, the process proceeds from subsequent step S105 to step S111 in FIG. 23, where the end process is performed to complete the escape action at the time of return. In this case, the focus lens is returned to a state at the position immediately before generation of unnecessary attraction caused by a disturbance or the like.

Figure 26:
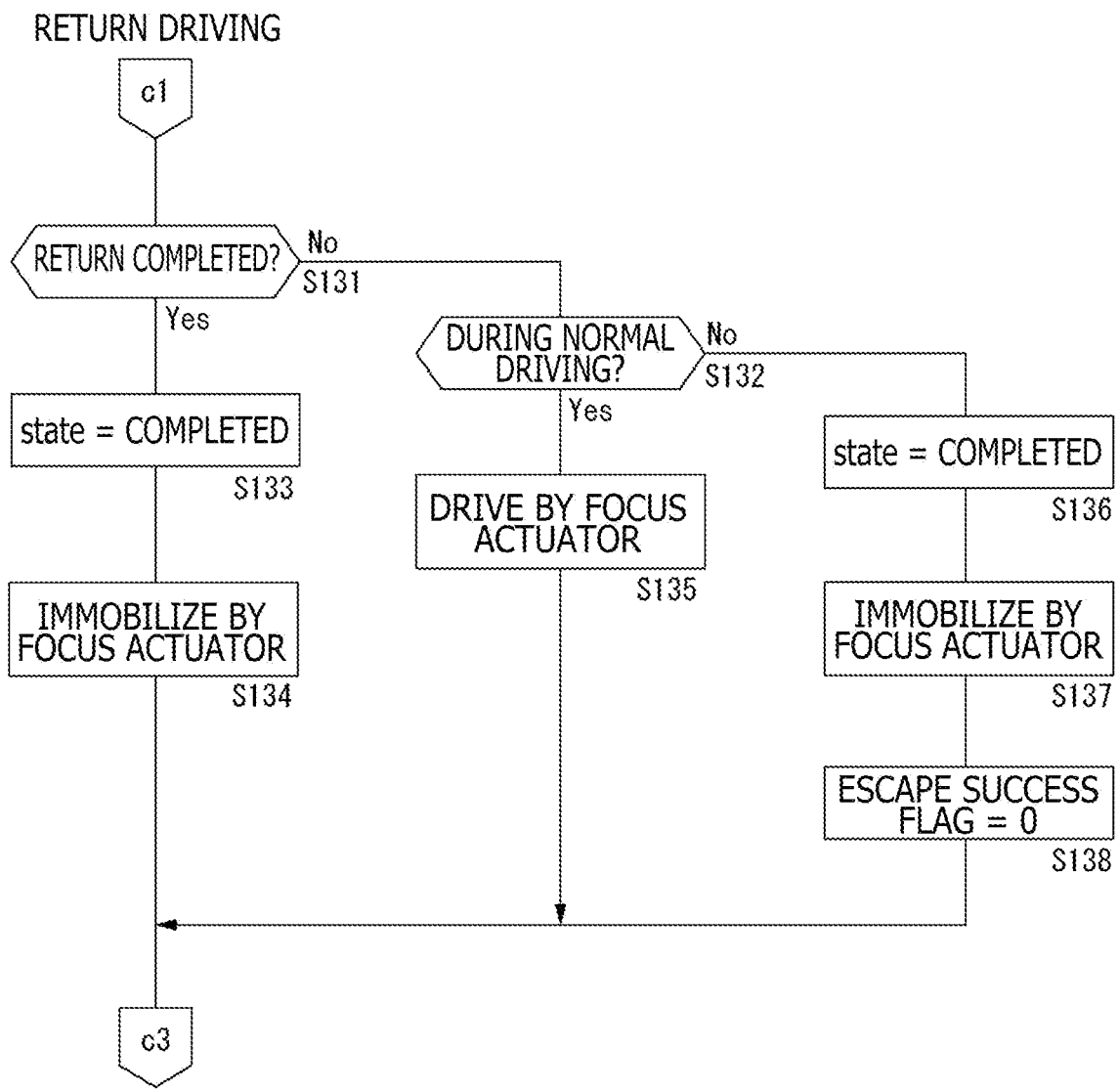
FIG. 26 is a flowchart of a return driving process according to the embodiment.

In a case where a driving error has been caused during return driving, the control module 5 advances the process from step S132 to step S136 in FIG. 26, and determines "state=completed," and then immobilizes the lens holder 60 moved by the focus lens drive unit 45 and also sets "escape success flag=0 (failure)" in step S137.

In this case, however, the process proceeds from step S105 to step S111 in FIG. 23 on the basis of "state=completed" to complete the escape action.

In a case where the escape action is completed in a state of failure in escape as described above, an escape instruction is again issued from the actuator management module 4 to restart the processing in FIG. 23.

Figure 27:
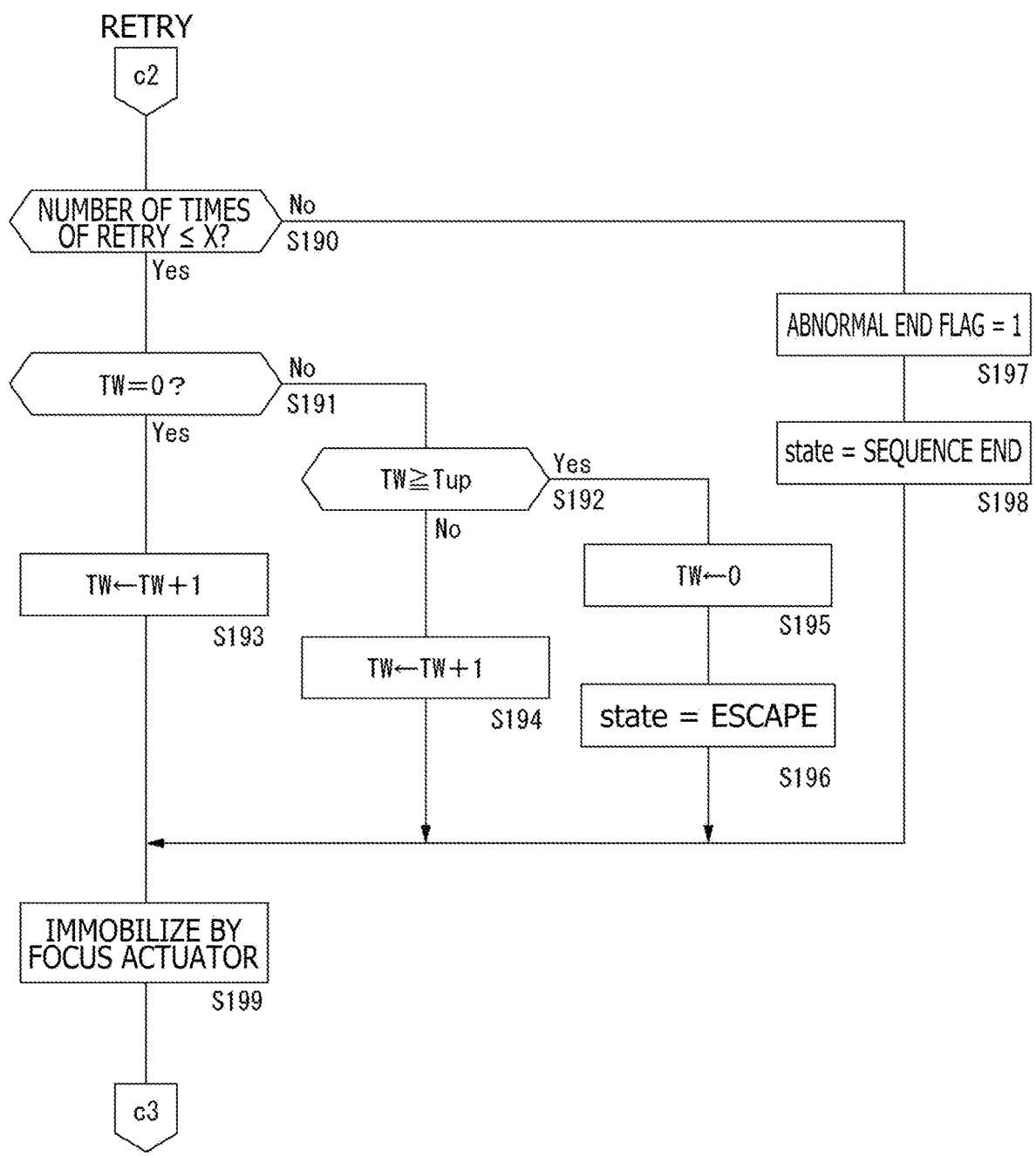
FIG. 27 is a flowchart of a retry process according to the embodiment.

After "state=retry" is determined in step S171 in FIG. 24 as described above, the process performed in step S106 in FIG. 24 proceeds from S140 to step S190 in FIG. 27 as indicated by "c2."

In step S190, the control module 5 determines whether or not the number of times of retry is an upper limit value X or smaller.

If the number of times of retry is the upper limit value X or smaller, the control module 5 determines a retry wait time TW in steps S191 and S192.

Initially, "retry wait time TW=0" is given. Accordingly, the control module 5 advances the process to step S193 to increment the retry wait time TW. Thereafter, the control module 5 returns the process to FIG. 24 as indicated by "c3" after immobilizing the lens holder 60 at the position at that time in step S199, or while maintaining this immobilized state, and advances the process from step S106 to step S107 in FIG. 23.

Thereafter, the process in step S106 again proceeds to step S191 in FIG. 27. In this case, "retry wait time TW=0" is not set, and therefore the process proceeds to step S192 to determine whether or not the retry wait time TW has reached a time-up Tup.

If the retry wait time TW does not reach the time-up Tup, the control module 5 increments the retry wait time TW in step S194, and continues driving by the focus lens drive unit 45 in step S199.

If the retry wait time reaches the time-up Tup at a certain time point, the control module 5 advances the process from step S192 to step S195, resets the retry wait time TW, and determines "state=escape" in step S196. Thereafter, the control module 5 returns the process to FIG. 24 as indicated by "c3" while maintaining the immobilized state of the lens holder 60 moved by the focus lens drive unit 45 in step S199 to perform the process in FIG. 23.

On the basis of determination of "state=escape," the escape process illustrated in step S141 to step S155 in FIG. 24 is performed in subsequent step S106. In other words, an escape action as retry is executed.

In a case where "state=retry" is determined on the basis of failure in escape after the escape action as described above, an escape action is again performed in a similar escape process after an elapse of a fixed wait time in the process in FIG. 27.

Note that the fixed wait time is provided in accordance with a count of the retry wait time TW before performing the escape action as retry to avoid long-term continuation of energization of the solenoid 33. In such a manner, heat generation from the solenoid 33 can be reduced.

Moreover, in a case where the number of times of retry exceeds the upper limit value X in step S190 in FIG. 27, the control module 5 determines that the sequence is abnormally ended while setting "abnormal end flag=1" in step S197. Thereafter, "state=sequence end" is determined in step S198.

In this case, the lens control unit 22 notifies the body control unit 12 of an abnormal end.

Note that the setting of the upper limit value X of the number of times of retry should be determined on the basis of design. However, this control may be changed in accordance with the number of times of retry.

For example, as depicted in FIG. 14, the attracting force varies in accordance with voltage applied to the solenoid 33. Accordingly, adoptable is such control which changes the applied voltage for each execution of retry and decreases the attracting force.

For example, the applied voltage is set to voltage V0 in FIG. 14 in the normal escape process other than retry, and is set to voltage V3 during retry.

Alternatively, the applied voltage may be set to voltage V1 for the first retry, V2 for the second retry, and V3 for the third retry, for example.

In such a manner, power consumption can be reduced as much as possible.

Moreover, adoptable is such an example which changes the voltage applied to the solenoid 33 in the foregoing manner, and then uses voltage after completion of escape.

For example, suppose that escape succeeds by a change of voltage at retry, in a case of failure in escape in a state where magnetic force is difficult to make ineffective due to application of inappropriate voltage to the solenoid 33. In this case, performed in this example is such a process which stores voltage after this change, and applies the stored voltage at the time of the next escape process.

Furthermore, the voltage may be changed in accordance with a change of the distance L between the attracted portion 70 and the yoke 71 during the escape action.

Touched upon herein will be a case example where the lens holder 60 is attracted to the solenoid 33 and comes into the movement regulated state during the imaging action as the unnecessary attraction described above.

During focus control, the distance L between the yoke 71 of the solenoid 33 and the attracted portion 70 made of iron and disposed on the lens holder 60 is sufficiently provided. Accordingly, attraction is not caused during normal use. However, unnecessary attraction may be caused when intentional or unintentional shock is applied in the optical axis direction.

The following are case examples where unnecessary attraction is not easily caused.
- A case where shock is applied in the vertical direction with respect to the optical axis.
- A case where the lens holder 60 is located away from the solenoid 33 (e.g., a case where a subject distance is long in a configuration where the locking mechanism is located on the subject side).
- A case where flow shot in a pan-tilt direction is performed.
- A case where a person imaging a subject is pushed from the back during imaging.

Unnecessary attraction is not easily caused in these cases.
On the other hand, the following are case examples where unnecessary attraction is easily caused.
- A case where a person imaging a subject jumps in a state of imaging downward.
- A case where a camera is intentionally shaken in the optical axis direction.
- A case where a camera is attached to a shooting grip and is shaken in this state.
- A case where a person performs imaging while riding on a vehicle having extremely high acceleration (e.g., airplane during a race or performing acrobatic flying).

There is a possibility that unnecessary attraction is caused in these cases. However, it is considered that these cases are intentional cases, large-scale accidents, or predictable cases. These cases also include cases where focus control is originally difficult to perform, such as a case of extremely high acceleration.

As apparent from above, unnecessary attraction is not easily caused by the solenoid 33 in normal use cases for imaging. Even if unnecessary attraction is caused, the escape process described above can handle this attraction.

In addition, for preventing unnecessary attraction, a process for energizing the solenoid 33 when the distance between the yoke 71 and the attracted portion 70 becomes L0 or shorter during the normal imaging action is only required to be performed, for example, as indicated by the action performed between the time point t3 and the time point t4 in FIG. 21.

5. ESCAPE PROCESS TIMING IN ACCORDANCE WITH POWER LIMIT

In a case where a power limit instruction is issued via communication from the body control unit 12, the actuator management module 4 changes timing of the escape process from timing in a normal state where no power limit instruction is issued. This process will be hereinafter described.

Action power required for the lens barrel 2 is supplied from the power source unit 11 of the imaging device 3. The body control unit 12 transmits a power limit instruction to the lens barrel 2 in some cases, such as a time when a battery residual quantity is small, and a time when power consumption of the body increases. For example, the body control unit 12 transmits a request for processing with less than several watts.

Illustrated in FIGS. 28 to 32 by way of example is sequence control performed by the actuator management module 4 in accordance with presence or absence of such a power limit instruction. Each of these figures has a time axis extending in a vertical direction, and indicates actions and communication of the body control unit 12, the actuator management module 4, the control module 5, the second actuator control module 6 (hereinafter referred to as second control module 6), and the third actuator control module 7 (hereinafter referred to as third control module 7).

While the three control modules (5, 6, 7) are depicted by way of example, the number of control modules requiring initialization may be four or more, or two or smaller. It is assumed that the second control module 6 and the third control module 7 presented by way of example are control modules of actuators other than the focus actuator control module 5 for convenience of explanation.

Figure 28:
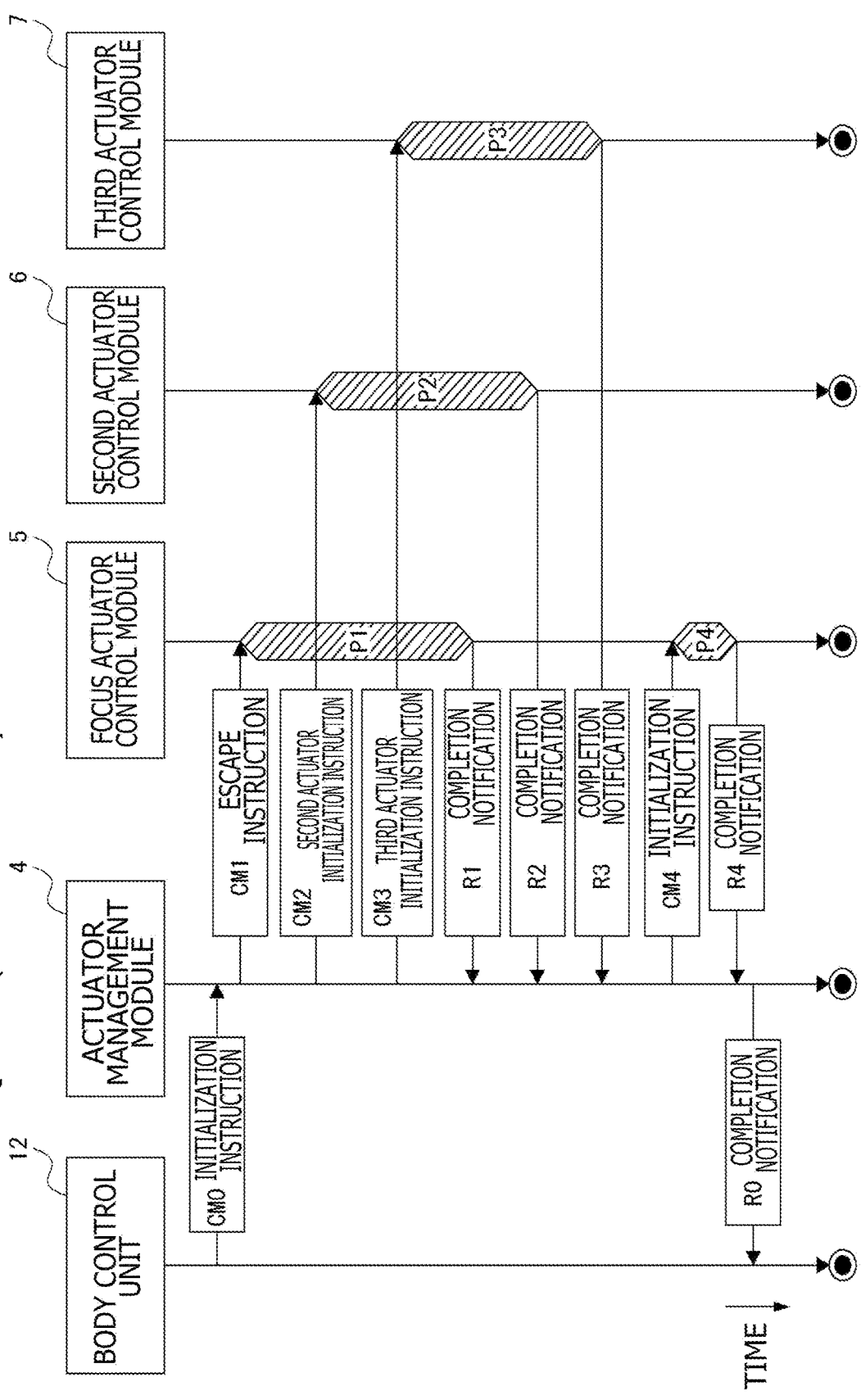
FIG. 28 is an explanatory diagram of an escape sequence during startup without power limit according to the embodiment.

FIG. 28 depicts a case of execution of respective actuator actions at the time of startup, and indicates an occasion of initialization concerning the escape process and focus control for the control module 5. This is a case where a power limit instruction is not particularly issued.

At the time of startup, such as a case where the user performs power-on operation of the imaging device 3, an initialization instruction CM0 is transmitted from the body control unit 12 to the lens control unit 22. In response to this instruction, the actuator management module 4 of the lens control unit 22 initially issues an escape instruction CM1 to the control module 5.

In response to this instruction, the control module 5 performs an escape process P1. This is the process explained above with reference to FIGS. 23 to 27.

Moreover, the actuator management module 4 concurrently issues an initialization instruction CM2 to the second actuator, and an initialization instruction CM3 to the third actuator.

In response to these instructions, the second control module 6 performs an initialization process P2, and the third control module 7 performs an initialization process P3.

After completion of the processes corresponding to the instructions, each of the respective control modules returns a completion notification to the actuator management module 4.

The control module 5 issues a completion notification R1 in accordance with completion of the escape process P1.

The second control module 6 issues a completion notification R2 in accordance with completion of the initialization process P2.

The third control module 7 issues a completion notification R3 in accordance with completion of the initialization process P3.

The actuator management module 4 issues an initialization instruction CM4 to the control module 5 after acquisition of at least the completion notification R1 of the escape process P1.

In response to this instruction, the control module 5 performs an initialization process P4. Thereafter, the control module 5 issues a completion notification R4 in accordance with completion of the initialization process P4.

After completion of initialization of the respective actuators, the lens control unit 22 (actuator management module 4) transmits a completion notification R0 to the body control unit 12 as a notification of completion of the initialization instruction CM0.

Described above are a series of processes performed by the lens control unit 22 at the time of issue of initialization instructions. In this case, the escape process P1 is carried out simultaneously with the initialization processes P2 and P3 and the like.

Figure 29:
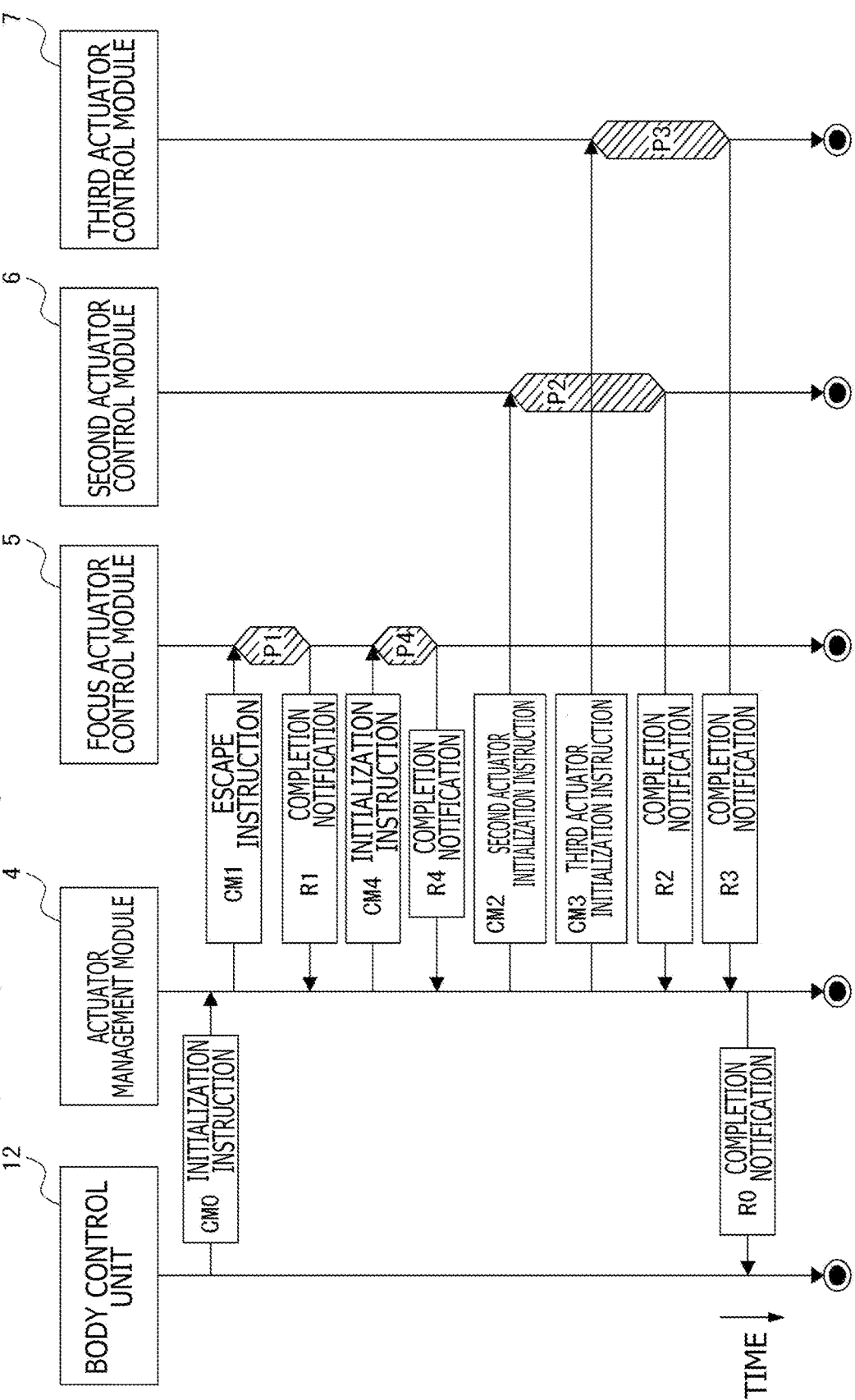
FIG. 29 is an explanatory diagram of an escape sequence during startup with power limit according to the embodiment.

Meanwhile, FIG. 29 depicts a case where a power limit instruction is given at the time of issue of the initialization instruction CM0 from the body control unit 12.

In this case, the escape process P1 is not carried out simultaneously with the initialization processes associated with the other actuators.

In response to the initialization instruction CM0 from the body control unit 12, the actuator management module 4 issues the escape instruction CM1 to the control module 5. The control module 5 performs the escape process P1 in response to this instruction, and issues the completion notification R1 in accordance with completion.

The actuator management module 4 subsequently issues the initialization instruction CM4 to the control module 5. The control module 5 performs the initialization process P4 in response to this instruction, and issues the completion notification R4 in accordance with completion.

Thereafter, the actuator management module 4 issues the initialization instruction CM2 to the second control module 6. The second control module 6 performs the initialization process P2 in response to this instruction, and issues the completion notification R2 in accordance with completion.

The actuator management module 4 concurrently issues the initialization instruction CM3 to the third control module 7. The third control module 7 performs the initialization process P3 in response to this instruction, and issues the completion notification R3 in accordance with completion.

After completion of the initialization processes of the respective actuators, the lens control unit 22 (actuator management module 4) transmits the completion notification R0 to the body control unit 12 as a notification of completion of the initialization instruction CM0.

In this case, therefore, an initialization instruction is not issued to each of the actuators other than the focus actuator until completion of the escape process. Accordingly, the escape process requiring energization of the solenoid 33 is executed in a period different from a period when the initialization processes associated with other actuators are executed. As a result, actions are achieved in compliance with the power limit request without overlap between respective periods each requiring power consumption.

Figure 30:
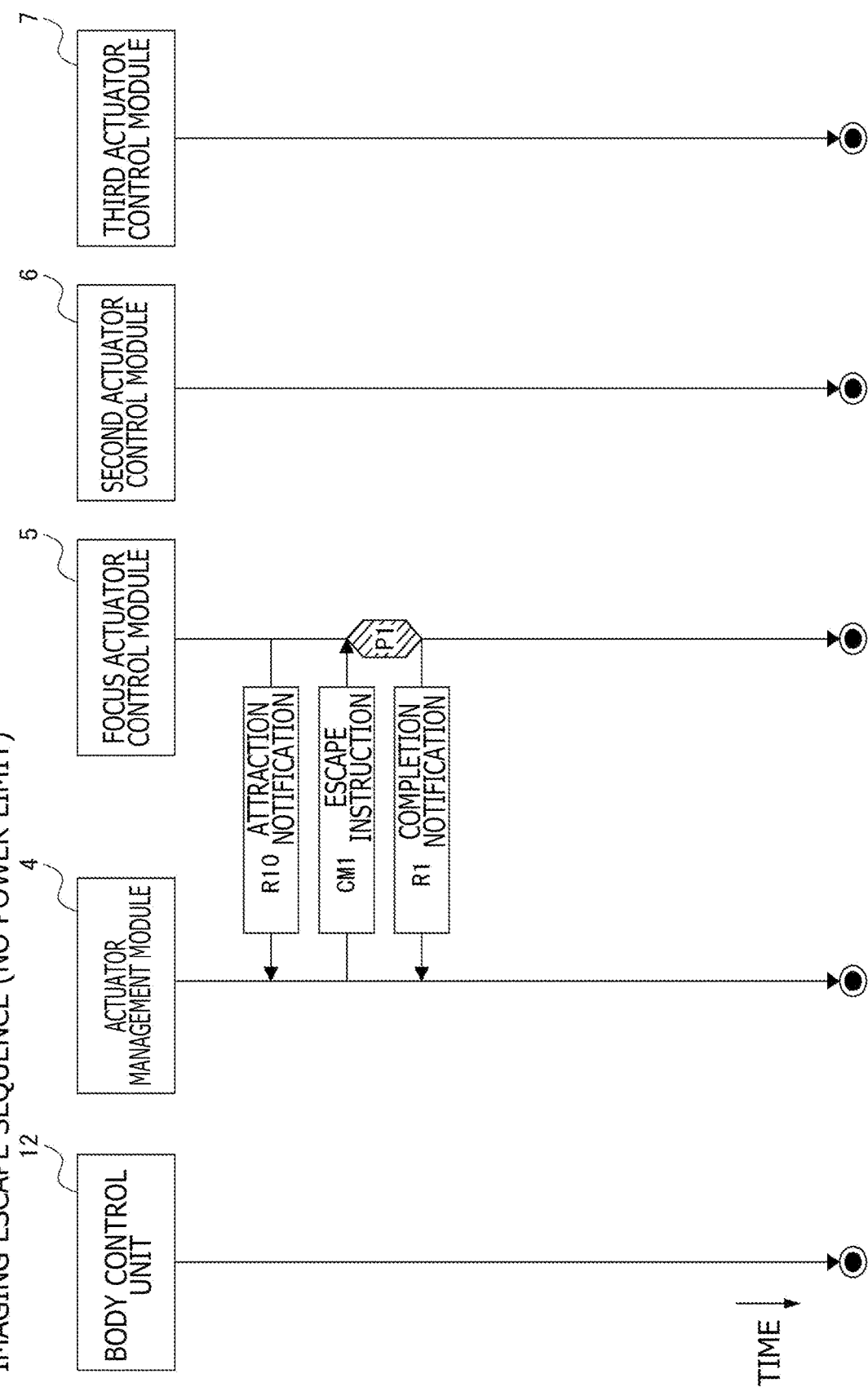
FIG. 30 is an explanatory diagram of an escape sequence during return without power limit according to the embodiment.

Subsequently, FIG. 30 depicts a case where no power limit instruction is issued at the time of return.

When unnecessary attraction is caused, the control module 5 issues an attraction notification R10 to the actuator management module 4.

In response to this notification, the actuator management module 4 recognizes a necessity of escape at the time of return, and issues the escape instruction CM1 to the control module 5.

In response to this instruction, the control module 5 performs the escape process P1. Thereafter, the control module 5 issues the completion notification R1 to the actuator management module 4 in accordance with completion of the escape process P1.

While not depicted in the figure, there may be a case where other actuator actions are performed concurrently with the escape process in the foregoing situation. In this case, these actions are also allowed to be concurrently executed because no power limit instruction is issued.

Figure 31:
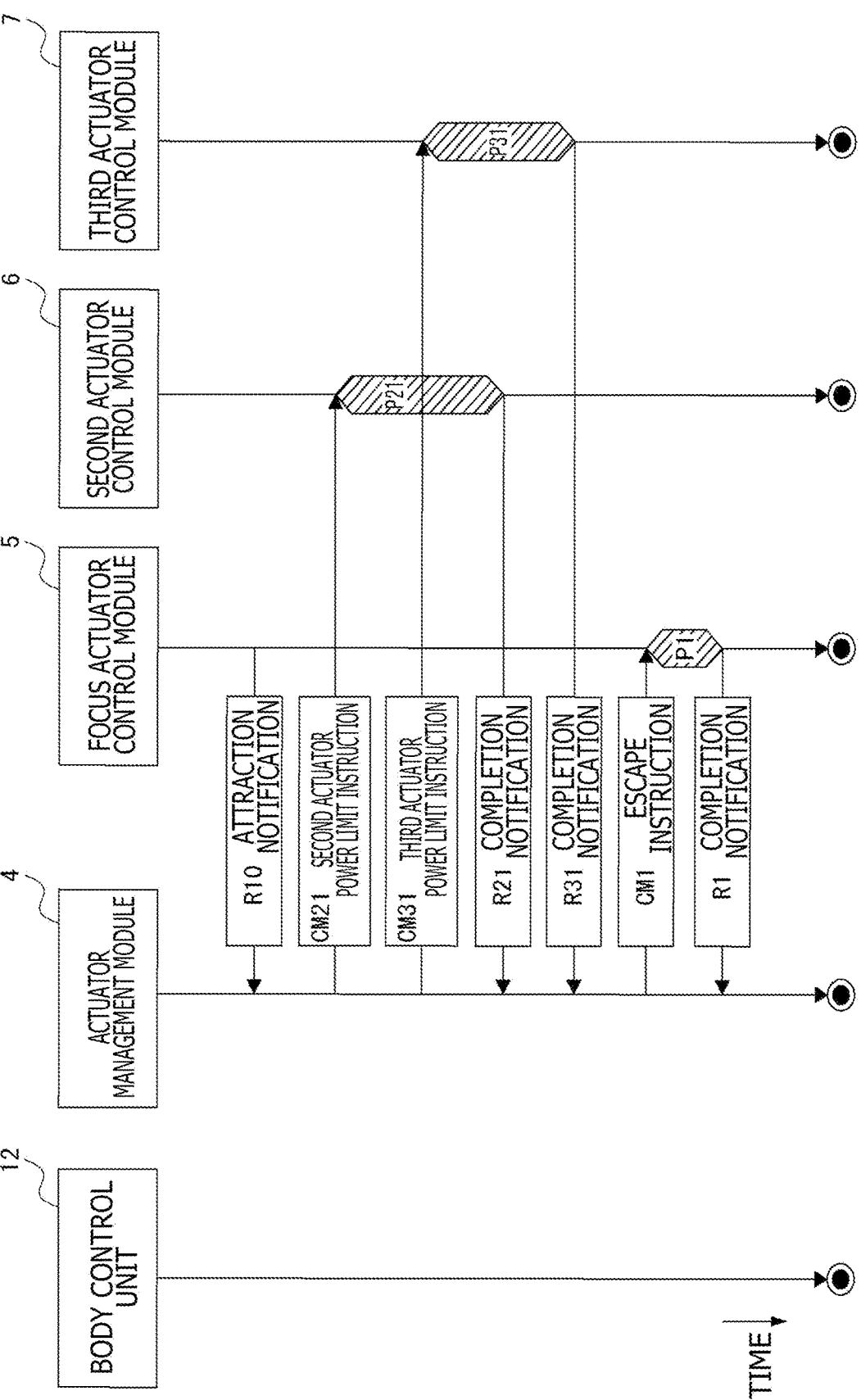
FIG. 31 is an explanatory diagram of an escape sequence during return with power limit according to the embodiment.

FIG. 31 depicts a case where a power limit instruction is issued at the time of return.

Unnecessary attraction is caused, and the control module 5 issues the attraction notification R10 to the actuator management module 4.

In this case, the actuator management module 4 issues a power limit instruction CM21 to the second control module 6, and a power limit instruction CM31 to the third control module 7.

In response to these instructions, the second control module 6 and the third control module 7 perform corresponding processes P21 and P31 for shifting to a power reduction action state, for example, and issue completion notifications R21 and R31 to the actuator management module 4, respectively.

After checking the completion notifications R21 and R31, the actuator management module 4 issues the escape instruction CM1 to the control module 5.

In response to this instruction, the control module 5 performs the escape process P1. Thereafter, the control module 5 issues the completion notification R1 to the actuator management module 4 in accordance with completion of the escape process P1.

Specifically, the actuator management module 4 prohibits execution of actions performed by the other actuators and requiring high power consumption, and then executes the escape process requiring energization of the solenoid 33.

In this manner, appropriate escape at the time of return is achieved in compliance with the power limit instruction.

Figure 32:
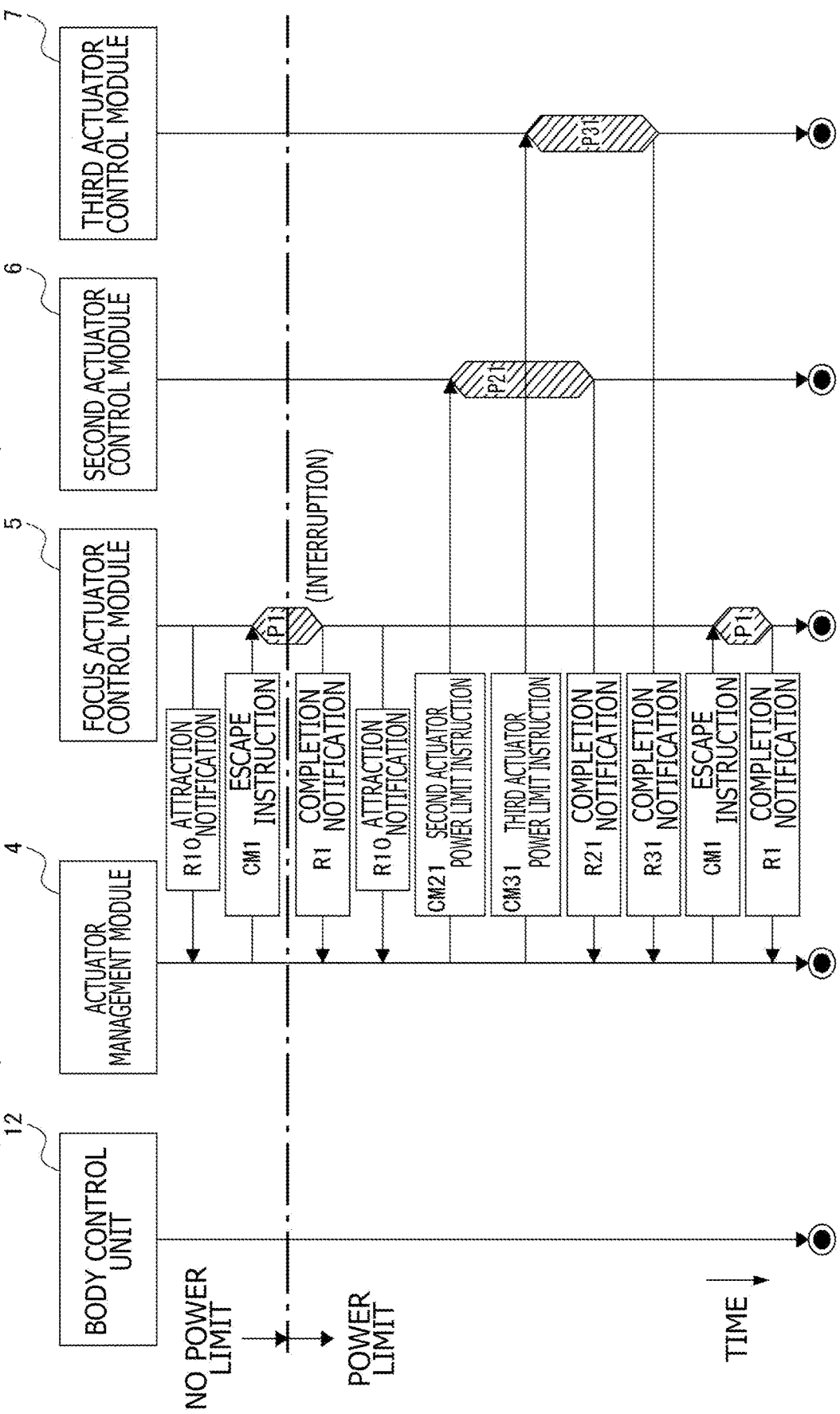
FIG. 32 is an explanatory diagram of an escape sequence during return with a change of power limit according to the embodiment.

FIG. 32 depicts a case where a power limit is issued during execution of escape at the time of return as a result of generation of unnecessary attraction during the imaging action.

It is assumed that no power limit instruction has been issued when unnecessary attraction is caused.

When the attraction notification R10 is issued from the control module 5 to the actuator management module 4 in accordance with development of unnecessary attraction, this case is handled similarly to the case of FIG. 30 described above. Accordingly, the actuator management module 4 issues the escape instruction CM1 to the control module 5.

Suppose that a power limit instruction is issued while the control module 5 is performing the escape process.

In this case, "state=completed" is determined in steps S108, S109, and S110 in FIG. 23 as described above, and the end process is carried out in step S111 in a state of uncompleted escape.

Accordingly, the completion notification R1 in FIG. 32 is issued in this end process.

However, because the current state is an attracted and uncompleted escape state, the control module 5 again issues the attraction notification R10 to the actuator management module 4.

A power limit instruction has been issued at this time. Accordingly, the actuator management module 4 issues the power limit instruction CM21 to the second control module 6, and the power limit instruction CM31 to the third control module 7.

In response to these instructions, the second control module 6 and the third control module 7 perform the corresponding processes P21 and P31 for shifting to the power reduction action state, for example, and issue the completion notifications R21 and R31 to the actuator management module 4, respectively.

After checking the completion notifications R21 and R31, the actuator management module 4 issues the escape instruction CM1 to the control module 5.

In response to this instruction, the control module 5 performs the escape process P1. Thereafter, the control module 5 issues the completion notification R1 to the actuator management module 4 in accordance with completion of the escape process P1.

In short, in a case where a power limit instruction is issued during the escape process, the control module 5 ends the process in an uncompleted state. Thereafter, a notification indicating this fact is again issued on the basis of the current attracted state.

The actuator management module 4 receives the attraction notification R10 after issue of the power limit instruction, and executes the escape process after limiting power consumption by the other actuators similarly to the case of FIG. 31.

In such a manner, even if a power limit instruction is issued during the escape process, the escape process can be carried out by executing actions complying with this request.

6. SHIFT TO MOVEMENT REGULATED STATE

A shift process for shifting to the movement regulated state achieved by the locking mechanism will be subsequently described in detail. Specifically, this is a process for bringing the lens holder 60 into an attracted state by using the solenoid 33 functioning as the locking mechanism. This process is normally carried out as an end process at the time of power off of the camera system 1.

According to the present embodiment, however, an attraction preparation process is performed as a preparation process before execution of the attraction process as the shift process.

In other words, the preparation process (attraction preparation process) and the shift process (attraction process) are performed as the end process at the time of power off.

Note that this end process may be considered as a shift process in a broad sense (an attraction process in a broad sense) which is carried out in two stages of a preparation process (attraction preparation process) and a shift process in a narrow sense (an attraction process in a narrow sense).

A specific example will be hereinafter described on an assumption that a sequence at the time of the end process is performed in two stages, i.e., the attraction preparation process and the attraction process.

Figure 33:
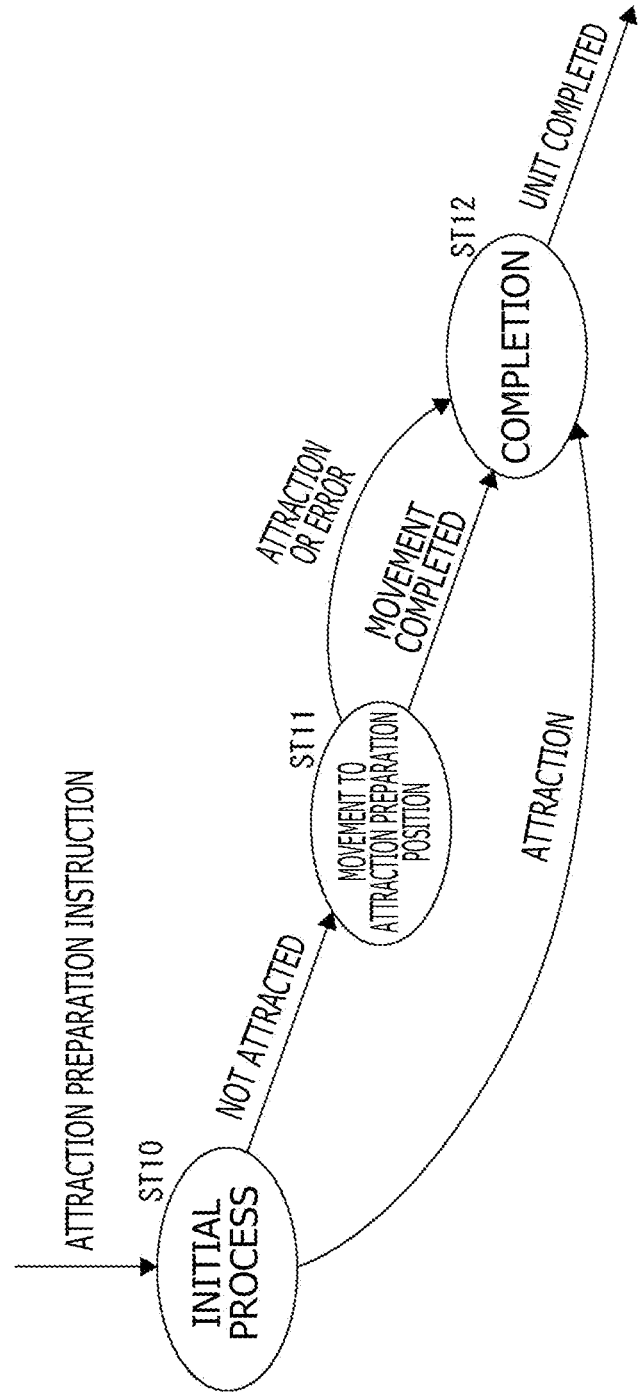
FIG. 33 is an explanatory diagram depicting transitions of an attraction preparation process according to the embodiment.

Initially, FIG. 33 depicts state transitions in the attraction preparation process. These are transitions of processing performed by the control module 5 in accordance with an attraction preparation instruction issued from the actuator management module 4.

When an attraction preparation instruction is issued, the control module 5 performs an initial process (ST10).

The initial process performs processing such as sequence acquisition and internal variable initialization, and determines whether or not the current state is an attracted state.

If attraction is achieved, an attraction preparation action is unnecessary. Accordingly, the process transits to a completed state (ST12). For example, this is a case where the movement regulated state is already achieved at the time of ending for some reasons such as a disturbance. Useless execution of the attraction preparation action is avoidable by determining whether or not the current state is the attracted state and deciding whether to perform the attraction preparation process.

Subsequently to the initial process (ST10), the process normally transits to movement to an attraction preparation position (ST11).

Thereafter, the lens holder 60 is moved to an attraction preparation position, and the process transits to the completed state (ST12) to complete the attraction preparation process.

Note that the process similarly transits to the completed state (ST12) to complete the attraction preparation process in a case where attraction, i.e., the movement regulated state is produced during the movement to the attraction preparation position (ST11), or a case where an error is caused in movement of the lens holder 60.

The attraction preparation position herein is a position set on the basis of a distance within reach of the attracting force of the solenoid 33. For example, a position corresponding to the distance L=L0 (see FIGS. 17, 21, and other figures), or a position near this position may be designated as the attraction preparation position.

For example, it is preferable that the attraction preparation position is a position closest to the solenoid 33 in a range out of reach of the attracting force. Particularly in this preparation process, the lens holder 60 is moved to the attraction preparation position at a highest possible speed. Accordingly, it is advantageous to define the attraction preparation position at a closest possible position to the solenoid 33 in view of reduction of time required for a series of processes at the time of ending.

Described with reference to FIGS. 34 and 35 will be a specific example of the attraction preparation process performed by the lens control unit 22 (control module 5) on an assumption of the foregoing transitions in FIG. 33 are achieved.

Figure 34:
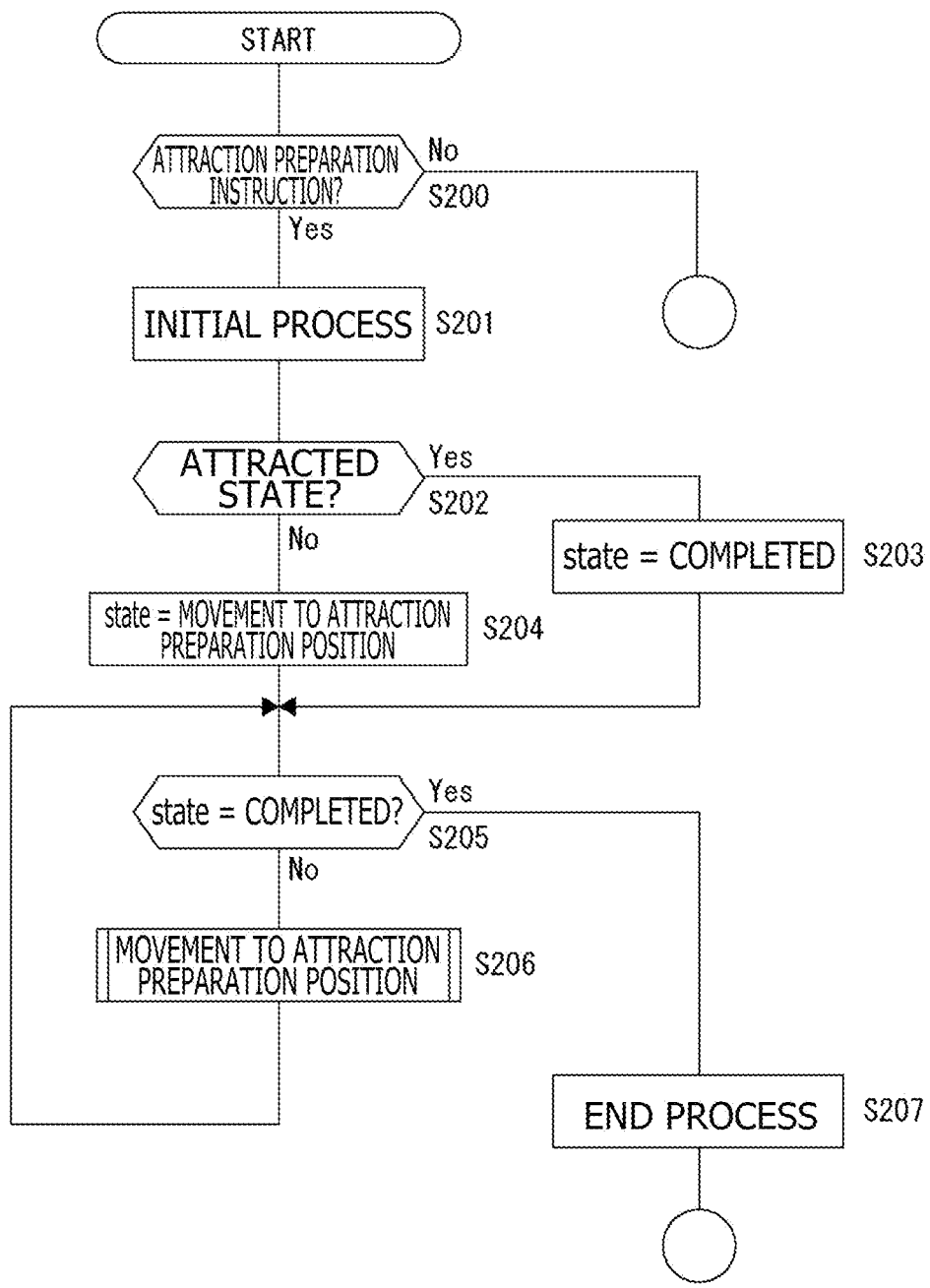
FIG. 34 is a flowchart of the attraction preparation process according to the embodiment.

In step S200 in FIG. 34, the control module 5 checks an attraction preparation instruction issued from the actuator management module 4. In a case where an attraction preparation instruction is issued, the control module 5 advances the process to step S201 and the following steps.

In step S201, the control module 5 performs the initial process. For example, the control module 5 acquires a sequence and initializes internal variables.

In step S202, the control module 5 checks whether or not the current state is an attracted state, i.e., a movement regulated state. This checking can be achieved on the basis of the current position of the lens holder 60.

If the current state is the attracted state, the control module 5 determines "state=completed" in step S203.

If the current state is not the attracted state, the control module 5 determines "state=movement to attraction preparation position" in step S202.

In step S205, the control module 5 checks whether or not "state=completed" is determined. If "state=completed" is determined, an end process is performed in step S207 to complete the attraction preparation process. In the end process, the control module 5 issues a completion notification to the actuator management module 4, and initializes flags and variables, for example.

Even in a case where the attraction preparation instruction is issued during the end process performed in accordance with power off, for example, "state=completed" is determined in step S203 if the attraction state is already achieved. In this case, the process proceeds from step S205 to step S207 to complete the action.

If "state=movement to attraction preparation position" is determined in a stage of step S205, the control module 5 advances the process to step S206 to perform a process for movement to the attraction preparation position.

Step S206 is repeated until "state=completed" is determined.

Figure 35:
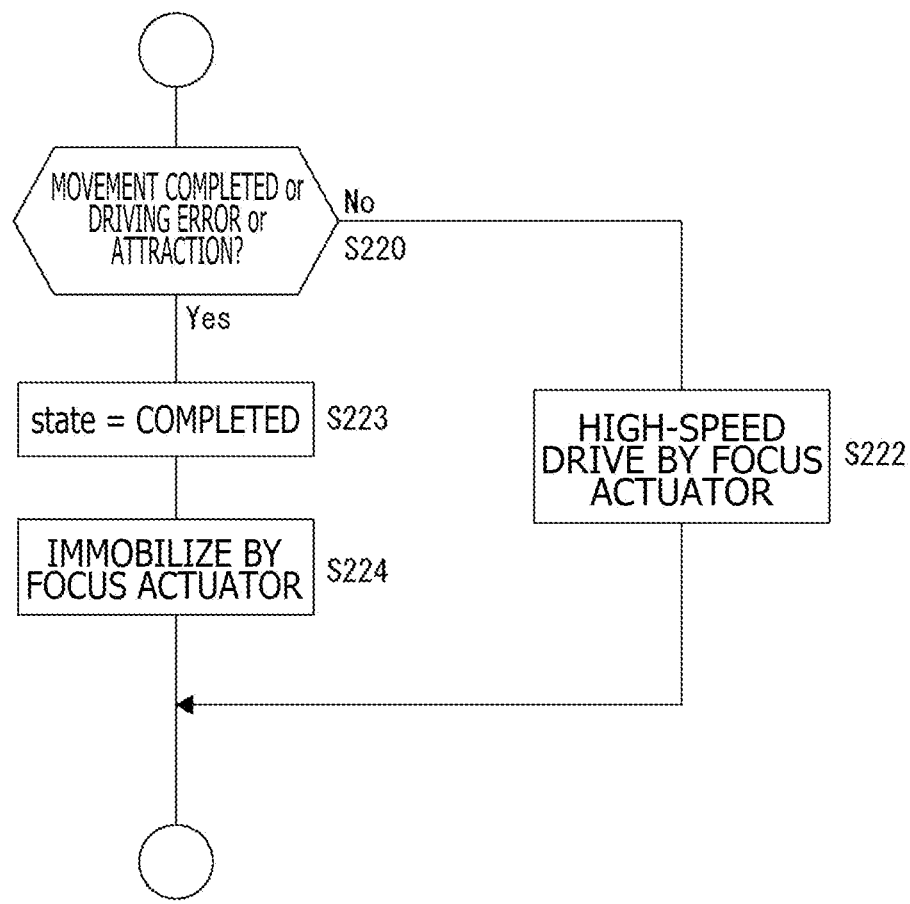
FIG. 35 is a flowchart of a process for movement to an attraction preparation position according to the embodiment.

FIG. 35 illustrates the process for movement to the attraction preparation position in step S206.

In step S220, the control module 5 determines whether or not movement to the attraction preparation position has been completed, whether or not a driving error has been caused, or whether or not an attracted state has been produced.

If the current state is not any one of these, but at a start of movement to the attraction preparation position or in a course of movement, the control module 5 performs control for moving the lens holder 60 at high speed toward the attraction preparation position by using the focus lens drive unit 45 in step S222.

In this manner, movement of the lens holder is executed as movement to the attraction preparation position. Note that the lens holder is moved at high speed so as to reach the attraction preparation position as quickly as possible. For example, the lens holder 60 may be moved at a highest speed in a variable speed range achievable by the focus lens drive unit 45.

In a case where the current state corresponds to any one of the completion of movement, the driving error, and the attraction in step S220, the control module 5 determines "state=completed" in step S223, and immobilizes the lens holder 60 moved by the focus lens drive unit 45 in step S224.

On the basis of determination of "state=completed" as described above, the control module 5 advances the process from step S205 to step S207 in FIG. 34, and performs the end process to complete the attraction preparation process.

Subsequently to the preparation process (attraction preparation process) described above, the attraction process is performed as a shift process for actually shifting to the movement regulated state. This is a process for shifting the lens holder 60 from the attraction preparation position to an actually attracted state to the solenoid 33.

Figure 36:
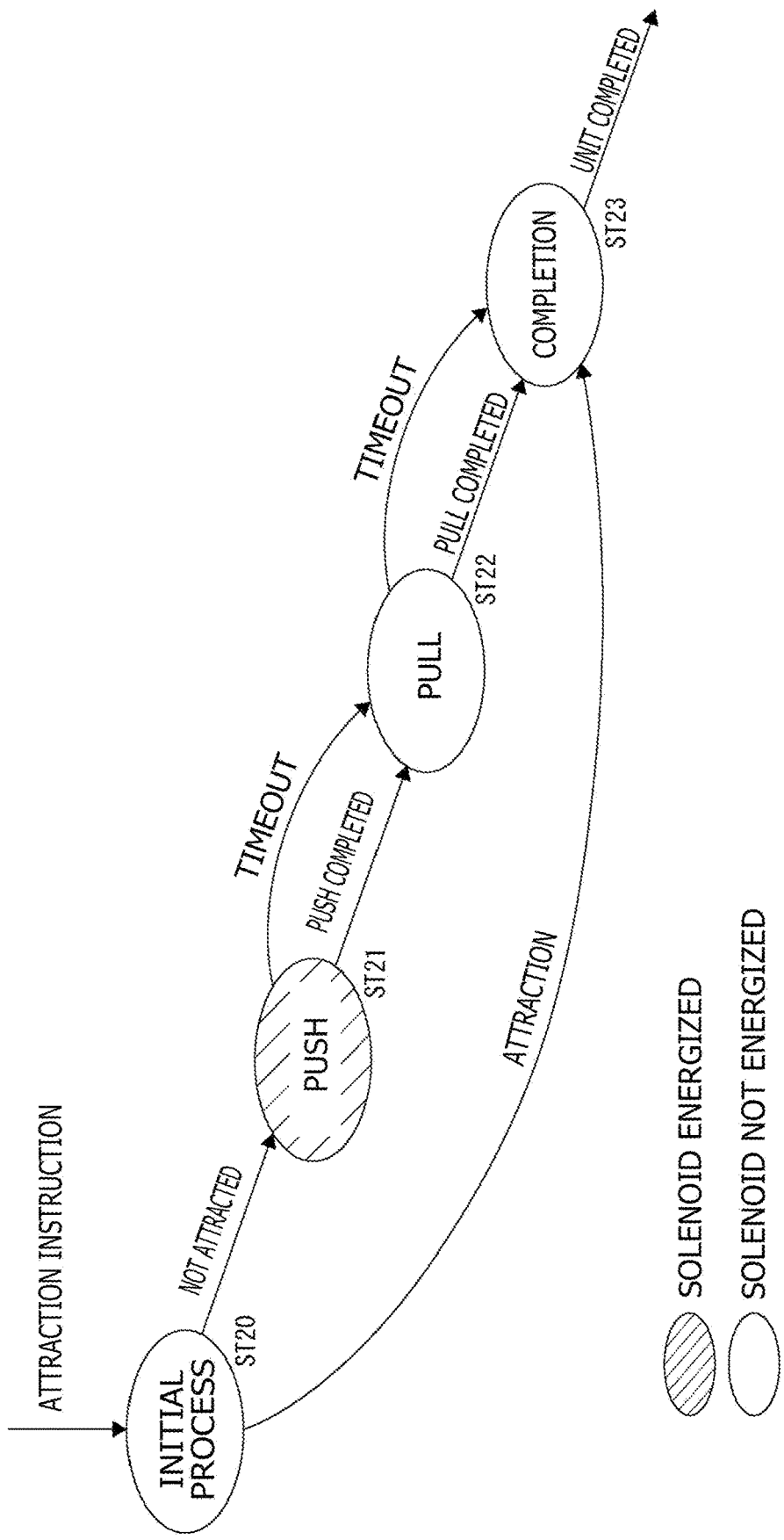
FIG. 36 is an explanatory diagram depicting transitions of an attraction process according to the embodiment.

FIG. 36 depicts state transitions in the attraction process. These are transitions of processing performed by the control module 5 in accordance with an attraction instruction issued from the actuator management module 4.

According to the present embodiment, the attraction process is an example of a process achieved in two stages of a pushing process and a pulling process.

When an attraction instruction is issued, the control module 5 performs an initial process (ST20).

The initial process performs processing such as sequence acquisition and internal variable initialization, and determines whether or not the current state is an attracted state.

If attraction is achieved, an attraction action is unnecessary. Accordingly, the process transits to a completed state (ST23). For example, this is a case where the movement regulated state is already achieved at the time of ending for some reasons such as a disturbance. Useless execution of the attraction action is avoidable by determining whether or not the current state is the attracted state and deciding whether to perform the attraction preparation process.

Normally, the initial process (ST20) subsequently transits to the pushing process (ST21).

In the pushing process (ST21), the control module 5 performs control for driving the lens holder 60 at low speed in such a direction as to bring the lens holder 60 into contact with the solenoid 33, and further for slightly pushing the lens holder 60 in a contact state.

After completion of this pushing process (ST21), the control module 5 transits to the pulling process (ST22). The process also shifts to the pulling process (ST22) on the basis of timeout of the pushing process.

In the pulling process, the control module 5 performs control for pulling back the lens holder 60 from the pushing position to a predetermined end position.

When the pulling process is completed, or when the process is timed out, the control module 5 transits to a complete state (ST23) to complete the attraction process.

The pushing process herein is a process for executing an action of pushing a compressible part of the elastic member 77 of the solenoid 33 by the lens holder 60. On the other hand, the pulling process is a process for returning the lens holder 60 in the pushed state to an end position corresponding to the normal position in contact with the solenoid.

Described with reference to FIGS. 37, 38, and 39 will be a specific example of the attraction process performed by the lens control unit 22 (control module 5) on an assumption of the foregoing transitions in FIG. 36 are achieved.

Figure 37:
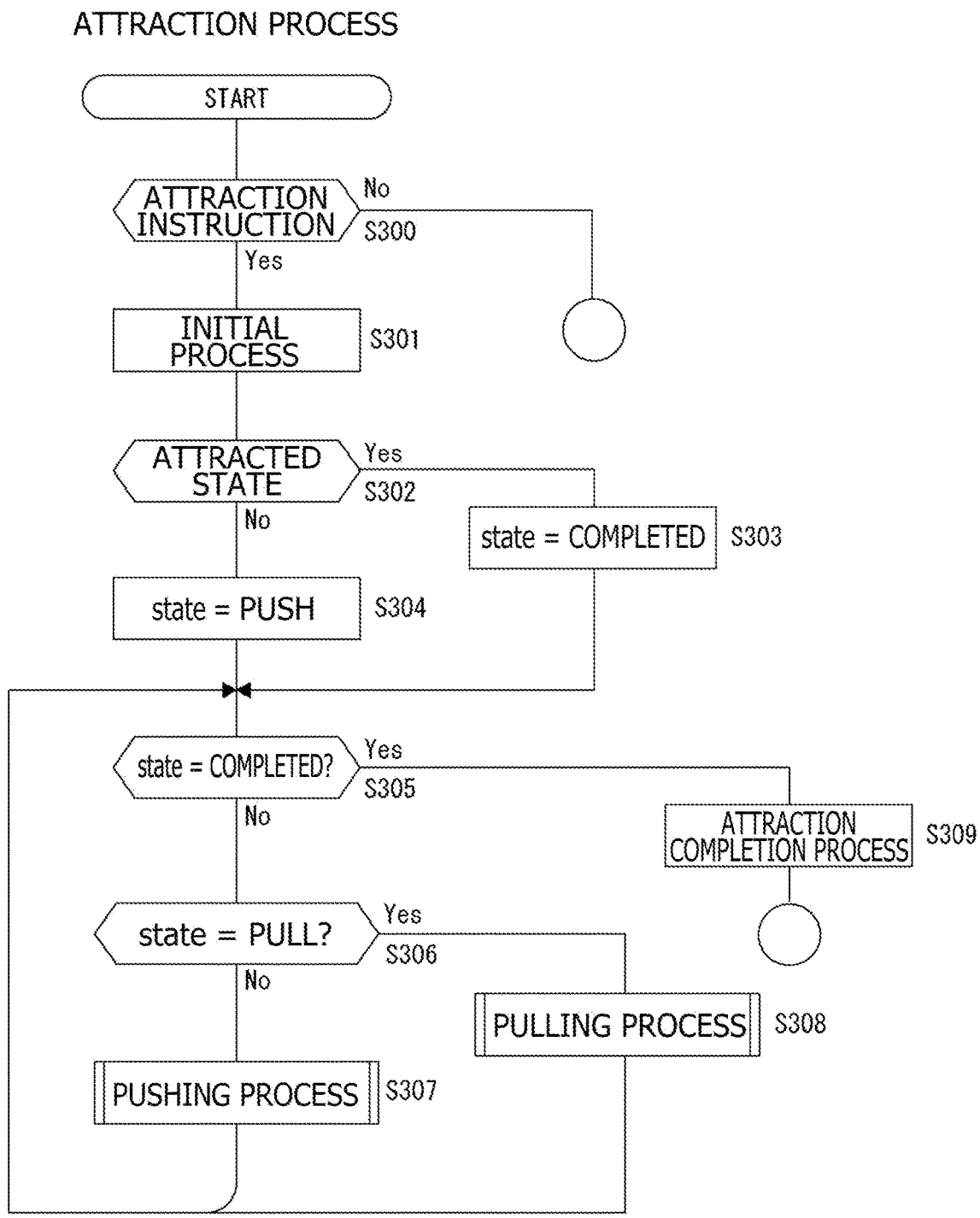
FIG. 37 is a flowchart of the attraction process according to the embodiment.

In step S300 in FIG. 37, the control module 5 checks an attraction instruction issued from the actuator management module 4. In a case where an attraction instruction is issued, the control module 5 advances the process to step S301 and the following steps.

In step S301, the control module 5 performs the initial process. For example, the control module 5 acquires a sequence and initializes internal variables.

In step S302, the control module 5 checks whether or not the current state is an attracted state, i.e., a movement regulated state.

If the current state is the attracted state, the control module 5 determines "state=completed" in step S303.

If the current state is not the attracted state, the control module 5 determines "state=push" in step S302.

In step S305, the control module 5 checks whether or not "state=completed" is determined. If "state=completed" is determined, an end process is performed in step S309 to complete the attraction process. In the end process, the control module 5 issues a completion notification to the actuator management module 4, and initializes flags and variables, for example.

Even in a case where issue of the attraction instruction is checked in step S300, for example, "state=completed" is determined in step S303 if the attraction state is already achieved. In this case, the process proceeds from step S305 to step S309 to complete the action.

If "state=completed" is not determined in a stage of step S305, the control module 5 determines whether or not the current state is "state=pull" in step S306.

In a case where "state=pull" is not determined, i.e., the current state is "state=push," the control module 5 performs the pushing process in step S307.

This step S307 is repeated while the current state is "state=push."

Figure 38:
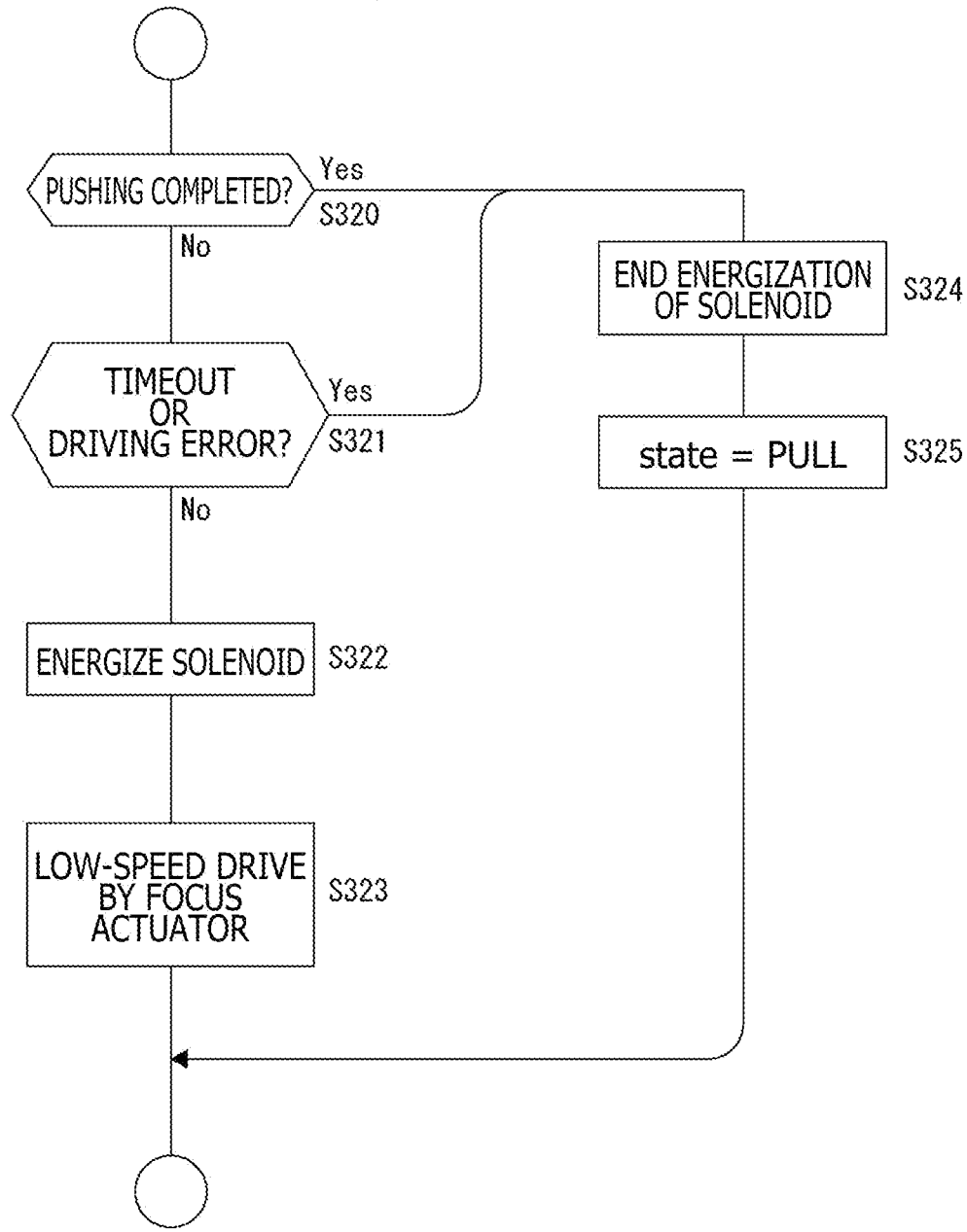
FIG. 38 is a flowchart of a pushing process according to the embodiment.

FIG. 38 illustrates the pushing process performed in step S307.

In step S320, the control module 5 determines whether or not pushing is completed.

If pushing is not completed, the control module 5 determines whether or not pushing has been timed out, or whether or not a driving error of the lens holder 60 has been caused in step S321.

If the current state is not any one of these states, but is in a course of the pushing action, the control module 5 cancels movement regulating force of the locking device, i.e., energizes the solenoid 33 in step S322.

Thereafter, the control module 5 performs control for moving the lens holder 60 at low speed in such a direction as to bring the lens holder 60 in contact with the solenoid 33 by using the focus lens drive unit 45 in step S323.

Accordingly, at the time of a start of pushing, energization of the solenoid 33, and low-speed movement of the lens holder 60 are started. This state continues until completion of pushing and the like.

Note that the lens holder 60 is moved at low speed so as to prevent a sharp collision at the time of contact between the lens holder 60 and the solenoid 33, specifically contact between the attracted portion 70 and the yoke 71.

Moreover, the solenoid 33 is energized so as to reduce or eliminate attracting force and thus prevent a sharp collision caused between the attracted portion 70 and the yoke 71 by the attracting force.

Accordingly, contact between the lens holder 60 and the solenoid 33 is gently achieved. In addition, generation of collision noise is avoided in this manner.

The speed of the low-speed movement is set to a speed lower than at least the speed of movement at the time of the attraction preparation process. For avoiding a sharp collision, for example, the lens holder 60 may be moved at a lowest speed in a variable speed range achievable by the focus lens drive unit 45.

In a case of determination that pushing has completed in step S320, the control module 5 regenerates the movement regulating force of the locking device in step S324. Specifically, the control module 5 ends energization of the solenoid 33. Thereafter, "state=pull" is determined in S325.

Figure 40:
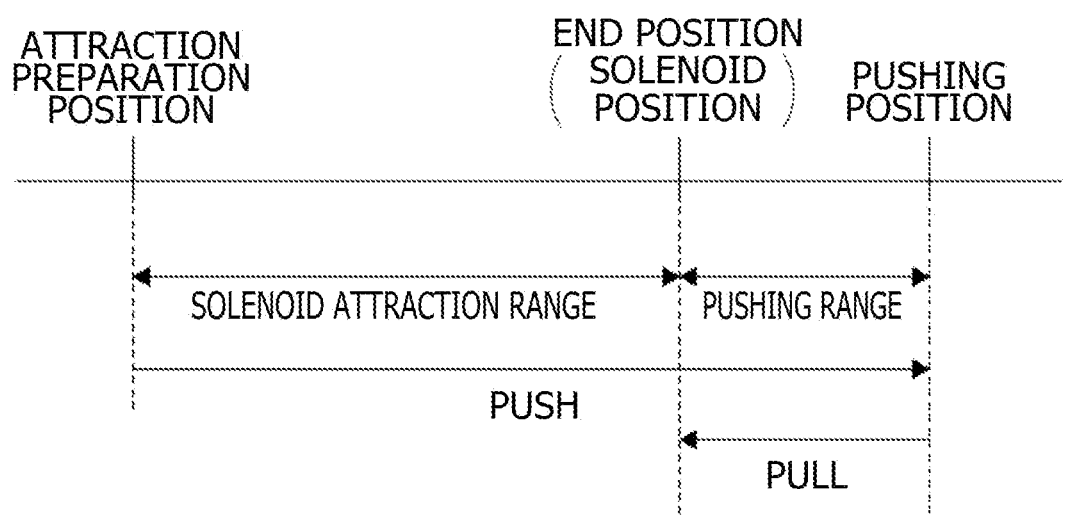
FIG. 40 is an explanatory diagram of a pushing range according to the embodiment.

By the pushing process described above, the lens holder 60 is moved from the attraction preparation position to the pushing position in FIG. 40.

The solenoid position in the figure is a position of contact between the attracted portion 70 and the yoke 71, while the pushing position is a position where the lens holder 60 is pushed by compression of the elastic member 77 after the contact.

Accordingly, when an arrival of the lens holder 60 at the pushing position is detected, the pushing process is completed.

In addition, in a case where timeout or a driving error is determined in step S321, the control module 5 also ends energization of the solenoid 33 and regenerates the movement regulating force of the locking device in step S324, and determines "state=pull" in step S325.

On the basis of determination of "state=pull" after the pushing process described above, the subsequent process in FIG. 37 proceeds from step S306 to the pulling process in step S308.

The pulling process is a process for returning the lens holder 60 from the pushing position to a process for returning the lens holder 60 to the end position in FIG. 40.

This step S308 is repeated while the current state is "state=pull."

Figure 39:
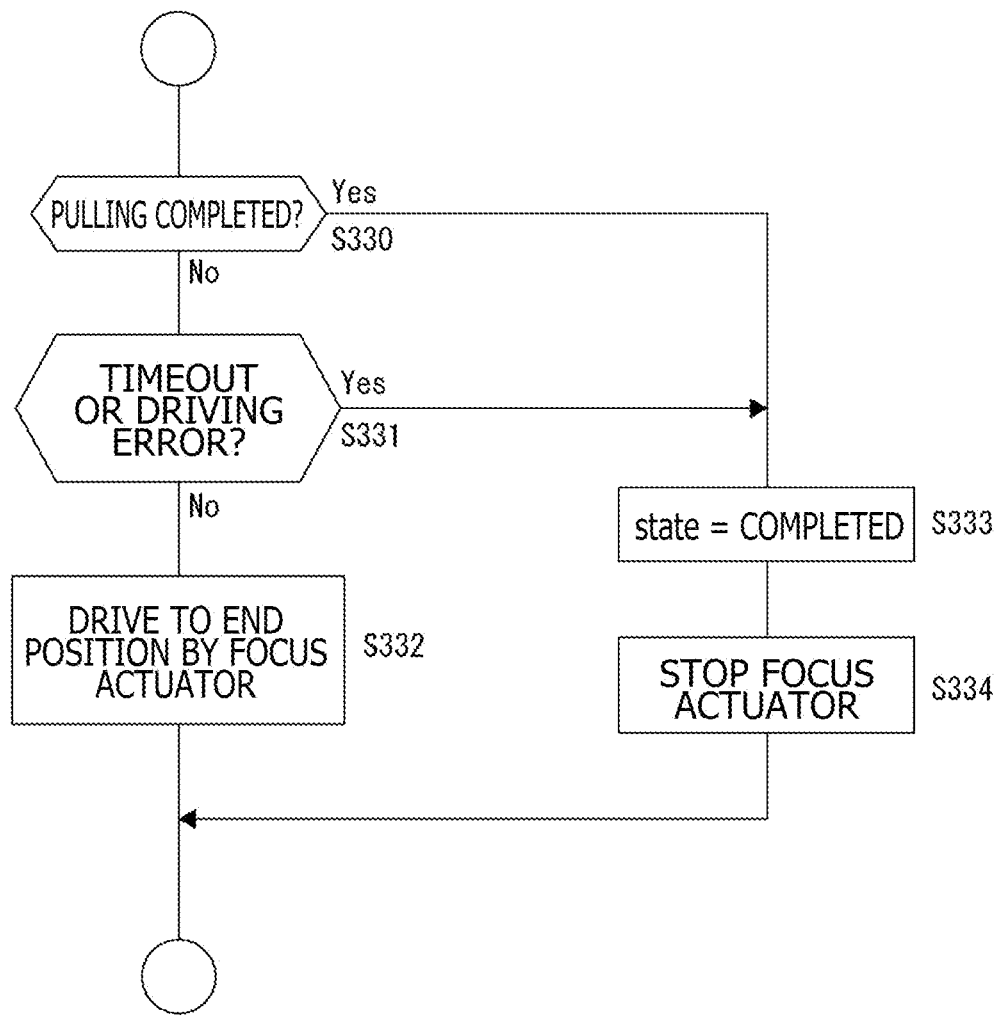
FIG. 39 is a flowchart of a pulling process according to the embodiment.

FIG. 39 illustrates the pulling process performed in step S308.

In step S330, the control module 5 determines whether or not pulling is completed.

If pulling is not completed, the control module 5 determines whether or not pulling has been timed out, or whether or not a driving error of the lens holder 60 has been caused in step S331.

If the current state is not any one of these, but in a course of the pulling action, the control module 5 performs control for moving the lens holder 60 to the solenoid position (end position) by using the focus lens drive unit 45 in step S332. In other words, the control module 5 returns the lens holder 60 from the pushed state.

In a case of determination that pulling is completed in step S330, the control module 5 determines "state=completed" in step S333. Thereafter, the control module 5 stops driving by the focus lens drive unit 45 in step S334. Specifically, the control module 5 ends energization of the focus lens drive unit 45.

By the pulling process described above, the lens holder 60 is moved to the end position in FIG. 40, and is maintained at this position in an attracted state by magnetic force of the solenoid 33.

On the basis of determination of "state=completed" as described above, the control module 5 advances the process from step S305 to step S309 in FIG. 37, and performs the end process to complete the attraction process.

As described above, the attraction process initially performs the pushing process which energizes the solenoid 33, drives the lens holder 60 at low speed in a state of reduced or eliminated attraction power to bring the lens holder 60 into contact with the solenoid, and then slightly pushes the lens holder 60.

The lens holder 60 is pushed in consideration of the configuration which includes the elastic member 77 functioning as a cushioning member for contact between the solenoid 33 and the lens holder 60.

In the configuration including the elastic member 77, the solenoid position measured at the time of shipment and the actual solenoid position may be different from each other depending on a posture state or the like. Considering such a difference, it is appropriate to carry out pushing so as to reliably achieve the contact state.

The subsequent pulling process stops energization of the solenoid, and pulls the lens holder 60 by an amount corresponding to the pushing in a state of attraction between the lens holder 60 and the locking mechanism by magnetic force.

If energization of the focus lens drive unit 45 and the solenoid 33 is ended in the pushed state, noise or shock is generated by rebounding of the elastic member 77. Accordingly, the lens holder 60 is driven to the end position where no repulsive force of the elastic member 77 is generated.

In addition, as described above, the process performed at the time of ending in accordance with power off is achieved in the two stages of the attraction preparation process and the attraction process. This manner of the process is adopted also because the other control modules also perform end processes simultaneously with this process.

The attraction process which requires energization of the solenoid 33 may cause a power shortage. Accordingly, the attraction process is divided into two stages so as to energize the solenoid after completion of the processes of the other control modules.

7. ATTRACTION PROCESS TIMING IN ACCORDANCE WITH POWER LIMIT

In a case where a power limit instruction is issued via communication from the body control unit 12, the actuator management module 4 changes timing of the attraction process from timing in a case where no power limit instruction is issued. This process will be hereinafter described.

Figure 41:
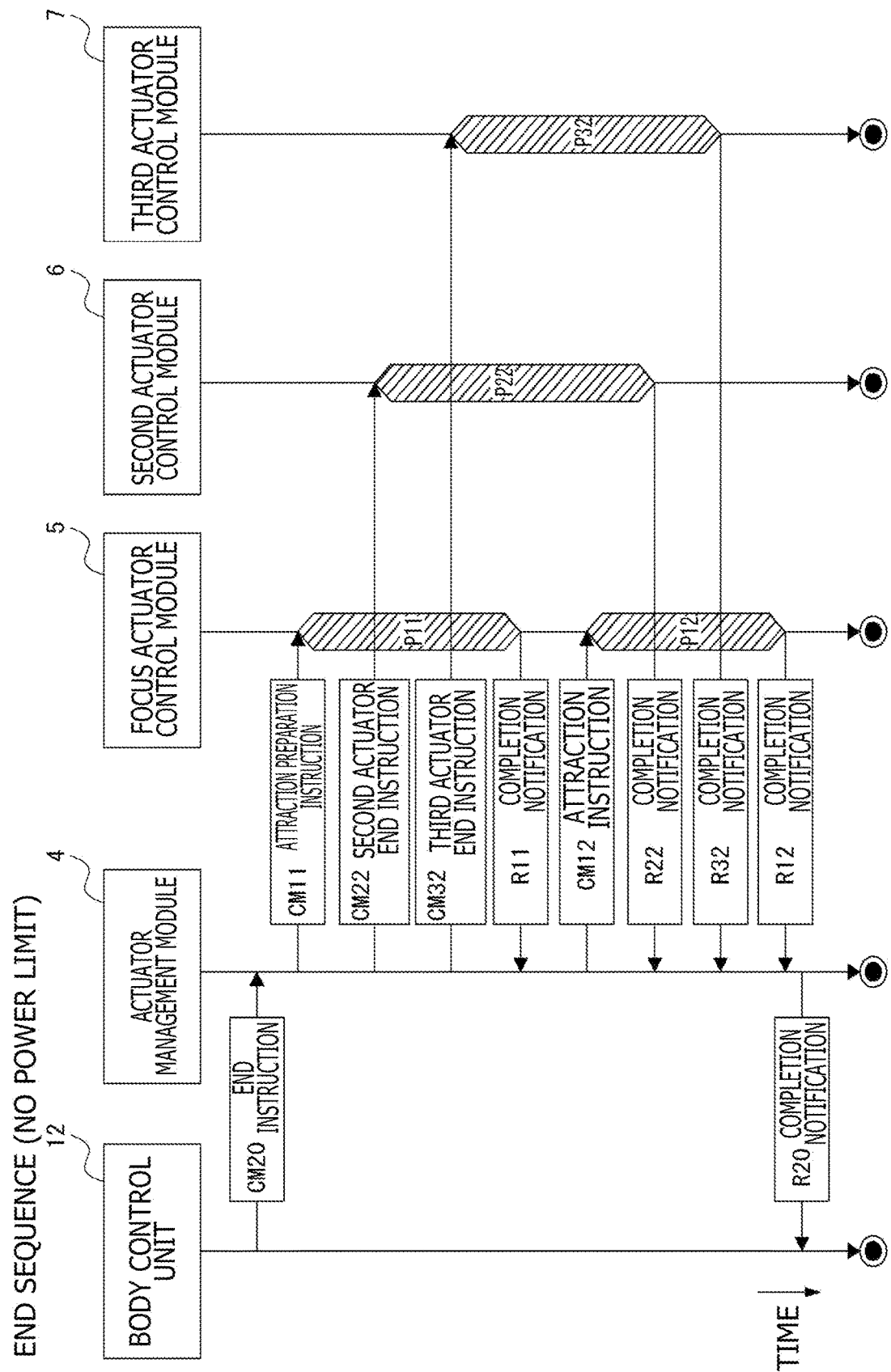
FIG. 41 is an explanatory diagram of a sequence during ending without power limit according to the embodiment.
Figure 42:
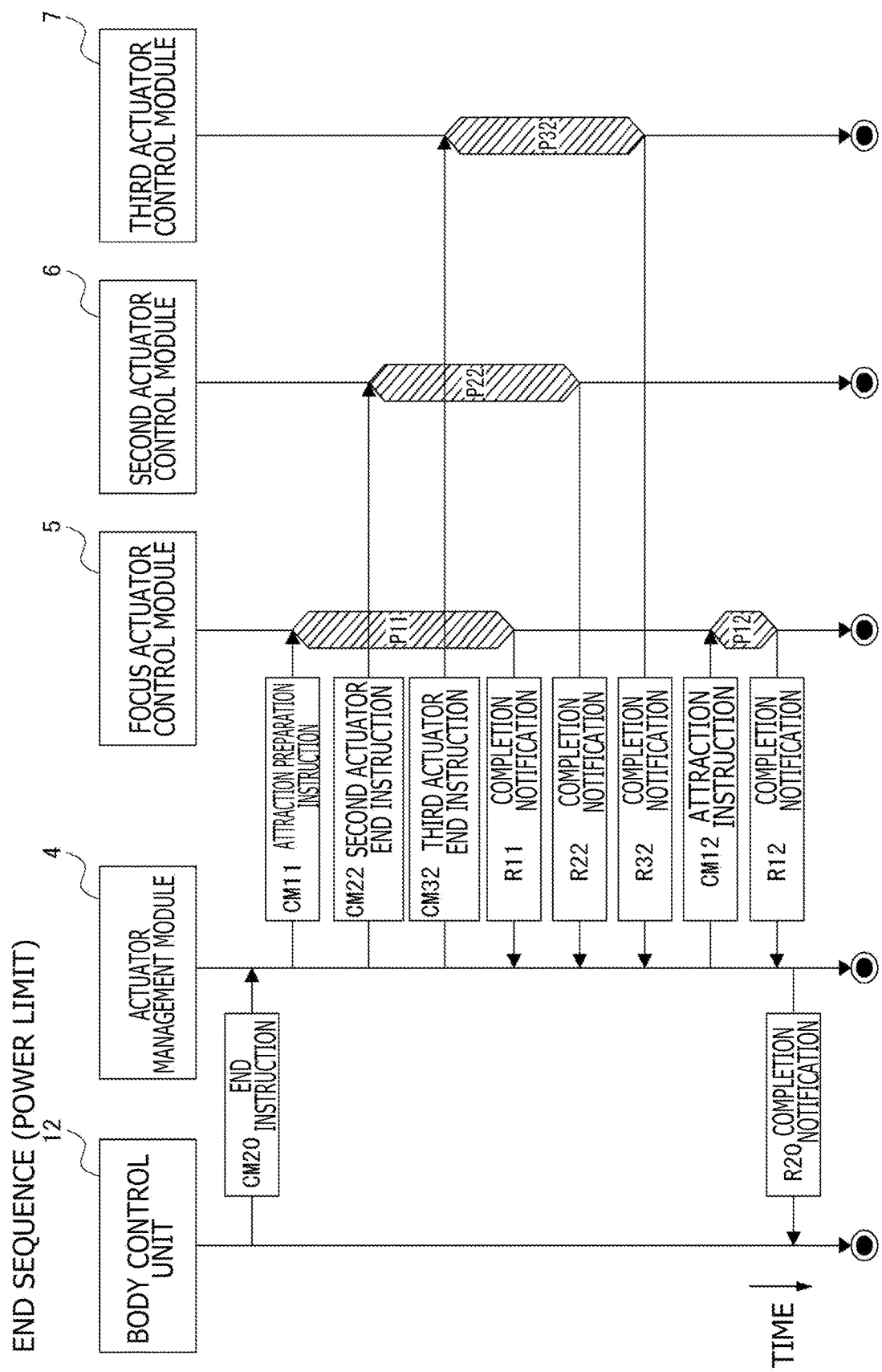
FIG. 42 is an explanatory diagram of a sequence during ending with power limit according to the embodiment.

Illustrated in FIGS. 41 and 42 by way of example is sequence control performed by the actuator management module 4 in accordance with presence or absence of a power limit instruction. These figures are depicted in a form similar to the form of FIG. 28 and other figures referred to above.

FIG. 41 depicts a sequence performed at the time of ending when no power limit instruction is issued.

At the time of ending, such as a case where the user performs power-off operation of the imaging device 3, an end instruction CM20 is transmitted from the body control unit 12 to the lens control unit 22. In response to this instruction, the actuator management module 4 of the lens control unit 22 initially issues an attraction preparation instruction CM11 to the control module 5.

In response to this instruction, the control module 5 performs an attraction preparation process P11. This is the process explained with reference to FIGS. 34 and 35.

Moreover, the actuator management module 4 concurrently issues an end instruction CM22 to the second actuator, an end instruction CM32 to the third actuator, and the like.

In response to these instructions, the second control module 6 performs an end process P22, and the third control module 7 performs an end process P32.

After completion of the processes corresponding to the instructions, each of the respective control modules returns a completion notification to the actuator management module 4.

The control module 5 issues a completion notification R11 in accordance with completion of the attraction preparation process P11.

The second control module 6 issues a completion notification R22 in accordance with completion of the end process P22.

The third control module 7 issues a completion notification R32 in accordance with completion of the end process P32.

The actuator management module 4 issues an attraction instruction CM12 to the control module 5 after acquisition of at least the completion notification R11 of the attraction preparation process P11.

In response to this instruction, the control module 5 performs an attraction process P12. This is the process explained with reference to FIGS. 37, 38, and 39.

Thereafter, the control module 5 issues a completion notification R12 in accordance with completion of the attraction process P12.

After the processes of the respective actuators are completed, the lens control unit 22 (actuator management module 4) transmits a completion notification R20 to the body control unit 12 as a notification of completion for the end instruction CM20.

Described above are a series of processes performed by the lens control unit 22 at the time of issue of the end instructions.

Meanwhile, FIG. 42 depicts a case where a power limit instruction is given at the time of issue of the end instruction CM20 from the body control unit 12.

In this case, the attraction process P12 is not carried out simultaneously with the end processes associated with the other actuators.

In response to the end instruction CM20 from the body control unit 12, the actuator management module 4 issues the attraction preparation instruction CM11 to the control module 5. The control module 5 performs the attraction preparation process P11 in response to this instruction, and issues the completion notification R11 in accordance with completion.

The actuator management module 4 concurrently issues the end instruction CM22 to the second control module 6. The second control module 6 performs the end process P22 in response to this instruction, and issues the completion notification R22.

Further, the actuator management module 4 concurrently issues the end instruction CM32 to the third control module 7. The third control module 7 performs the end process P32 in response to this instruction, and issues the completion notification R32.

The actuator management module 4 issues the attraction instruction CM12 to the control module 5 after receiving completion notifications of the other actuators such as the second and third actuators.

In response to this instruction, the control module 5 performs the attraction process P12. Thereafter, the control module 5 issues the completion notification R12 in accordance with completion of the attraction process P12.

After completion of the end processes of the respective actuators, the lens control unit 22 (actuator management module 4) transmits the completion notification R20 to the body control unit 12 as a notification of completion for the end instruction CM20.

As described above, the attraction process is not performed simultaneously with the end processes performed by the other actuator control modules. In such a manner, the attraction process is achievable in compliance with the power limit instructions even with energization of the solenoid 33.

8. SUMMARY AND MODIFICATION

According to the embodiment described above, the following advantageous effects are offered.

The lens barrel 2 according to the embodiment includes the focus lens drive unit 45 which moves the lens holder 60 holding the focus lens 26 in the optical axis direction, and the solenoid 33 functioning as a locking mechanism for regulating movement of the lens holder 60 at a movable end of the lens holder 60. In addition, the lens control unit 22 determines execution of the escape process for enabling the lens holder 60 to escape from the movement regulated state achieved by the locking mechanism, and performs, as the escape process in accordance with the determination of execution, control for achieving movement of the lens holder 60 by using the focus lens drive unit 45 in a state where movement regulating force generated by the locking mechanism is reduced or eliminated.

For example, by providing the locking mechanism constituted by the solenoid 33, the focus lens 26 is brought into a state attracted by the solenoid during disuse. Regulation of movement produced in this state can prevent generation of noise or shock at the time of a collision between a focus movement frame and a mechanical end.

In a case where movement of the focus lens 26 is required in this state, such as at startup or during the imaging action, the escape process is performed to escape from the movement regulated state (attracted state). In this manner, normal focus control is achievable.

Moreover, the lens control unit 22 of the lens barrel 2 according to the embodiment performs, as a shift process for shifting the lens holder 60 to the movement regulated state achieved by the locking mechanism, control for shifting the lens holder 60 by using the focus lens drive unit 45 to a position where the movement regulation is achieved by the locking mechanism, in a state where the movement regulating force generated by the locking mechanism is reduced or eliminated.

By shifting to the movement regulated state as the end process such as power-off, the function of the locking mechanism during disuse, i.e., prevention of abnormal noise or shock as described above, can be appropriately exerted. In addition, this manner of movement of the lens holder 60 in the reduced or eliminated state of the movement regulating force prevents a sharply collision with the locking mechanism as a result of attraction during the shift process.

According to the embodiment, the locking mechanism includes an electromagnetic actuator (solenoid 33) which regulates movement of the lens holder 60 by attraction produced by magnetic force, and reduces or eliminates attracting force of magnetic force in accordance with energization.

Specifically, the locking mechanism utilizing magnetic force is provided at the movable end of the lens, and attracts and holds the lens holder 60 by using magnetic force in a case of contact between the lens holder 60 and the movable end. Accordingly, no stopper member is required, and therefore damage to a stopper member need not be considered.

Moreover, even in a case where an action different from the action at the time of normal ending is performed, such as a case where a battery is removed during power-on of the imaging device 3, and a case where the lens barrel 2 is removed from the body as an interchangeable lens, the lens holder 60 is attracted and held by magnetic force. Accordingly, repetitive contact between the lens holder 60 and the movable end is avoided, and therefore reduction of noise or vibration can be achieved.

Particularly, the lens holder 60 of the focus lens 26 is often operated by linear (voice coil motor) driving. According to recent optical design of a bright lens having a large diameter and a wide angle, the lens holder 60 tends to become heavier. In this case, abnormal noise or shock similarly increases, and therefore prevention of abnormal noise or shock generated during non-energization is extremely advantageous.

Further, in a case of a mechanical locking mechanism, the mechanism itself may be broken by unexpected shock. This risk particularly increases as the weight of the lens holder 60 increases. However, the risk can be reduced by adopting the attraction mechanism utilizing magnetic force.

In addition, the movement regulated state is achieved by attraction using magnetic force. Accordingly, no special power is needed for maintaining the locked state. A state of easy escape can be created by reducing or eliminating attracting force with energization for a short period during the escape process. Moreover, a pushing action accompanied by gentle contact is achievable by reducing or eliminating attracting force with energization for a short period during the attraction process. In such a manner, an appropriate action is achievable by temporary energization. Accordingly, power consumption can be reduced.

Note that a locking mechanism other than the solenoid 33 may be employed as the electromagnetic actuator. Alternatively, a mechanical locking mechanism or a locking mechanism utilizing friction is adoptable, for example.

According to the embodiment, the lens control unit 22 performs the escape process at the time of startup (see FIGS. 23 to 27). In this manner, the escape process can be performed in an appropriate manner as preparation for the imaging action.

According to the embodiment, the lens control unit 22 performs the escape process when the lens holder 60 comes into the movement regulated state produced by the locking mechanism during the imaging action (see FIGS. 23 to 27).

If the lens holder 60 is attracted by the solenoid 33 as a result of shock or the like during the imaging action, focus control is disabled, and the image action is difficult to perform. In this case, execution determination of the escape process is made to perform the escape process. In such a manner, the current state is allowed to return to the focus control state before attraction.

According to the embodiment, the lens control unit 22 determines execution of the escape process on the basis of whether or not the lens holder 60 is in the movement regulated state produced by the locking mechanism (see FIG. 23).

There may be a case where the attraction state is already cancelled for some reasons at the time of an attempt of execution of the escape process in accordance with an escape instruction at startup, in a state of unnecessary attraction during the imaging action, or the like. In this case, the escape process need not be performed. When this fact is detected, the state is designated as "completed" without performing the escape process. In such a manner, execution of a useless process is avoidable.

According to the example presented in the embodiment, the lens control unit 22 determines timing for executing the escape process on the basis of presence or absence of a power limit instruction requesting a limit to power consumption (see FIGS. 29 to 32).

At the time of issue of an escape instruction, timing of the escape process in a case where power is limited by the imaging device 3 is different from timing in a case where power is not limited.

In this manner, the escape process can be executed in a state appropriate particularly for the situation where power is limited.

According to the example presented in the embodiment, the lens control unit 22 executes the escape process in a period different from a period when initialization processes associated with drive units other than the drive units associated with the lens holder 60 are executed in a case where a power limit instruction is issued at the time of startup (see FIG. 29). The drive units other than the drive units associated with the lens holder 60 are actuators controlled by the second and third actuator control modules 6 and 7 in FIGS. 2 and 29.

At the time of startup, the escape process is performed simultaneously with initialization of the respective actuators. In a case where power is limited, however, the escape process is performed in a period other than the period of the initialization processes performed by the other actuators. In this manner, actions in compliance with the power limit are achievable.

According to the example presented in the embodiment, the lens control unit 22 executes the escape process after power limit control for the drive units other than the drive units associated with the lens holder 60 in a case where a power limit instruction is received at the time when the lens holder 60 is in the movement regulated state produced by the locking mechanism during the imaging action (see FIG. 31).

In a case where power is limited at the time of issue of an escape instruction for returning from unnecessary attraction during the imaging action, the escape process is executed after power limit control is performed for the other actuators. In this manner, the escape process can be executed with reduced power consumption. In addition, rapid return from the unnecessary attraction state is achievable.

According to the embodiment, the lens control unit 22 ends the escape process in a case of issue of a power limit instruction requesting a limit to the power consumption during execution of the escape process (see FIGS. 23 and 32).

In a case of issue of a power limit instruction in a course of the escape process, the escape process requiring energization of the solenoid is ended. In this manner, the request for the power limit can be met.

According to the embodiment, the escape process is a process for moving the lens holder 60 to at least a range out of reach of movement regulating force of the locking mechanism.

By executing minimum movement of the lens holder 60 to the range out of reach of attraction generated by magnetic force of the solenoid 33 in the escape process, an effect of the solenoid 33 on the driving by the focus control is cancelled. As a result, normal focus control is allowed to be achieved. Moreover, after the movement to the range out of reach of attraction, no problem is caused even when attracting force is regenerated by stopping energization of the solenoid 33. Accordingly, this manner of the escape process is advantageous in reduction of the energization period and reduction of power consumption.

According to the embodiment, the escape process performed when the lens holder 60 comes into the movement regulated state achieved by the locking mechanism during the imaging action is a process for moving the lens holder 60 to a range out of reach of movement regulating force of the locking mechanism, and further returning the lens holder 60 to a position immediately before the movement regulated state (see FIG. 26).

The lens holder 60 is moved to the range out of reach of attraction by the solenoid 33 in the escape process, and then further returned to a focus control position immediately before unnecessary attraction. In this manner, the current state can be quickly returned to the original imaging action state at the time of unnecessary attraction.

According to the embodiment, the escape process ends energization of the solenoid 33 after the lens holder 60 is moved to a range out of reach of the movement regulating force of the locking mechanism, and returns the lens holder 60 to a position immediately before the movement regulated state (see FIGS. 24, 25, and 26).

The effect of the attracting force is cancelled when the lens holder 60 is moved to the range out of reach of attraction by the solenoid 33 in the escape process. Accordingly, energization of the solenoid 33 is turned off, and the lens holder 60 is returned to a focus position immediately before unnecessary attraction. In this manner, reduction of the energization period of the solenoid 33, and therefore reduction of power consumption are achievable.

According to the embodiment, in a case where target movement of the lens holder 60 is not completed in the escape process, the lens control unit 22 performs the retry process which ends a reduced or eliminated state of the movement regulating force generated by the locking mechanism and waits for a fixed time, and then performs control for moving the lens holder 60 by using the focus lens drive unit 45 (see FIGS. 24 and 27). The target movement is movement determined as success in escape in step S151 in FIG. 24, for example. This movement is also considered as movement to at least a range out of reach of attraction achieved by magnetic force of the solenoid 33.

In a case of failure in the escape process, the escape process is completed by retry. This retry is carried out after an elapse of a fixed waiting period at the time of failure in escape. During this waiting, the solenoid 33 is not energized. In this manner, continuation of long-term energization is avoidable even in a situation where retry is necessary. In addition, heat generated by energization of the solenoid 33 can be reduced.

According to the example presented in the embodiment, the lens control unit 22 executes the shift process (attraction process) after execution of the shift preparation process (attraction preparation process) for moving the lens holder 60 to the preparation position (attraction preparation position) where the shift process is started (see FIGS. 34 and 35).

By performing the shift preparation process (attraction preparation process), movement constantly from a specific position toward the solenoid 33 is achievable. Accordingly, control of the shift process (attraction process) can be facilitated.

Moreover, by dividing the process into the shift preparation process and the shift process, execution timing of the shift process can be flexibly defined. When the power limit instruction described above is issued, it is allowed to initially perform the shift preparation process, and execute the shift process (attraction process) requiring energization of the solenoid 33 not in the same period as the period when end processes of the other actuators are performed (see FIG. 41). In addition, movement to the attraction preparation position is also completed in this case. Accordingly, the attraction process can be also executed in a short time.

According to the embodiment, the preparation position is designated at a position set on the basis of a distance within reach of the movement regulating force of the locking mechanism.

For example, the preparation position is a position immediately before reach of the attracting force generated by the solenoid 33. For example, in the attraction preparation process, the lens holder 60 is moved to the preparation position located at a position immediately before reach of an effect of magnetic force attraction during non-energization of the solenoid 33. By designating the preparation position at the position out of reach of the effect of the magnetic force, the solenoid 33 need not be energized in the stage of the attraction preparation process. Accordingly, reduction of power consumption is achievable.

According to the example presented in the embodiment, the lens control unit 22 performs, as the shift process, the pushing process for moving the lens holder 60 to a state in contact with a part of the locking mechanism and pushed into the locking mechanism, and the pulling process for moving the lens holder 60 in a direction opposite to the pushing direction after the pushing process to return the lens holder 60 to the predetermined end position (see FIGS. 37, 38, and 39).

The pushing process can reliably bring the lens holder 60 into contact with the solenoid 33. In addition, pulling subsequently carried out can maintain the movement regulated state at the predetermined end position, and prevent abnormal noise or the like generated by repulsion of the elastic member 77.

According to the embodiment, the lens control unit 22 performs control for lowering or eliminating the movement regulating force generated by the locking mechanism during the pushing process (see FIG. 38).

By lowering the attracting force with energization of the solenoid 33 during the pushing process, a sharp contact or collision between the lens holder 60 and the solenoid 33 is not easily caused by the attracting force. In this manner, generation of abnormal noise in a course of the shift process, development of exhaustion of the mechanism, or the like is avoidable.

According to the embodiment, the lens control unit 22 performs control for generating movement regulating force of the locking mechanism during the pulling process (see FIGS. 38 and 39).

Specifically, energization of the solenoid 33 is ended at the time of completion of the pushing process, and then the pulling process is carried out. In this manner, the pulling process is performed in a state where the lens holder 60 brought into tight contact by the pushing process is attracted by the attracting force of the solenoid 33. In this case, attraction by magnetic force is reliably performed, and then return to the end position is completed in an attracted state. Accordingly, a transition to a stable movement regulated state is achievable.

According to the embodiment, the lens control unit 22 moves the lens holder 60 in the pushing process at lower speed than the speed during movement of the lens holder in the shift preparation process. For example, the lens holder 60 is moved at high speed in the shift preparation process, and is moved at low speed in the pushing process.

By performing the pushing process at low speed, the lens holder 60 is brought into contact with the solenoid 33 in a gentle manner. Accordingly, abnormal noise or exhaustion of members caused during pushing is avoidable.

Note that shock at the time of contact with the movable end can be reduced by using an elastic member such as rubber. However, in a case where shock produced by the lens holder 60 is significant, a large or wide elastic member is required. Moreover, a sufficient clearance from other parts located before or behind the moving lens group needs to be provided in consideration of a deformation amount of the elastic member. In this case, space utilization deteriorates. By moving the lens holder 60 at low speed to avoid great shock as in the present embodiment, these disadvantages of the elastic member can be also eliminated.

Moreover, by moving the lens holder 60 at high speed in the shift preparation process before pushing, a state for starting the shift process (pushing process) is quickly realizable. In this manner, an entire processing time for shifting to the movement regulated state can be reduced.

According to the example presented in the embodiment, the lens control unit 22 determines timing for executing the shift process on the basis of presence or absence of a power limit instruction requesting a limit to power consumption (see FIGS. 41 and 42).

At the time of issue of an instruction for shifting to the movement regulated state, timing of the shift process in a case where power is limited by the imaging device 3 is different from timing in a case where power is not limited.

In this manner, the shift process can be executed in a state appropriate particularly for the situation where power is limited.

According to the example presented in the embodiment, the lens control unit 22 executes the shift process in a period different from a period when end processes associated with the other actuators are executed in a case where a power limit instruction is issued (see FIG. 42).

During power-off or the like, the shift process to the movement regulated state is performed simultaneously with the end processes of the respective actuators. In a case where power is limited, however, the shift process requiring energization of the solenoid 33 is performed in a period other than a period of the end processes performed by the other actuators to achieve actions in compliance with the power limit.

According to the example presented in the embodiment, the lens control unit 22 executes the shift process after completion of the end processes associated with the other actuators in a case where a power limit instruction is issued (see FIG. 42).

In this manner, the end processes performed by the other actuators can be reliably achieved by prohibiting energization of the solenoid 33 until completion of the end processes performed by the respective actuators.

According to the embodiment, the locking mechanism for regulating movement of the lens holder 60 associated with the focus lens 26 has been presented by way of example. However, the technology according to the present disclosure is applicable to a configuration including a locking mechanism which regulates movement of lens holders for other lenses, such as the zoom lens 23.

Moreover, according to the embodiment, the lens barrel 2 as an interchangeable lens has been presented by way of example. However, the technology according to the present disclosure is applicable to a lens barrel formed integrally with a body of an imaging device and configured to be undetachable.

In the case of the configuration including the lens barrel formed integrally with the body of the imaging device, the body control unit 12 and the lens control unit 22 in FIG. 1 need not be separately provided, but may be integrated into one control unit to execute the action control of the present disclosure. In this case, the control unit thus provided performs various processes associated with the escape actions described in the embodiment, such as determination of execution of the escape process for enabling the lens holder 60 to escape from the movement regulated state achieved by the locking mechanism of the lens holder 60, and, as the escape process corresponding to the determination of execution, control for executing movement of the lens holder 60 by using the focus lens drive unit 45 in a state where movement regulating force generated by the locking mechanism is reduced or eliminated. Moreover, the control unit thus provided performs various processes associated with the shift process described in the embodiment, as the shift process for shifting the lens holder 60 to the movement regulated state achieved by the locking mechanism, such as control for moving the lens holder 60 by using the focus lens drive unit 45 to a position where the movement regulation is achieved by the locking mechanism in a state where the movement regulating force generated by the locking mechanism is reduced or eliminated.

Further, regardless of whether the lens barrel 2 is provided separately from the imaging device 3 or integrally with the imaging device 3, the body control unit 12 may carry out the control process performed by the lens control unit 22 in the embodiment described above in a case where the lens control unit 22 and the body control unit 12 are provided as in the embodiment.

In other words, the control unit performing the control process according to the present technology may be any one of the lens control unit 22, the body control unit 12, and a control unit including both of these units as one body.

Note that advantageous effects to be offered are not limited to those of the present description presented only by way of example. Other advantageous effects may be further offered.

Note that the present technology can also have the following configurations.

(1)

A lens barrel including:
a lens drive unit that moves a lens holder holding a lens in an optical axis direction;
a locking mechanism that regulates movement of the lens holder at a movable end of the lens holder; and
a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

(2)

The lens barrel according to (1), in which the locking mechanism includes an electromagnetic actuator that regulates movement of the lens holder by using attraction produced by magnetic force, and reduces or eliminates attracting force of the magnetic force in accordance with energization.

(3)

The lens barrel according to (1) or (2), in which the control unit executes the shift process after execution of a shift preparation process for moving the lens holder to a preparation position where the shift process is started.

(4)

The lens barrel according to (3), in which the preparation position is a position set on the basis of a distance within reach of the movement regulating force of the locking mechanism.

(5)

The lens barrel according to any one of (1) to (4), in which the control unit performs, as the shifting process,
 a pushing process for moving the lens holder to bring the lens holder into contact with a part of the locking mechanism and push the lens holder into the locking mechanism, and
 a pulling process for moving the lens holder in a direction opposite to a pushing direction after the pushing process to return the lens holder to a predetermined end position.

(6)

The lens barrel according to (5), in which the control unit performs control for lowering or eliminating the movement regulating force of the locking mechanism during the pushing process.

(7)

The lens barrel according to (6), in which the control unit performs control for generating the movement regulating force of the locking mechanism during the pulling process.

(8)

The lens barrel according to any one of (5) to (7), in which
 the control unit executes the shift process after execution of a shift preparation process for moving the lens holder to a preparation position where the shift process is started, and
 movement of the lens holder in the pushing process is executed at lower speed than movement of the lens holder in the shift preparation process.

(9)

The lens barrel according to any one of (1) to (8), in which the control unit determines timing for executing the shift process on the basis of presence or absence of a power limit instruction requesting a limit to power consumption.

(10)

The lens barrel according to (9), in which,
 in a case where the power limit instruction is issued, the control unit executes the shift process in a period different from a period when end processes associated with other actuators are executed.

(11)

The lens barrel according to (9) or (10), in which,
 in a case where the power limit instruction is issued, the control unit performs the shift process after completion of end processes associated with other actuators.

(12)

The lens barrel according to any one of (1) to (11), in which the lens holder is allowed to be brought into the movement regulated state at a movable end on an object side by the locking mechanism.

(13)

The lens barrel according to any one of (1) to (12), in which
 the multiple locking mechanisms are provided, and
 the lens holder is allowed to be brought into the movement regulated state at each of a movable end on an object side and a movable end on an image side by the locking mechanisms.

(14)

The lens barrel according to any one of (1) to (13), in which
 the two locking mechanisms are provided, and
 the two locking mechanisms are provided on opposite sides with an optical axis interposed between the respective locking mechanisms.

(15)

The lens barrel according to any one of (1) to (14), in which
 the locking mechanism includes an attracting force generation unit that includes an attracting portion and generates attracting force, and an attracted portion that is attracted by the attracting force generated by the attracting force generation unit and is supported by the lens holder, and
 the attracted portion is configured to be displaceable relative to the lens holder in a direction different from the optical axis direction.

(16)

The lens barrel according to (15), in which an elastic member is provided between the lens holder and the attracted portion to bias the attracted portion in a direction toward the attracting force generation unit.

(17)

The lens barrel according to (15) or (16), in which
 the attracted portion is supported by the lens holder via an attachment shaft in a displaceable manner,
 the lens holder has a recessed surface having a curved surface shape, and
 the attachment shaft has a protruding surface having a curved surface shape and slidable on the recessed surface at the time of displacement of the attracted portion relative to the lens holder.

(18)

A control method for a lens barrel that includes
 a lens drive unit that moves a lens holder holding a lens in an optical axis direction, and
 a locking mechanism that regulates movement of the lens holder at a movable end of the lens holder, in which
 the control method performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

(19)
An imaging device including:
a lens drive unit that moves a lens holder holding a lens in an optical axis direction;
a locking mechanism that regulates movement of the lens holder at a movable end of the lens holder; and
a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

REFERENCE SIGNS LIST

1: Camera system
2: Lens barrel
3: Imaging device
4: Actuator management module (management module)
5: Focus actuator control module (control module)
6: Second actuator control module (second control module)
7: Third actuator control module (third control module)
12: Body control unit
22: Lens control unit
26: Focus lens
33: Solenoid
45: Focus lens drive unit
47: Solenoid driver
60: Lens holder
70: Attracted portion
71: Yoke
72: Magnet
73: Coil

The invention claimed is:

1. A lens barrel comprising:
a lens drive unit that moves a lens holder holding a lens in an optical axis direction;
a locking mechanism that regulates movement of the lens holder at a movable end of the lens holder; and
a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

2. The lens barrel according to claim 1, wherein the locking mechanism includes an electromagnetic actuator that regulates the movement of the lens holder by using attraction produced by magnetic force, and reduces or eliminates attracting force of the magnetic force in accordance with energization.

3. The lens barrel according to claim 1, wherein the control unit executes the shift process after execution of a shift preparation process for moving the lens holder to a preparation position where the shift process is started.

4. The lens barrel according to claim 3, wherein the preparation position is set on a basis of a distance within reach of the movement regulating force of the locking mechanism.

5. The lens barrel according to claim 1, wherein
the control unit performs, as the shifting process,
a pushing process for moving the lens holder to bring the lens holder into contact with a part of the locking mechanism and push the lens holder into the locking mechanism, and
a pulling process for moving the lens holder in a direction opposite to a pushing direction after the pushing process to return the lens holder to a predetermined end position.

6. The lens barrel according to claim 5, wherein the control unit performs control for lowering or eliminating the movement regulating force of the locking mechanism during the pushing process.

7. The lens barrel according to claim 6, wherein the control unit performs control for generating the movement regulating force of the locking mechanism during the pulling process.

8. The lens barrel according to claim 5, wherein
the control unit executes the shift process after execution of a shift preparation process for moving the lens holder to a preparation position where the shift process is started, and
the movement of the lens holder in the pushing process is executed at lower speed than the movement of the lens holder in the shift preparation process.

9. The lens barrel according to claim 1, wherein the control unit determines timing for executing the shift process on a basis of presence or absence of a power limit instruction requesting a limit to power consumption.

10. The lens barrel according to claim 9, wherein,
in a case where the power limit instruction is issued, the control unit executes the shift process in a period different from a period when end processes associated with other actuators are executed.

11. The lens barrel according to claim 9, wherein,
in a case where the power limit instruction is issued, the control unit performs the shift process after completion of end processes associated with other actuators.

12. The lens barrel according to claim 1, wherein the lens holder is allowed to be brought into the movement regulated state at a movable end on an object side by the locking mechanism.

13. The lens barrel according to claim 1, wherein
multiple locking mechanisms are provided, and
the lens holder is allowed to be brought into the movement regulated state at each of a movable end on an object side and a movable end on an image side by the multiple locking mechanisms.

14. The lens barrel according to claim 1, wherein
two locking mechanisms are provided, and
the two locking mechanisms are provided on opposite sides with an optical axis interposed between the respective locking mechanisms.

15. The lens barrel according to claim 1, wherein
the locking mechanism includes an attracting force generation unit that includes an attracting portion and generates attracting force, and an attracted portion that is attracted by the attracting force generated by the attracting force generation unit and is supported by the lens holder, and
the attracted portion is configured to be displaceable relative to the lens holder in a direction different from the optical axis direction.

16. The lens barrel according to claim 15, wherein an elastic member is provided between the lens holder and the attracted portion to bias the attracted portion in a direction toward the attracting force generation unit.

17. The lens barrel according to claim 15, wherein
the attracted portion is supported by the lens holder via an attachment shaft in a displaceable manner,
the lens holder has a recessed surface having a curved surface shape, and
the attachment shaft has a protruding surface having a curved surface shape and slidable on the recessed surface at a time of displacement of the attracted portion relative to the lens holder.

18. A control method for a lens barrel that includes
a lens drive unit that moves a lens holder holding a lens in an optical axis direction, and
a locking mechanism that regulates movement of the lens holder at a movable end of the lens holder, wherein
the control method performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

19. An imaging device comprising:
a lens drive unit that moves a lens holder holding a lens in an optical axis direction;
a locking mechanism that regulates movement of the lens holder at a movable end of the lens holder; and
a control unit that performs, as a shift process for shifting the lens holder to a movement regulated state produced by the locking mechanism, control for moving the lens holder by using the lens drive unit to a position where movement regulation is achieved by the locking mechanism in a state where movement regulating force generated by the locking mechanism is reduced or eliminated.

* * * * *